(12) United States Patent
Tsangaris et al.

(10) Patent No.: US 8,070,863 B2
(45) Date of Patent: Dec. 6, 2011

(54) GAS CONDITIONING SYSTEM

(75) Inventors: Andreas Tsangaris, Ottawa (CA);
Margaret Swain, Ottawa (CA)

(73) Assignee: Plasco Energy Group Inc., Kanata (CA)

( * ) Notice: Subject to any disclaimer, the term of this patent is extended or adjusted under 35 U.S.C. 154(b) by 0 days.

(21) Appl. No.: 12/785,219

(22) Filed: May 21, 2010

(65) Prior Publication Data
US 2010/0275781 A1 Nov. 4, 2010

Related U.S. Application Data

(63) Continuation of application No. 11/745,441, filed on May 7, 2007, now abandoned.

(60) Provisional application No. 60/746,616, filed on May 5, 2006, provisional application No. 60/864,116, filed on Nov. 2, 2006, provisional application No. 60/911,179, filed on Apr. 11, 2007, provisional application No. 60/797,973, filed on May 5, 2006.

(30) Foreign Application Priority Data

Jun. 5, 2006 (WO) ................ PCT/CA2006/000881

(51) Int. Cl.
*B01D 53/02* (2006.01)
(52) U.S. Cl. ........... 96/108; 55/315.1; 95/107; 110/216; 110/238; 110/346
(58) Field of Classification Search ................ 55/315.1; 95/107; 110/216, 238, 346; 96/108, 123
See application file for complete search history.

(56) References Cited

U.S. PATENT DOCUMENTS

| 4,141,694 A | | 2/1979 | Camacho |
| 4,181,504 A | | 1/1980 | Camacho |
| 4,208,191 A | | 6/1980 | Sze |
| 4,272,255 A | | 6/1981 | Coates |
| 4,291,636 A | * | 9/1981 | Bergsten et al. ............... 110/346 |
| 4,410,336 A | | 10/1983 | Blaskowski |
| 4,472,172 A | | 9/1984 | Sheer et al. |

(Continued)

FOREIGN PATENT DOCUMENTS

CA 2343035 A1 9/1999

(Continued)

OTHER PUBLICATIONS

"Plasma Gasification of MSW," Presentation from Plasco Energy Group to the Hera Group, presented by Alisdair McLean of Plasco Energy Group on Nov. 28, 2006, pp. 1-30.

(Continued)

*Primary Examiner* — Robert J Hill, Jr.
*Assistant Examiner* — Christopher P Jones
(74) *Attorney, Agent, or Firm* — McAndrews, Held & Malloy, Ltd.

(57) ABSTRACT

The present invention provides a gas conditioning system for processing an input gas from a low temperature gasification system to an output gas of desired characteristics. The system comprises a two-stage process, the first stage separating heavy metals and particulate matter in a dry phase, and the second stage including further processing steps of removing acid gases, and/or other contaminants. Optional processes include adjusting the humidity and temperature of the input gas as it passes through the gas conditioning system. The presence and sequence of processing steps is determined by the composition of the input gas, the desired composition of output gas for downstream applications, and by efficiency and waste minimization.

14 Claims, 26 Drawing Sheets

U.S. PATENT DOCUMENTS

| | | | |
|---|---|---|---|
| 4,606,799 A | | 8/1986 | Pirklbauer et al. |
| 4,900,429 A | | 2/1990 | Richardson |
| 5,280,757 A | * | 1/1994 | Carter et al. .................. 110/346 |
| 5,331,906 A | | 7/1994 | Sonoda et al. |
| 5,486,269 A | | 1/1996 | Nilsson |
| 5,666,891 A | | 9/1997 | Titus et al. |
| 5,727,903 A | * | 3/1998 | Borray et al. ............ 405/128.15 |
| 5,756,957 A | | 5/1998 | Titus et al. |
| 5,785,923 A | | 7/1998 | Surma et al. |
| 5,798,497 A | | 8/1998 | Titus et al. |
| 6,200,430 B1 | | 3/2001 | Robert |
| 6,215,678 B1 | | 4/2001 | Titus et al. |
| 6,235,256 B1 | | 5/2001 | Lang et al. |
| 6,312,505 B1 | | 11/2001 | McQuigg et al. |
| 6,380,507 B1 | | 4/2002 | Childs |
| 6,530,978 B2 | | 3/2003 | McQuigg et al. |
| 6,576,210 B2 | | 6/2003 | Surma |
| 6,630,113 B1 | | 10/2003 | Surma |
| 6,686,556 B2 | | 2/2004 | Mitchell |
| 6,810,821 B2 | | 11/2004 | Chan |
| 6,960,234 B2 | * | 11/2005 | Hassett .............................. 48/77 |
| 2001/0008620 A1 | | 7/2001 | Dohmann et al. |
| 2002/0144981 A1 | | 10/2002 | Mitchell |
| 2004/0031450 A1 | | 2/2004 | Chandran et al. |
| 2004/0170210 A1 | | 9/2004 | Do et al. |
| 2004/0220285 A1 | | 11/2004 | Boerrigter et al. |
| 2004/0247509 A1 | | 12/2004 | Newby |
| 2004/0251241 A1 | | 12/2004 | Blutke et al. |
| 2005/0132883 A1 | | 6/2005 | Su et al. |
| 2005/0271568 A1 | | 12/2005 | Mori et al. |

FOREIGN PATENT DOCUMENTS

| | | | |
|---|---|---|---|
| CA | 2349608 A1 | | 11/1999 |
| CA | 2424805 A1 | | 4/2003 |
| CA | 2484472 A1 | | 11/2003 |
| CN | 1258712 | | 7/2000 |
| CN | 1382202 | | 11/2002 |
| CN | 1644661 | | 7/2005 |
| DE | 19652770 A1 | | 6/1998 |
| DE | 19916931 A1 | | 10/2000 |
| DE | 10047787 A1 | | 3/2002 |
| EP | 0153235 A1 | | 8/1985 |
| EP | 0412587 A1 | | 2/1991 |
| EP | 0625869 A2 | | 11/1994 |
| EP | 0675324 A1 | | 10/1995 |
| EP | 0837041 A1 | | 4/1998 |
| EP | 1136542 A1 | | 9/2001 |
| EP | 1227141 A2 | | 7/2002 |
| EP | 1475429 A1 | | 11/2004 |
| EP | 1696177 A1 | | 8/2006 |
| FR | 2709980 A1 | | 3/1995 |
| GB | 2422602 | | 8/2006 |
| JP | 2001158887 | | 6/2001 |
| KR | 20050025290 A | | 3/2005 |
| NL | 8200417 A | | 9/1983 |
| WO | WO9404631 A1 | | 3/1994 |
| WO | WO0181828 A1 | | 11/2001 |
| WO | WO03018467 | | 3/2003 |
| WO | WO03018721 | | 3/2003 |
| WO | WO2004072207 | | 8/2004 |
| WO | WO2004072210 A1 | | 8/2004 |
| WO | WO2004087840 A1 | | 10/2004 |
| WO | WO2005047435 A2 | | 5/2005 |
| WO | WO2006081661 A1 | | 8/2006 |
| WO | WO2006128285 A1 | | 12/2006 |
| WO | WO2006128286 A1 | | 12/2006 |
| WO | WO2009009891 A1 | | 1/2009 |

OTHER PUBLICATIONS

Presentation to the Ottawa Centre of Research and Innovation (OCRI), presented by Rod Bryden of the Plasco Energy Group, "Leap Forward," Oct. 26, 2006, pp. 1-24.

Meeting of the Environmental Advisory Committee, City of Ottawa Committee Meeting Minutes, Doc. Minutes 27, on May 11, 2006, pp. 1-13.

Joint Meeting of Corporate Services and Economic Development Committee and Planning and Environment Committee, Evaluation Project—Plasma Waste Conversion, Doc. ACS2005-CMR-OCM-0012, on Sep. 7, 2005, pp. 1-21.

Website from Plasco Energy Group as archived on Apr. 2, 2006, pp. 1-22.

Ontario, Ministry of the Environment, Certificate of Approval—Air, No. 6925-6REN9E, issued on Dec. 1, 2006, pp. 1-35.

Ontario, Ministry of the Environment, Provisional Certificate of Approval—Waste Disposal Site, No. 3166-6TYMDZ, issued on Dec. 1, 2006, pp. 1-21.

Klein, "Gasification: An Alternative Process for Energy Recovery and Disposal of Municipal Solid Wastes," Columbia University, May 2002, pp. 1-50.

Chapter 5, Chemical Equilibrium, pp. 131-168.

Chapter 6, Phase Equilibrium, pp. 169-218.

U.S. Appl. No. 60/746,632 (priority document for PCT/US2007/068405).

* cited by examiner

GAS CONDITIONING SYSTEM

CROSS-REFERENCE TO RELATED APPLICATIONS

This application is a Continuation of and claims benefit of priority under 35 U.S.C. §120 from the currently pending U.S. Non-Provisional application Ser. No. 11/745,441 (the "'441" application"), filed May 7, 2007. The '441 application, in turn, claims benefit of priority under 35 U.S.C. §119 (e) from U.S. Provisional Application Ser. No. 60/746,616, filed May 5, 2006. The '441 application also claims benefit of priority to International Patent Application No. PCT/CA2006/000881, filed Jun. 5, 2006. The '441 application also claims benefit of priority under 35 U.S.C. { }119(e) from U.S. Provisional Application Ser. No. 60/864,116, filed Nov. 2, 2006. The '441 application also claims benefit of priority under 35 U.S.C. §19(e) from U.S. Provisional Application Ser. No. 60/911,179, filed Apr. 11, 2007. The '441 application also claims benefit of priority under 35 U.S.C. §119(e) from U.S. Provisional Application Ser. No. 60/797,973, filed May 5, 2006. The contents of all of the aforementioned applications are hereby expressly incorporated by reference in their entirety and for all purposes.

FIELD OF THE INVENTION

The present invention pertains to the field of gas clean up and processing, and in particular to the separation of particulate matter and targeted chemical species from an input gas generated from a low temperature gasification system.

BACKGROUND OF THE INVENTION

Gasification is a process that enables the conversion of carbonaceous feedstock, such as municipal solid waste (MSW) or coal, into a combustible gas. The gas can be used to generate electricity, steam or as a basic raw material to produce chemicals and liquid fuels.

Possible uses for the gas include: the combustion in a boiler for the production of steam for internal processing and/or other external purposes, or for the generation of electricity through a steam turbine; the combustion directly in a gas turbine or a gas engine for the production of electricity; fuel cells; the production of methanol and other liquid fuels; as a further feedstock for the production of chemicals such as plastics and fertilizers; the extraction of both hydrogen and carbon monoxide as discrete industrial fuel gases; and other industrial applications.

Generally, the gasification process consists of feeding carbonaceous feedstock into a heated chamber (the gasifier) along with a controlled and/or limited amount of oxygen and optionally steam. In contrast to incineration or combustion, which operate with excess oxygen to produce $CO_2$, $H_2O$, $SO_x$, and NOx, gasification processes produce a raw gas composition comprising CO, $H_2$, $H_2S$, and $NH_3$. After clean-up, the primary gasification products of interest are $H_2$ and CO.

Useful feedstock can include any municipal waste, waste produced by industrial activity and biomedical waste, sewage, sludge, coal, heavy oils, petroleum coke, heavy refinery residuals, refinery wastes, hydrocarbon contaminated soils, biomass, and agricultural wastes, tires, and other hazardous waste. Depending on the origin of the feedstock, the volatiles may include $H_2O$, $H_2$, $N_2$, $O_2$, $CO_2$, CO, $CH_4$, $H_2S$, $NH_3$, $C_2H_6$, unsaturated hydrocarbons such as acetylenes, olefins, aromatics, tars, hydrocarbon liquids (oils) and char (carbon black and ash).

As the feedstock is heated, water is the first constituent to evolve. As the temperature of the dry feedstock increases, pyrolysis takes place. During pyrolysis the feedstock is thermally decomposed to release tars, phenols, and light volatile hydrocarbon gases while the feedstock is converted to char.

Char comprises the residual solids consisting of organic and inorganic materials. After pyrolysis, the char has a higher concentration of carbon than the dry feedstock and may serve as a source of activated carbon. In gasifiers operating at a high temperature (>1,200° C.) or in systems with a high temperature zone, inorganic mineral matter is fused or vitrified to form a molten glass-like substance called slag.

Since the slag is in a fused, vitrified state, it is usually found to be non-hazardous and may be disposed of in a landfill as a non-hazardous material, or sold as an ore, road-bed, or other construction material. It is becoming less desirable to dispose of waste material by incineration because of the extreme waste of fuel in the heating process and the further waste of disposing, as a residual waste, material that can be converted into a useful syngas and solid material.

The means of accomplishing a gasification process vary in many ways, but rely on four key engineering factors: the atmosphere (level of oxygen or air or steam content) in the gasifier; the design of the gasifier; the internal and external heating means; and the operating temperature for the process. Factors that affect the quality of the product gas include: feedstock composition, preparation and particle size; gasifier heating rate; residence time; the plant configuration including whether it employs a dry or slurry feed system, the feedstock-reactant flow geometry, the design of the dry ash or slag mineral removal system; whether it uses a direct or indirect heat generation and transfer method; and the syngas cleanup system. Gasification is usually carried out at a temperature in the range of about 650° C. to 1200° C., either under vacuum, at atmospheric pressure or at pressures up to about 100 atmospheres.

There are a number of systems that have been proposed for capturing heat produced by the gasification process and utilizing such heat to generate electricity, generally known as combined cycle systems.

The energy in the product gas coupled with substantial amounts of recoverable sensible heat produced by the process and throughout the gasification system can generally produce sufficient electricity to drive the process, thereby alleviating the expense of local electricity consumption. The amount of electrical power that is required to gasify a ton of a carbonaceous feedstock depends directly upon the chemical composition of the feedstock.

If the gas generated in the gasification process comprises a wide variety of volatiles, such as the kind of gas that tends to be generated in a low temperature gasifier with a "low quality" carbonaceous feedstock, it is generally referred to as off-gas. If the characteristics of the feedstock and the conditions in the gasifier generate a gas in which CO and $H_2$ are the predominant chemical species, the gas is referred to as syngas. Some gasification facilities employ technologies to convert the raw off-gas or the raw syngas to a more refined gas composition prior to cooling and cleaning through a gas quality conditioning system.

Utilizing plasma heating technology to gasify a material is a technology that has been used commercially for many years. Plasma is a high temperature luminous gas that is at least partially ionized, and is made up of gas atoms, gas ions, and electrons. Plasma can be produced with any gas in this manner. This gives excellent control over chemical reactions in the plasma as the gas might be neutral (for example, argon, helium, neon), reductive (for example, hydrogen, methane, ammonia, carbon monoxide), or oxidative (for example, oxygen, carbon dioxide). In the bulk phase, a plasma is electrically neutral.

Some gasification systems employ plasma heat to drive the gasification process at a high temperature and/or to refine the offgas/syngas by converting, reconstituting, or reforming longer chain volatiles and tars into smaller molecules with or without the addition of other inputs or reactants when gaseous molecules come into contact with the plasma heat, they will disassociate into their constituent atoms. Many of these atoms will react with other input molecules to form new molecules, while others may recombine with themselves. As the temperature of the molecules in contact with the plasma heat decreases all atoms fully recombine. As input gases can be controlled stoichiometrically, output gases can be controlled to, for example, produce substantial levels of carbon monoxide and insubstantial levels of carbon dioxide.

The very high temperatures (3000 to 7000° C.) achievable with plasma heating enable a high temperature gasification process where virtually any input feedstock including waste in as-received condition, including liquids, gases, and solids in any form or combination can be accommodated. The plasma technology can be positioned within a primary gasification chamber to make all the reactions happen simultaneously (high temperature gasification), can be positioned within the system to make them happen sequentially (low temperature gasification with high temperature refinement), or some combination thereof.

The gas produced during the gasification of carbonaceous feedstock is usually very hot but may contain small amounts of unwanted compounds and requires further treatment to convert it into a useable product. Once a carbonaceous material is converted to a gaseous state, undesirable substances such as metals, sulfur compounds and ash may be removed from the gas. For example, dry filtration systems and wet scrubbers are often used to remove particulate matter and acid gases from the gas produced during gasification. A number of gasification systems have been developed which include systems to treat the gas produced during the gasification process.

These factors have been taken into account in the design of various different systems which are described, for example, in U.S. Pat. Nos. 6,686,556, 6,630,113, 6,380,507; 6,215,678, 5,666,891, 5,798,497, 5,756,957, and U.S. Patent Application Nos. 2004/0251241, 2002/0144981. There are also a number of patents relating to different technologies for the gasification of coal for the production of synthesis gases for use in various applications, including U.S. Pat. Nos. 4,141,694; 4,181,504; 4,208,191; 4,410,336; 4,472,172; 4,606,799; 5,331,906; 5,486,269, and 6,200,430.

Prior systems and processes have not adequately addressed the problems that must be dealt with on a continuously changing basis. Some of these types of gasification systems describe means for adjusting the process of generating a useful gas from the gasification reaction. Accordingly, it would be a significant advancement in the art to provide a system that can efficiently gasify carbonaceous feedstock in a manner that maximizes the overall efficiency of the process, and/or the steps comprising the overall process.

Gas generated from a gasification reactor may contain heavy metal contaminants such as cadmium, mercury and lead. These heavy metals have emission limits, so before sending gas to downstream applications the heavy metals must be separated from the gas to meet the emission limits for these heavy metals. Examples of emission limits for heavy metals are as follows:

TABLE 1

Emission limits for heavy metals

| Heavy Metals | Emission Limits |
| --- | --- |
| Cadmium | 14 µg/Rm$^3$ |
| Lead | 142 µg/Rm$^3$ |
| Mercury | 20 µg/Rm$^3$ |

The composition of the raw gas resulting from coal gasification varies depending on the conditions under which the converter is operated. Common components in the raw gas include combustibles (CO and $H_2$), non-combustibles ($CO_2$, $N_2$ and $H_2O$), air pollutants (heavy metals, NOx, $H_2S$, HCl, tars), and entrained solids. Prior to use of the product gas for combustion, generation of electricity, or other applications, the product gas must be processed or refined in order to produce a gas with desired characteristics for the application. Such processing or refining generally involves the removal of heavy metals and acid gases from the product gas.

When the gas is generated from the conversion of municipal solid waste (MSW) in a gasification system the gas contains metal and metallic compounds in both combustible and non-combustible fractions. Normally, lead concentration in the waste is two orders of magnitude higher than cadmium and mercury. Distribution of heavy metals between various residues depends on MSW composition, physiochemical properties of metals and their metallic compounds and the gasification process operating conditions.

Metal compounds with high vapour pressure (Low boiling point) enter the atmosphere easily after being evaporated and are found mostly in product gas. Toxic heavy metal fumes result from volatilization of metallic constituents followed by the condensation of vapour. Since each load of MSW is different from the previous one, it is almost impossible to know the exact heavy metal concentration in the gasification process. An estimate of the average heavy metal concentration in gas generated from a gasification process is shown below.

TABLE 2

Estimate of Heavy Metal Concentration in Syngas

| Heavy Metal | Concentration in Syngas |
| --- | --- |
| Cadmium | 2.9-3.9 mg/Nm$^3$ |
| Lead | 106-147 mg/Nm$^3$ |
| Mercury | 1.3-1.7 mg/Nm$^3$ |

Gas conditioning systems for cleaning gas produced by gasification systems have been described. U.S. Patent Application No. 20040251241 describes the use of conventional gas cleaning technology that can be used to remove acid gases from a mixed gas stream.

U.S. Patent Application No. 20040031450 describes a gasification system that uses an acoustic pressure wave to cause agglomeration of particles contained within the combustion stream for easy removal. In one embodiment, a sulphur capturing agent is injected into the fluid channel for not only removing sulphur from the combustion product stream but for also facilitating particle agglomeration.

U.S. Patent Application No. 20040220285 describes a method and system for gasifying biomass. The resulting synthesis gas is passed through a saturation device and an absorption device, both of which are fed with oil. In this way the synthesis gas is scrubbed with oil and tar is substantially removed therefrom.

U.S. Patent Application No. 20040247509 describes a gas cleaning system for use at high temperatures (between about 1,200° F. to about 300° F.) to remove at least a portion of contaminants such as halides, sulphur, particulates, mercury and others from a syngas. The gas cleaning system may include one or more filter vessels coupled in series for removing halides, particulates, and sulphur from the syngas, and is operated by receiving gas at a first temperature and pressure and dropping the temperature of the syngas as the gas flows through the system. The particles removed by the first filter vessel can be sent to a collection hopper where they can be separated into char particles and sorbent particles. The char particles can be returned to the gasifier and the halide laden sorbent can be disposed of or recycled by adding it to the gas entering the first filter vessel. Return of the char particles to the gasifier will require an additional dedicated inlet for addition of the char particles. The gas cleaning system may be used for applications requiring clean syngas such as fuel cell power generation, IGCC power generation, and chemical synthesis.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a gas conditioning system. In accordance with an aspect of the present invention, there is provided a gas conditioning system for conditioning an input gas from one or more locations within a gasification system to provide a conditioned gas, said gas conditioning system comprising: (a) a first gas conditioner comprising one or more particle removal units for removing particulate matter from the input gas in a first conditioning stage to provide a conditioned gas and removed particulate matter; (b) a solid residue conditioner for receiving and processing said removed particulate matter to produce a secondary gas and solid waste; and (c) a second gas conditioner operatively associated with said solid residue conditioner, said second gas conditioner comprising a gas cooler and one or more further particle removal units for removing particulate matter from said secondary gas to provide a partially conditioned secondary gas, said second gas conditioner configured to pass said secondary gas through said gas cooler for cooling prior to entry of the secondary gas into the one or more further particle removal units and to pass said partially conditioned secondary gas to the first gas conditioner for further processing.

In accordance with another aspect of the invention, there is provided process for providing a conditioned gas from an input gas from one or more locations within a gasification system, said process comprising the following steps: (a) removing particulate matter from said input gas in a first gas conditioner in a first conditioning stage to provide a conditioned gas and removed particulate matter; (b) transferring the removed particulate matter to a solid residue conditioner and melting the removed particulate matter to produce a solid waste and a secondary gas; (c) conditioning said secondary gas in a second gas conditioner by cooling and removing particulate matter from said secondary gas to provide a partially conditioned secondary gas; and (d) transferring said partially conditioned secondary gas to said first gas conditioner for further conditioning.

BRIEF DESCRIPTION OF THE FIGURES

These and other features of the invention will become more apparent in the following detailed description in which reference is made to the appended drawings.

DETAILED DESCRIPTION OF THE INVENTION

Figure 1:
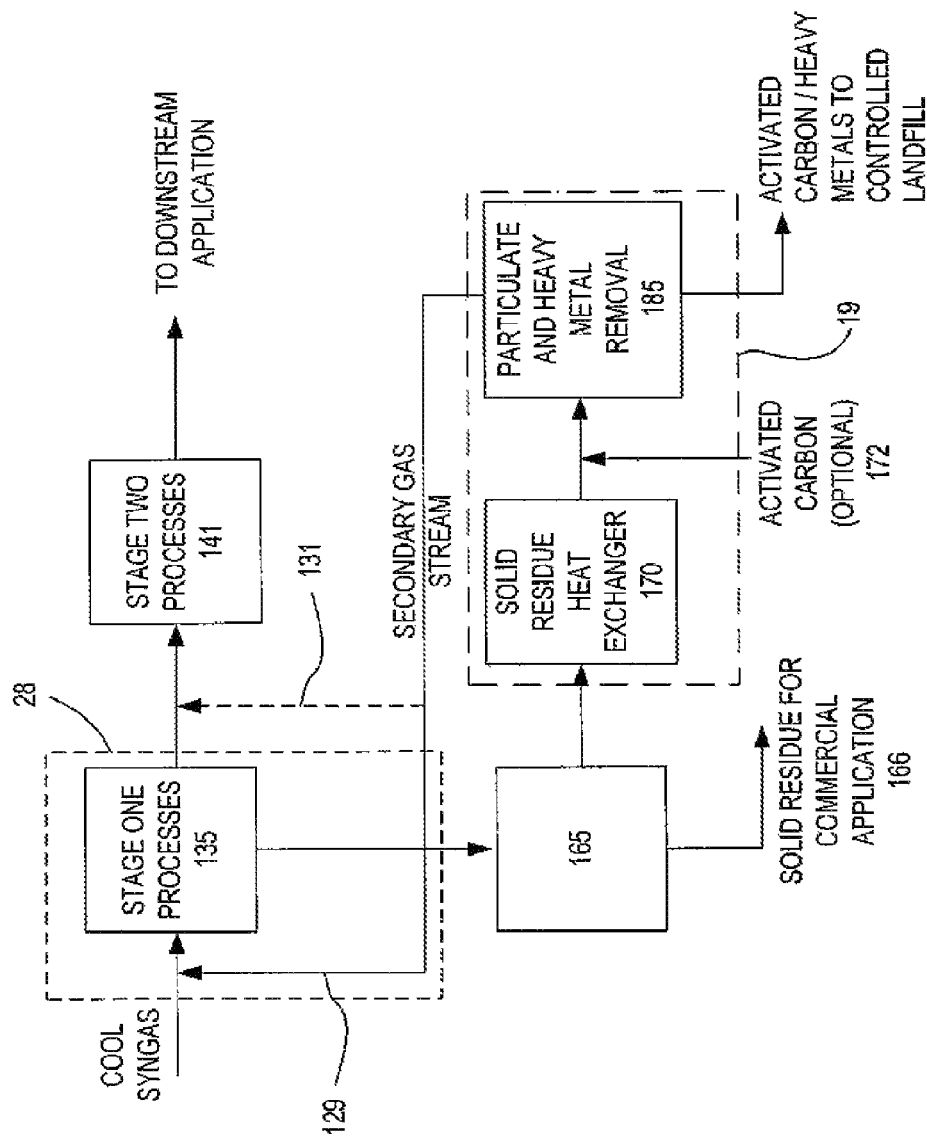
FIG. 1 presents a process flow diagram of a gas conditioning system (GCS) according to one embodiment of the invention.

The present invention provides a two-stage gas conditioning system (GCS) for conditioning gas generated at one or more locations within a gasification facility. The initial stage (Stage One) of the conditioning process comprises a dry phase separation of particulate matter from gas produced by a converter and the second stage (Stage Two) of the conditioning process comprises one or more further processing steps to provide a conditioned gas that meets the required and/or specified gas characteristics. In facilities where gas is generated in more than one location, the gas conditioning process can comprise separate and/or combinatory process streams. The GCS further comprises a control system to control and optimize the conditioning process.

In one embodiment of the present invention, the GCS comprises two integrated subsystems: a Converter gas conditioner (GC) and a Solid Residue gas conditioner (GC). The Converter GC processes gas emanating from one or more points in the main gasification chamber(s) (or "converter(s)"). The Solid Residue GC processes gas emanating from the melting of solid residue collected from the converter and, optionally, from the Converter GC.

In a specific embodiment, Stage One conditioning by the GCS further comprises the passing the particulate matter separated during this Stage into a solid residue conditioner that melts the particulate matter. In accordance with this embodiment, gas produced from the solid residue melting step is then passed through a Solid Residue GC. The solid residue conditioner can be a dedicated solid residue conditioner that receives particulate matter only from the Converter GC, or it can be a shared solid residue conditioner that receives particulate matter from the Converter GC and from the converter.

In one embodiment of the present invention, removal of particulate matter and at least a portion of the heavy metal contaminants in the dry Stage One conditioning processes and the additional processing of the particulate matter produced from the Stage One processes decreases the amount of hazardous waste that is generated during the conditioning process such that it is a small fraction by percentage or weight of the feedstock fed into the converter.

Definitions

Unless defined otherwise, all technical and scientific terms used herein have the same meaning as commonly understood by one of ordinary skill in the art to which this invention belongs.

As used herein, the term "partially conditioned gas" refers to gas that has been processed through Stage One of the gas conditioning system (GCS) of the invention.

As used herein, the term "contaminant" refers to a material, such as a compound, an element, a molecule, or a combination of molecules up to and including particulate matter, that are present in an input gas and are not desired in the final conditioned gas. The contaminants can be solid, liquid or gaseous. For example, when the input gas is a syngas produced from the conversion of carbonaceous feedstock into a gas product in a gasification system or converter, the input gas may contain contaminants such as sulphur, halide species, slag and char particulates, nitrogen species (such as ammonia and hydrogen cyanide), and heavy metals (such as mercury, arsenic, and selenium).

As used herein, the term "about" refers to approximately a +/−10% variation from the stated value.

The term "secondary gas stream," as used herein, refers to a gas that is generated in a solid residue conditioner from material (including, for example, particulate matter and heavy metal diverted from a converter gas conditioner) that is processed in said solid residue conditioner.

The terms "solid phase" and "dry phase," as used herein with respect to separation of contaminants from an input gas refers to a separation that is carried out without the addition of water or any aqueous solution and the contaminants are separated from the input gas in an essentially dry or solid form.

The term "wet phase" as used herein with respect to separation of contaminants or heavy metals/particulate matter from an input gas refers to a separation that is carried out with addition of water or an aqueous solution. This separation results in the separation of the contaminants including heavy metals/particulate matter into the water or aqueous solution.

Gas Conditioning System (GCS)

The present invention provides a gas conditioning system (GCS) for conditioning gas in a two-stage conditioning process and provides a final conditioned gas that has an appropriate composition for the desired downstream application. Stage One comprises one or more initial dry/solid phase separation steps followed by Stage Two, comprising one or more further processing steps. In general, in the dry/solid phase separation steps, a substantial proportion of the particulate matter and a large proportion of heavy metal contaminants are removed. In Stage Two, additional amounts of particulate matter and heavy metal contaminants as well as optionally other contaminants present in the gas are removed. Thus, the GCS comprises various components that carry out processing steps, separate particulate matter, acid gases, and/or heavy metals from the input gas and that, optionally, adjust the humidity and temperature of the gas as it passes through the GCS. The GCS further comprises a control system to control and optimize the overall conditioning process.

The GCS receives an input gas, directly or indirectly, from one or more locations within the gasification system and treats it through Stage One and Stage Two processes to produce a conditioned gas having a desired composition. The GCS can be configured to produce a conditioned gas that is suitable for use in downstream applications including, for example, as a fuel source for internal combustion engines, steam-injected gas turbines, combustion turbine engines, and fuel cell technologies; for the synthesis of chemicals such as ethanol, methanol, and hydrocarbons, and of gases such as hydrogen, carbon monoxide, methane.

In one embodiment, the components of the GCS and the order of each of the processing steps are selected to minimize generation of hazardous waste that must be treated and/or disposed of. The presence and sequence of the processing steps can be selected, for example, based on the composition of the input gas and the composition of the conditioned gas required for the selected downstream application.

The GCS can be incorporated into any gasification facility wherein gas that requires conditioning is generated at one or more points in the gasification system. As noted above, in one embodiment, the GCS comprises two integrated subsystems: a Converter GC and a Solid Residue GC. The Solid Residue GC processes gas emanating from the solid residue using the same or similar processing steps as the Converter GC, i.e. Stage One processing accomplishes the removal of at least a portion of heavy metals and the majority of the particulate matter from the gas, followed by Stage Two processing to provide a conditioned gas that meets the downstream gas quality specifications.

Figure 2:
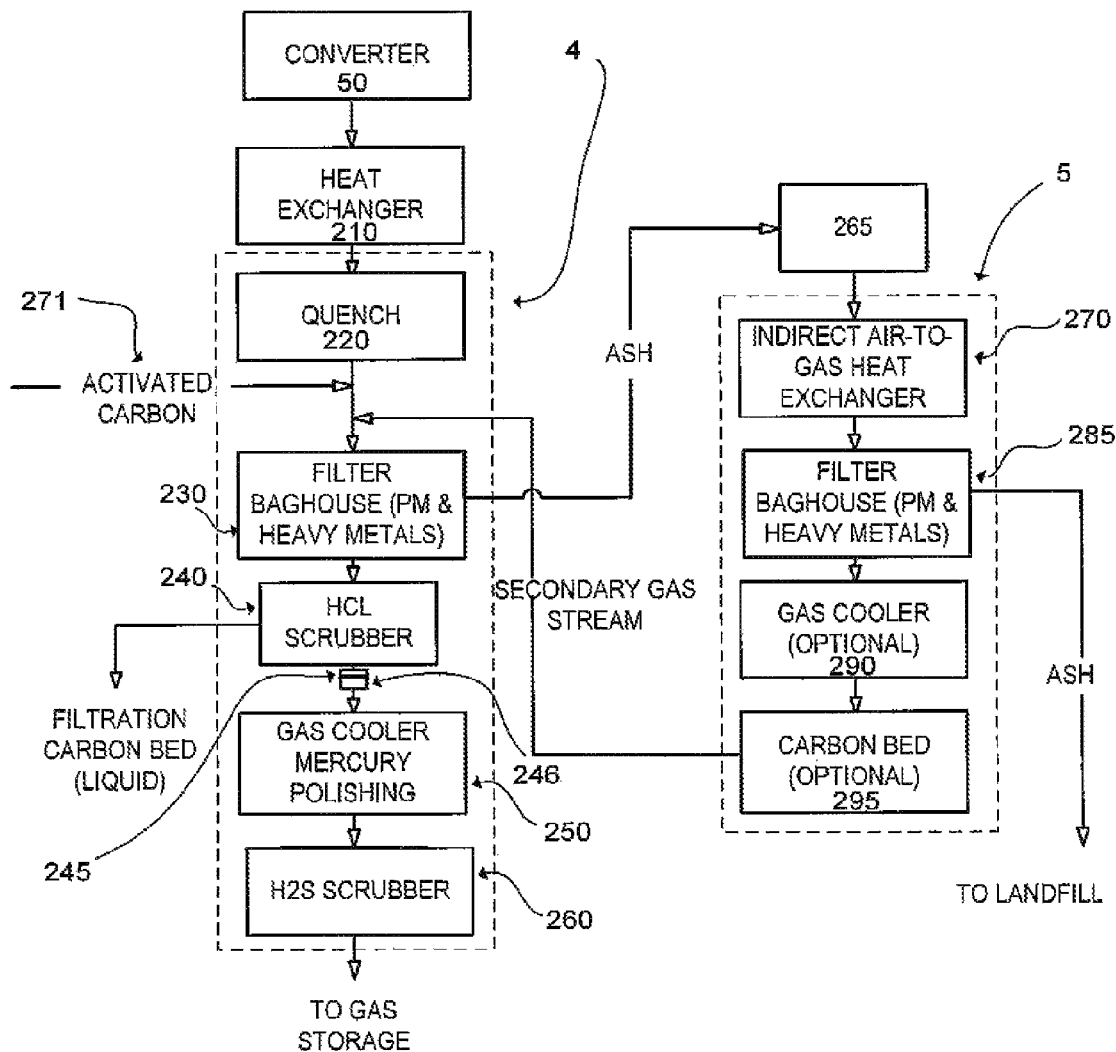
FIG. 2 depicts a process flow diagram of a GCS according to one embodiment of the invention.

In accordance with this embodiment, the Converter GC and the Solid Residue GC can operate in parallel wherein both subsystems are capable of conducting both Stage One and Stage two processes, or the two subsystems can operate in a convergent manner, wherein they share some or all of the components for Stage Two processing. One embodiment of the invention in which the two subsystems operate in a convergent manner is depicted in FIG. 2 and described in detail in Example 1.

In some embodiments, the particulate matter separated in Stage One can be further processed to reduce the amount of hazardous material that must be handled. FIG. 1 depicts a specific embodiment of the present invention in which Stage One further comprises transferring the solid matter from the particulate and heavy metal removal step of the Converter GCS Stage One processing 135 to a solid residue conditioning chamber 165 where it can be melted and captured within inert slag 166. Gas from the melting step is then passed through a Solid Residue GCS 19, which comprises a gas cooler 170 and heavy metal and particulate matter removal 185. Activated carbon and/or other sorbents can optionally be added at 172 prior to particulate matter removal. The partially conditioned gas is then returned to the Converter GCS 28 either at 129 prior to the Stage One processing 135, or at 131 after the Stage One processing 135, for Stage Two processing 141. Alternatively, in one embodiment, the Solid Residue GC 19 can comprise components for parallel Stage Two processing.

In one embodiment of the present invention, the amount of hazardous waste produced by the GCS is less than about 5% of the weight of carbonaceous feedstock used. In one embodiment, the amount of hazardous waste produced is less than about 2% of the weight of carbonaceous feedstock used. In one embodiment, the amount of hazardous waste produced is less than 1% of the weight of carbonaceous feedstock used. In one embodiment, the amount of hazardous waste produced is between about 1 kg and about 5 kg per 1 tonne of carbonaceous feedstock used. In one embodiment, the amount of hazardous waste produced is between about 1 kg and about 3 kg per 1 tonne of carbonaceous feedstock used. In one embodiment, the amount of hazardous waste produced is between about 1 kg and about 2 kg per 1 tonne of carbonaceous feedstock used.

Various non-limiting embodiments of the GCS of the present invention are shown in FIGS. 1 to 9 and described below in Examples 1-11, 13 and 14.

Figure 3:
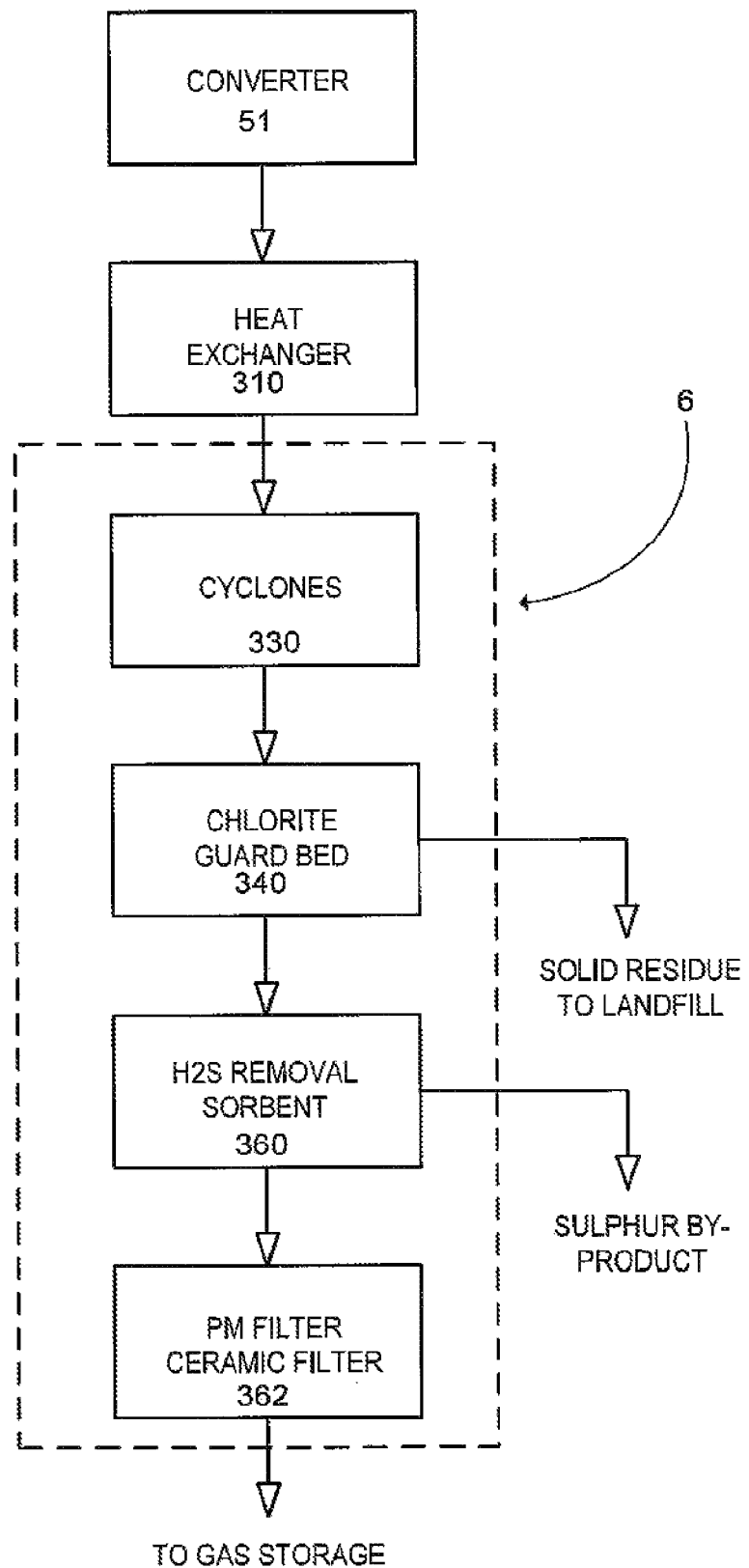
FIG. 3 depicts a process flow diagram of a GCS according to one embodiment of the invention.

The GCS can be configured for use with either a high temperature gasification system or a low temperature gasification system. One embodiment of a GCS configured for use with a high temperature gasification system is illustrated in FIG. 3 and described in Example 3, below. GCSs capable of operating at high temperatures, for example, in which contaminants are removed at temperatures above 700° C., can be useful where large capacity applications are required.

Figure 6:
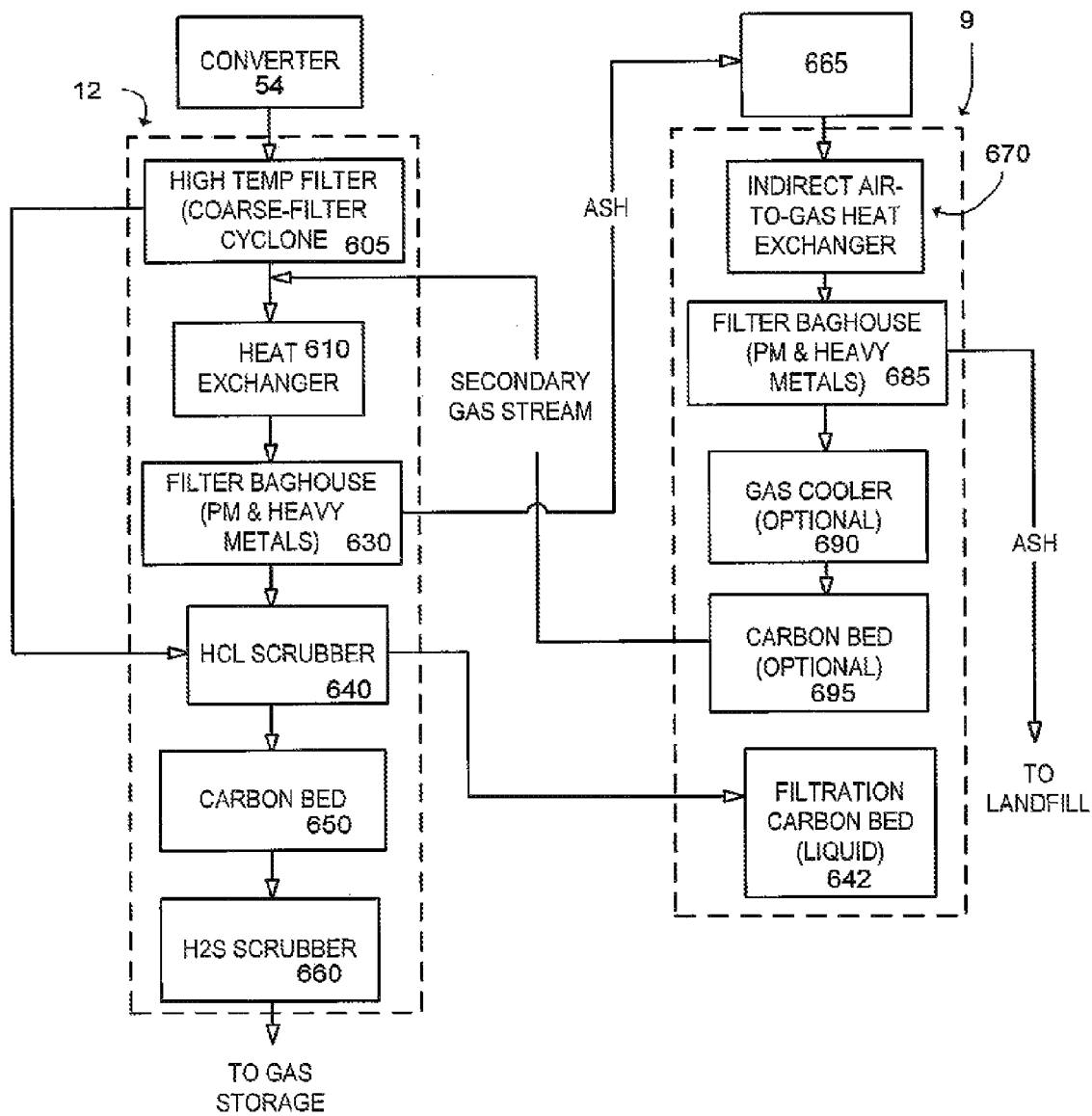
FIG. 6 depicts a process flow diagram of a GCS according to one embodiment of the invention.

The GCS can be configured such that one or more processing step is conducted using input gas at high temperature, with subsequent steps being conducted at lower temperatures. One embodiment of a GCS configured to conduct at least one processing step at high temperature is shown in FIG. 6 and described in Example 6, below.

In one embodiment of the present invention, the GCS is configured for use with a low temperature gasification system. In one embodiment of the present invention, the first processing step employed by the GCS in Stage One takes place below about 750° C. In one embodiment, the first processing step in Stage One takes place below about 700° C. In one embodiment, the first processing step in Stage One takes place below about 600° C. In one embodiment, the first processing step in Stage One takes place below about 500° C. In one embodiment, the first processing step in Stage One takes place below about 400° C. In one embodiment, the first processing step in Stage One takes place below about 300° C. In one embodiment, the first processing step in Stage One takes place below about 275° C. In one embodiment, the first processing step in Stage One takes place below about 260° C.

In one embodiment, the majority, i.e. more than half, of the Stage One and Stage Two processes employed by the GCS take place at low temperature, for example, at or below about 750° C. In one embodiment, the majority of the Stage One and Stage Two processes take place below about 700° C. In one embodiment, the majority of the Stage One and Stage Two processes take place below about 400° C. In one embodiment, the majority of the Stage One and Stage Two processes take place below about 300° C. In one embodiment, the majority of the Stage One and Stage Two processes take place below about 275° C. In one embodiment, the majority of the Stage One and Stage Two processes take place below about 260° C. In one embodiment, the majority of the Stage One and Stage Two processes take place below about 240° C. In one embodiment, the majority of the Stage One and Stage Two processes take place below about 200° C. In one embodiment, the majority of the Stage One and Stage Two processes take place below about 100° C.

In one embodiment, the GCS is operated at a pressure close to atmospheric.

Input Gas

In general, the GCS is configured for the conditioning of an input gas that is a gas produced from the conversion of carbonaceous feedstock, including, but not limited to, municipal solid waste, coal, biomass, and the like, into a gas product in a gasification system (or "converter"). Typically, the main components of the gas as it leaves a gasification system are carbon monoxide, nitrogen, carbon dioxide, hydrogen, and water. Much smaller amounts of methane, ethylene, hydrogen chloride and hydrogen sulfide may also be present.

The exact proportions of the different chemical constituents depend on the type of feedstock used. For example, gas produced from coal (which is generally considered to be a relatively even composition of carbonaceous feedstock compared to municipal solid waste), under a specific set of operating conditions, can yield 26% carbon monoxide, 11.5% carbon dioxide, 28% hydrogen and about 31% water vapour. Gasification of sub-bituminous coal (23.1 MJ/kg-25.1% moisture content), under another set of operating conditions, yields 18.2%, 6.9%, 17.8% and 15.1%, carbon monoxide, carbon dioxide, hydrogen and water, respectively. As known in the art, there are several different types of coal, ranging from peat to lignite (moisture around 70%, energy content around 8-10 MJ/kg), to black coal (moisture around 3% and energy content about 24-28 MJ/kg) to anthracite (virtually no moisture and energy content up to about 32 MJ/kg), that may each exhibit substantial variability in the product gas.

In cases where a gas is generated by the gasification of carbonaceous feedstock, there exists certain amounts of contaminants which are not suitable for normal and safe use of the gas in downstream applications. Accordingly, in one embodiment, the GCS of the present invention is used to convert gas generated within a gasification converter into a gas substantially diminished in the amounts of particulate matter, unwanted chemical contaminants such as acids, toxic chemicals (mercury, cadmium, and the like) and other substances. Effective removal of these impurities will render the gas suitable for use in downstream applications. In some applications it is desired that the output gas is clean and dry.

Stage One: Dry Phase Removal of Particulate Matter and Heavy Metals

Stage One of the GCS comprises components for implementing one or more dry or solid phase processing steps that remove at least a portion of the heavy metals and a majority of the particulate matter from the input gas. Suitable solid phase processing steps are known in the art, and non-limiting examples of means suitable for implementing such steps are described below. In one embodiment, the portion of the heavy metals and majority of the particulate matter from the input gas are removed from the input gas in a dry or solid form.

For example, heavy metal removal can be achieved using one or more solid phase separation components known in the art. Non-limiting examples of such solid phase separation components include dry injection systems, particle removal units, activated carbon filtration components, and components that allow contact with specialized sorbents, such as zeolites and nanostructures. Selected representative examples are described in additional detail below. As is known in the art, these particulate separation components can be used to remove or separate particulate matter/heavy metals in the solid/dry phase, for example, in dry injection processes, activated carbon filtration, dry scrubbing, various particle removal processing steps and other dry or solid phase processing steps known in the art.

Figure 12:
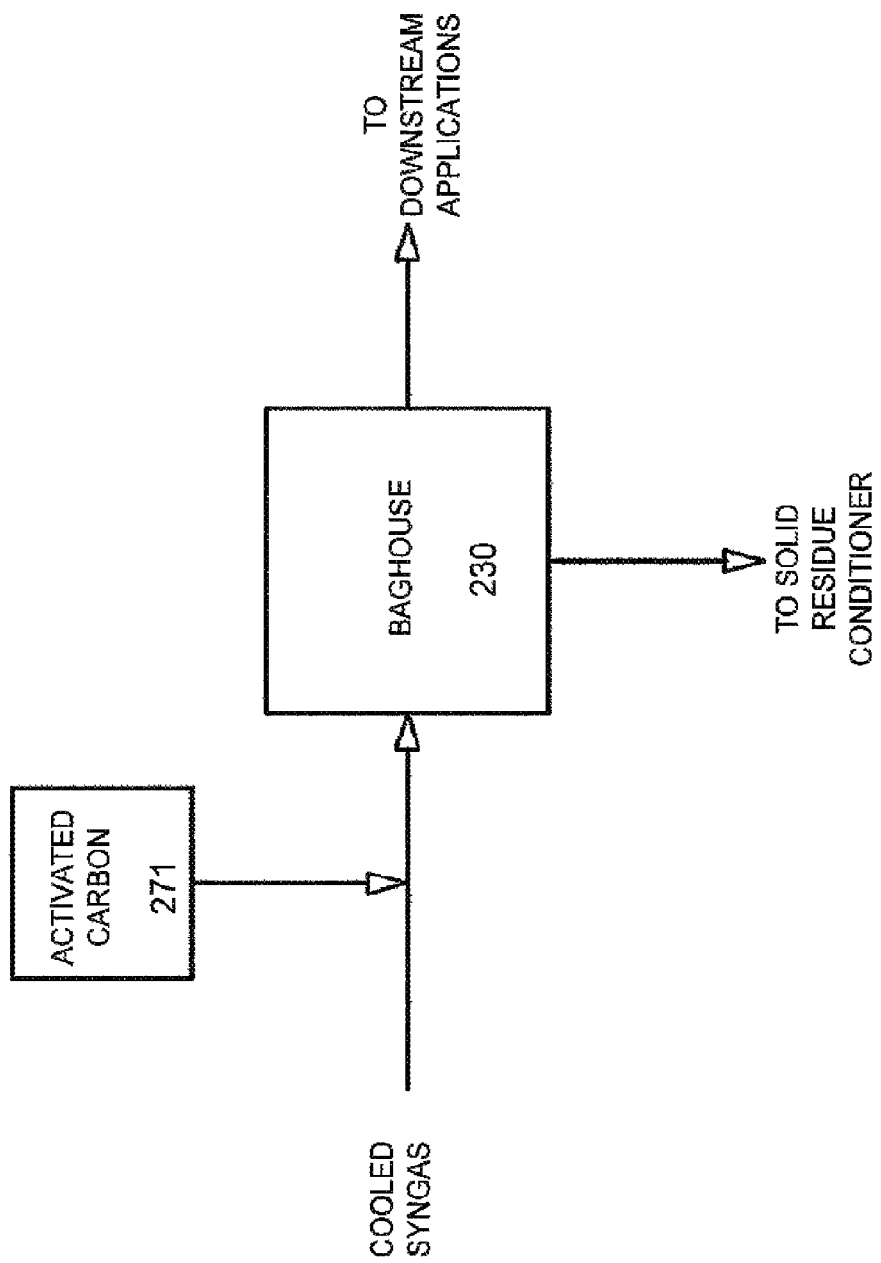
FIG. 12 presents an exemplary schematic diagram of a portion of a GCS according to an embodiment of the invention, showing a dry injection system in combination with a particle removal means.

In one embodiment of the present invention, Stage One of the GCS comprises at least one particle removal units. In another embodiment, Stage One of the GCS comprises one or more particle removal units and at least one other component for implementing dry or solid phase processing steps. In one embodiment, Stage One of the GCS comprises a dry injection system and one or more particle removal units. FIG. 12 depicts Stage One of a GCS according to one embodiment of the invention, in which Stage One comprises a dry injection system 271 and a baghouse 230 for particulates removal. The solid residue removed in the baghouse is transferred to a solid residue conditioner.

In embodiments where the input gas is a syngas exiting from a plasma gasification converter, the syngas can have a significant amount of particulate matter based on superficial velocity inside the converter. Thus, the GCS according to one embodiment of the present invention comprises particle removal unit(s) to remove particulate matter that may become entrained in the syngas exiting the gasification system. In one embodiment in which coal is being used as a feedstock in a plasma gasification converter, the GCS comprises at least one particle removal unit.

Selection of the appropriate Stage One processing steps can be readily determined by one skilled in the art based on, for example, the composition of the input gas, the temperature of the input gas, the desired composition of the final conditioned gas, the end use of the composition gas, as well as cost considerations and equipment availability. Stage One of the GCS can optionally comprise one or more gas coolers if required, for example, when the input gas is of high temperature and the selected Stage One processes operate optimally at a lower temperature.

As noted above, Stage One of the GCS provides for removal of the majority of the particulate matter and at least a portion of the heavy metal contaminants present in the input gas. In one embodiment, at least about 70% of the particulate matter present in the input gas is removed in Stage One. In one embodiment, at least about 80% of the particulate matter present in the input gas is removed in Stage One. In one embodiment, at least about 90% of the particulate matter present in the input gas is removed in Stage One. In one embodiment, at least about 95% of the particulate matter present in the input gas is removed in Stage One. In one embodiment, at least about 98% of the particulate matter present in the input gas is removed in Stage One. In one embodiment, at least about 99% of the particulate matter present in the input gas is removed in Stage One. In one embodiment, 99.5% of the particulate matter present in the input gas is removed in Stage One.

In one embodiment, at least about 50% of the heavy metal contaminants present in the input gas are removed in Stage One. In one embodiment, at least about 60% of the heavy metal contaminants present in the input gas are removed in Stage One. In one embodiment, at least about 70% of the heavy metal contaminants present in the input gas are removed in Stage One. In one embodiment, at least about 80% of the heavy metal contaminants present in the input gas are removed in Stage One. In one embodiment, about 90% of the heavy metal contaminants present in the input gas are removed in Stage One.

Dry Injection

Dry injection processes are known in the art and generally utilize a calculated amount of a suitable sorbent which is injected in the gas stream with enough residence time so that fine heavy metal particles and fumes can adsorb on the surface of the sorbent. Heavy metals adsorbed on sorbent can be captured by a particle removal such as those described below, which removes heavy metals/particulate matter in the dry/solid phase and prevent it from moving through the GCS along with the input gas. In one embodiment of the invention, the heavy metal particles adsorbed onto a suitable sorbent are captured using a baghouse filter.

Examples of suitable sorbents include, but are not limited to, activated carbon; promoted-activated carbon impregnated with iodine, sulphur, or other species; feldspar; lime; zinc-based sorbents; sodium-based sorbents; metal oxide based sorbents; and other physical and chemical adsorbents known in the art that are capable of effectively removing heavy metals such as mercury, arsenic, selenium and the like. The sorbents may be a mesh size varying between a maximum size of about a 60 mesh size and minimum size of about a 325 mesh size.

Injection is generally through a sorbent input means, such as a port, nozzle or tube, and can be achieved by gravity, locked hopper, or screw conveyor. The present invention also contemplates that the sorbent can be provided within pipes that make up the GCS, for example in a pipe leading to a particle removal means, to be mixed with the input gas as it passes through the pipe. Other methods known in the art are also included.

The sorbents can be stored in one or more holding containers from which the sorbent(s) are delivered to the input means. The sorbent holding containers can be part of the GCS or can be external to the GCS.

The GCS can comprise multiple sorbent input means or a single sorbent input means. In those embodiments that comprise multiple sorbent input means, each input means can add, or a sub-set of the input means can each add, the same amount of sorbent. Alternatively, each input means can add, or a sub-set of the input means can each add, a different amount of sorbent. Similarly, each input means can add, or a sub-set of the input means can each add, the same sorbent. Alternatively, each input means can add, or a sub-set of the input means can each add, a different sorbent. For example, each input means can add a different ratio of sorbent, with the goal of removing contaminants from the input gas an economical and technical method, such as using both feldspar and activated carbon as sorbents. In this case, removal of tars with feldspar, can make the activated carbon more effective in removing mercury. The determination of the amount and type of sorbent(s) to use can be readily determined by one of skill in the art based on the contaminants present in the input gas and the desired constitution of the output gas.

As noted above, various combinations of sorbents can be injected into the input gas by dry injection and suitable combinations can be readily determined by one of skill in the art based on, for example, the composition of the input gas. For example, activated carbon is useful when the mercury present in the input gas is in non-elemental form; feldspar can be useful for input gases containing tar; combinations of feldspar and activated carbon In one embodiment, feldspar is injected into the input gas. In one embodiment, activated carbon is injected into the input gas. In one embodiment, feldspar is used as a pre-coat for the particle removal means. In one embodiment, activated carbon is injected into the input gas, and the particle removal means are precoated with feldspar. In one embodiment, feldspar is continuously injected into the system.

Activated Carbon Filtration

Activated carbon filtration employing an activated carbon filter bed or a fluidized bed can be used as remove particulate matter or heavy metals from the input gas. Input gas can be passed through an activated carbon bed that adsorbs heavy metals (mainly mercury) from the gas stream.

As is known in the art, the efficiency and/or effectiveness of carbon bed filters changes depending on the characteristics of the input gas, such as, for example, the temperature and/or humidity of the input gas. Typically, carbon bed filters are more efficient at lower temperatures, for example less than about 70° C., and/or if the relative humidity of the input gas is less than about 60%. Thus, in one embodiment of the present invention, in which a carbon bed filter is employed, the input gas is submitted to a cooling and/or humidity control processing step prior to passing through the filter bed.

As is known in the art, the use of activated carbon beds to remove large amounts of particulate matter can be less efficient than other processes as particulate matter may build up in low flow areas and pressure drop changes may occur as particulate matter fills the carbon bed. As such, in one embodiment of the present invention, an activated carbon bed is used in Stage One processing in conjunction with another dry processing step that can facilitate the removal of heavy metals and/or particulates from the input gas prior to it entering the activated carbon bed. In another embodiment of the present invention, an activated carbon bed is used in Stage Two processing, as described below.

Dry Scrubbing

Dry scrubbing is another processing step that is carried out in the dry phase, and is a processing step that removes sulphur, and optionally particulate matter and small amounts of mercury, from the input gas.

In a dry scrubbing process, particles of an alkaline sorbent are injected into a gas, producing a dry solid by-product. The absorbent employed in the dry scrubbing process can be characterized as either "once-through" or regenerable. Dry scrubbers systems can be grouped into three categories: spray dryers, circulating spray dryers, and dry injection systems.

In a spray dryer, a slurry of alkaline sorbent, such as lime or a sodium based sorbent, is atomized into the input gas to absorb the contaminants. The resulting dry material, including fly ash, is collected by a downstream particle removal means, such as an electrostatic precipitator or fabric filter. Spray dryers commonly are designed for $SO_2$ removal efficiencies of about 70 to about 95%.

A circulating dry scrubber uses an entrained fluidized bed reactor for contacting a sorbent, such as hydrated lime, with input gas. The intensive gas-solid mixing that occurs in the reactor promotes the reaction of sulphur oxides in the gas with the dry lime particles. The mixture of reaction products (calcium sulphite/sulphate), unreacted lime, and fly ash is carried to a downstream particle removal means. Water spray can be introduced into the fluidized bed separately to enhance performance, for example, to maximise $SO_2$ capture with minimum lime utilization by optimizing the surface moisture content of the lime. Circulating dry scrubbers can provide removal efficiencies of more than about 90%.

Dry scrubbing can also employ dry injection processes, such as those described above, which involve the injection of a dry sorbent, such as soda ash, lime or limestone, into the input gas and subsequent collection of the contaminant-laden sorbent in a downstream particle removal means. Dry injection systems typically have removal efficiencies ranging from 50-70%.

Particle Removal Units and Processes

In one embodiment, the GCS of the present invention includes one or more particle removal units which act to remove particulate matter from the input gas. Particle removal means can also remove heavy metals, such as elemental mercury, from the input gas. In embodiments where dry injection is employed in the GCS, the one or more particle removal units also serve to remove contaminant-laden sorbents from the input gas.

Examples of suitable particle removal units include, but are not limited to, cyclone separators or filters, high temperature ceramic filters, moving bed granular filters, baghouse filters, and electrostatic precipitators (ESP). In one embodiment of the present invention, the GCS comprises one or more particle removal units selected from a cyclone filter, a high temperature ceramic filter and a baghouse filter. In one embodiment, the GCS comprises a particle removal unit that can remove particulate matter with 99.9% efficiency from input gas with as much as 10 g/Nm3 particulate loading.

As is known in the art, the choice of particle removal unit will depend on, for example, the temperature of the input gas, the size of the particulate matter to be removed, and, when applicable, the type of sorbent injected into the gas stream. Suitable particle removal units can be readily selected by one of skill in the art.

As noted above, the particle removal units can be selected based on the size of the particulates to be removed. For example, in one embodiment, the GCS comprises a cyclone separator or filter to remove coarse particles (i.e. those greater than about 10 microns in size). In another embodiment, in which the temperature of the input gas is relatively high, for example, above about 700° C., the GCS comprises a cyclone filter. By way of example, the separation efficiency for high temperature cyclone at various particle sizes is: 17.0% @ 2.5

μm, 39.3% @ 3.0 μm, 62.0% @ 3.5 μm, 79.0% @ 4.0 μm, 93.7% @ 6.0 μm and 98.5% @ 11.0 μm.

In another embodiment of the present invention, the GCS comprises an ESP or a baghouse filter for removal of smaller or finer particles, for example, those less than about 1 μm. As is known in the art, ESP is driven by an electrostatic field and, therefore, when used with gas streams of high oxygen content should include control mechanisms to trip the current if the oxygen content reaches a specified level.

Cloth collectors such as baghouse filters can collect particles of a size down to about 0.01 microns, depending on the type of filter employed. Baghouse filters are typically fabric filters, cellulose filters or organic polymer-based filters. Other examples of filters that can be used in a baghouse context include, but are not limited to, lined and unlined fiberglass bags, Teflon lined bags and P84 basalt bags. Suitable filters can be readily selected by those of skill in the art based on considerations such as, one or more of the temperature of the input gas, the moisture levels in the baghouse and in the input gas, the electrostatic nature of the particles in the input gas, acid and/or alkali chemical resistance of the filter, the ability of the filter to release the filter cake, filter permeability and the size of the particles.

In one embodiment of the present invention, the GCS comprises a baghouse filter and is configured such that the temperature of the gas entering the baghouse is between about 180° C. and about 280° C. As is known in the art, operating a baghouse filter at a higher temperature can decrease the risk of tars in the input gas plugging the filters and reducing efficiencies. Higher temperatures can reduce the efficiency of particle removal by the baghouse filters, for example, increasing the operating temperature from 200° C. to 260° C. decreases particle removal efficiency from 99.9% to 99.5%. Thus, when higher operating temperatures are selected for a baghouse filter comprised by the GCS, the GCS can comprise additional downstream components, either in Stage One or Stage Two, to capture remaining particulates. For example, wet scrubbers and activated carbon beads can be included for removal of particulates in addition to other contaminants. In one embodiment of the present invention in which the GCS comprises a baghouse filter, the GCS is configured such that the temperature of the gas entering the baghouse is between about 250° C. and about 260° C. In another embodiment in which the GCS comprises a baghouse filter, the GCS is configured such that the temperature of the gas entering the baghouse is between about 190° C. and about 210° C.

In one embodiment of the present invention, Stage One of the GCS comprises one particle removal unit for removal of particulate matter. In one embodiment of the present invention, Stage One of the GCS comprises two particle removal units for removal of particulate matter. In one embodiment of the present invention, Stage One of the GCS comprises a first particle removal unit for removal of coarse particles, and a second particle removal unit for removal of smaller or finer particles. In one embodiment of the present invention, Stage One of the GCS comprises a cyclone filter as a first particle removal unit, which can remove particles larger than about 5 to about 10 microns in size. In one embodiment of the present invention, Stage One of the GCS comprises a baghouse filter as a first particle removal unit. In one embodiment of the present invention, Stage One of the GCS comprises a baghouse filter as a second particle removal unit.

Optional Gas Cooler

As noted above, the performance of a given particle removal unit may be influenced by the temperature of the input gas. As such, depending on the specific particle removal unit employed, a gas cooling system may be used to cool the input gas before it enters the particle removal unit. For example, as is known in the art, cooling of the input gas may be of particular importance when a baghouse type filter is used for particulate removal, since baghouse type filters often cannot withstand extremely high temperatures.

In accordance with one embodiment of the present invention, the GCS is configured to process input gas for which the temperature has been reduced by passing the input gas through a gas cooler prior to entry into the GCS. In another embodiment of the present invention, the GCS comprises one or more gas coolers for reducing the temperature of the input gas prior to entry into Stage One processing. In another embodiment, Stage One of the GCS is configured to process input gas the temperature of which has been reduced initially by a gas cooler external to the GCS and then further by a gas cooler comprised by the GCS. Suitable gas coolers for incorporation into the GCS are known in the art and include, but are not limited to, heat exchangers, quenchers and the like. Other options for the gas coolers are described below in the section "Additional Options."

Solid Residue Conditioner

The GCS can optionally comprise a solid residue conditioner for receiving and melting the solid residue produced during Stage One processing. The residue conditioner can be a dedicated residue conditioner that receives solid residue from Stage One processes of the GCS only, or it can be shared, for example, with other components of a gasification system. In one embodiment, the solid residue conditioner is shared with a gasifier and, thus, receives solid residue both from the Stage One processes of the GCS and from the gasification reaction that takes place in the gasifier.

The solid residue conditioning process is accomplished by raising the temperature of the residue in the conditioner to the level required to melt the residue to form a vitreous material that cools to a dense solid. The high temperature also converts carbon in the residue to a residue gas having a heating value. The solid residue conditioner, therefore, comprises a suitable heat source for melting the solid residue, such as, for example, a thermal lamp, joule heater or plasma heat. In one embodiment, the solid residue conditioner comprises a source of plasma heat, for example, one or more plasma torches.

The solid residue conditioner comprises a conditioning chamber adapted to i) receive the solid residue, ii) heat the solid residue to form a molten slag material and a gaseous product having a heating value, and exhaust the molten slag and gaseous product. Accordingly, the solid residue conditioning chamber comprises a refractory-lined chamber having a solid residue inlet, a gas outlet, a slag outlet, and a heat source. The solid residue conditioning chamber further optionally includes one or more air and/or steam inlets.

The molten slag, at a temperature of, for example, about 1200° C. to about 1800° C., may periodically or continuously be output from the conditioning (or residue) chamber and thereafter cooled to form a solid slag material. Such slag material may be intended for landfill disposal or may further be broken into aggregates for conventional uses. Alternatively, the molten slag can be poured into containers to form ingots, bricks tiles or similar construction material. The resulting slag material may also be used as a supplementary cementing material in concrete, in the production of a lightweight aggregate or mineral wool, in the manufacture of foam glass, or in the development of packaging materials. The composition of the resulting slag material may be controlled through the addition of process additives to change melting point and/or other properties of the slag. Such solid process additives may include, but are not limited to silica, alumina, lime or iron. The solid residue conditioner is therefore operatively associated with a subsystem for cooling the molten slag to its solid form. The slag cooling subsystem is provided as appropriate to afford the cooled slag product in the desired format.

In one embodiment, the residue conditioning chamber is designed to ensure that the residue conditioning process is carried out efficiently and completely, in order to use a minimum amount of energy to effect complete conditioning of the residue. Accordingly, factors such as efficient heat transfer, adequate heat temperatures, residence time, molten slag flow, input residue volume and composition, and size and insulation of the chamber are taken into account when designing the residue conditioning chamber. The chamber is also designed to ensure that the residue conditioning process is carried out in a safe manner. Accordingly, the system is designed to isolate the residue conditioning environment from the external environment.

The residue conditioning chamber is provided with a heat source, such as a plasma heat source, that meets the required temperature for heating the residue to levels required to convert any remaining volatiles and carbon to a gaseous product having a heating value and to melt and homogenize the residue to provide a molten slag at a temperature sufficient to flow out of the chamber. The chamber is also designed to ensure highly efficient heat transfer between the plasma gases and the residue, to minimize the amount of sensible heat that is lost via the product gas. Therefore, in one embodiment, the type of plasma heat source used, as well as the position and orientation, of the plasma heating means are additional factors to be considered in the design of the residue conditioning chamber.

The residue conditioning chamber is also designed to ensure that the residue residence time is sufficient to bring the residue up to an adequate temperature for melting and homogenization, and to fully convert the carbon to the gaseous product. Accordingly, the chamber is provided with a reservoir in which the residue accumulates while being heated by the heat source. The reservoir also allows mixing of the solid and molten materials during the conditioning process. Sufficient residence time and adequate mixing ensures that the conditioning process is completely carried out, and that the resulting slag and gaseous products have the desired composition.

The chamber is designed for continuous or intermittent output of the molten slag material. Continuous slag removal allows the conditioning process to be carried out on a continual basis, wherein the residue to be conditioned may be continuously input and processed by the plasma heat, without interruption for periodic slag removal.

Figure 21:
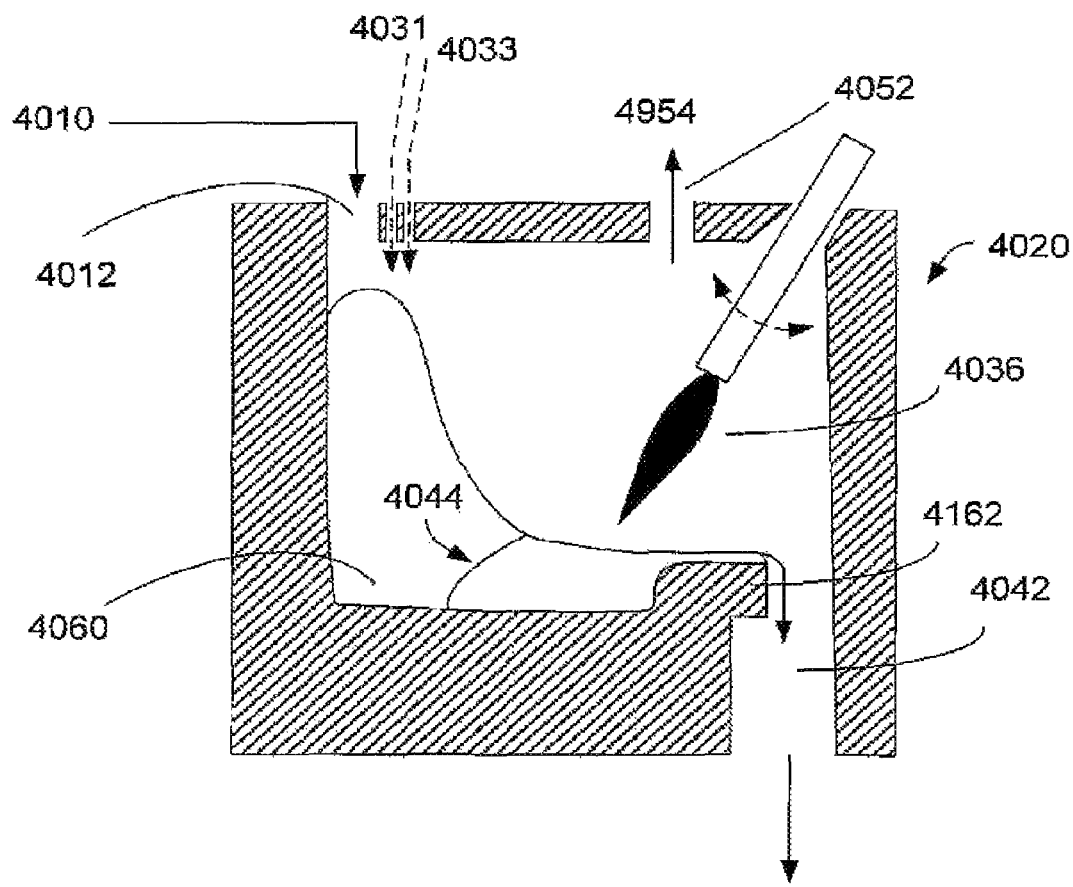
FIG. 21 is a schematic representation of a solid residue conditioning chamber that can be incorporated into the GCS in one embodiment of the present invention.

In one embodiment, continuous slag exhaust is achieved by using a reservoir bounded on one side by a weir that allows the slag pool to accumulate until it exceeds a certain level, at which point the molten slag runs over the weir and out of the chamber. In the embodiment depicted in FIG. 21, the residue 4010 drops through a residue inlet 4012 located at the top of the conditioning chamber 4020 into a reservoir 4060, where it is conditioned by a plasma torch plume 4036. The molten materials are held in the reservoir 4060 by a weir 4162 until the pool 4044 reaches the top of the weir. Thereafter, as additional residue enters the system and is conditioned, a corresponding amount of molten material overflows the weir and out of the chamber through a slag outlet 4042. A residue gas product 4954 exits the chamber via a gas outlet 4052.

Where the residue being conditioned contains a significant amount of metal, and the residue conditioning chamber comprises a reservoir bounded by a weir, the metals, due to their higher melting temperature and density, typically accumulate in the reservoir until such time as they are removed. Accordingly, in one embodiment of the present invention, the reservoir is optionally provided with a metal tap port, whereby the tap port is plugged with a soft refractory paste which may be periodically removed using the heat from an oxygen lance. Once the tap port has been opened and the chamber temperature has been raised sufficiently to melt the accumulated metals, the molten metals are tapped off from the bottom of the reservoir.

In one embodiment, the reservoir itself may also be provided with a slag outlet adapted for continuous exhaust of the molten slag. In one embodiment, the reservoir may also provide for intermittent slag removal, wherein the reservoir is designed to allow the accumulation of molten materials until the conditioning process is complete, at which point the molten slag is exhausted.

Figure 23:
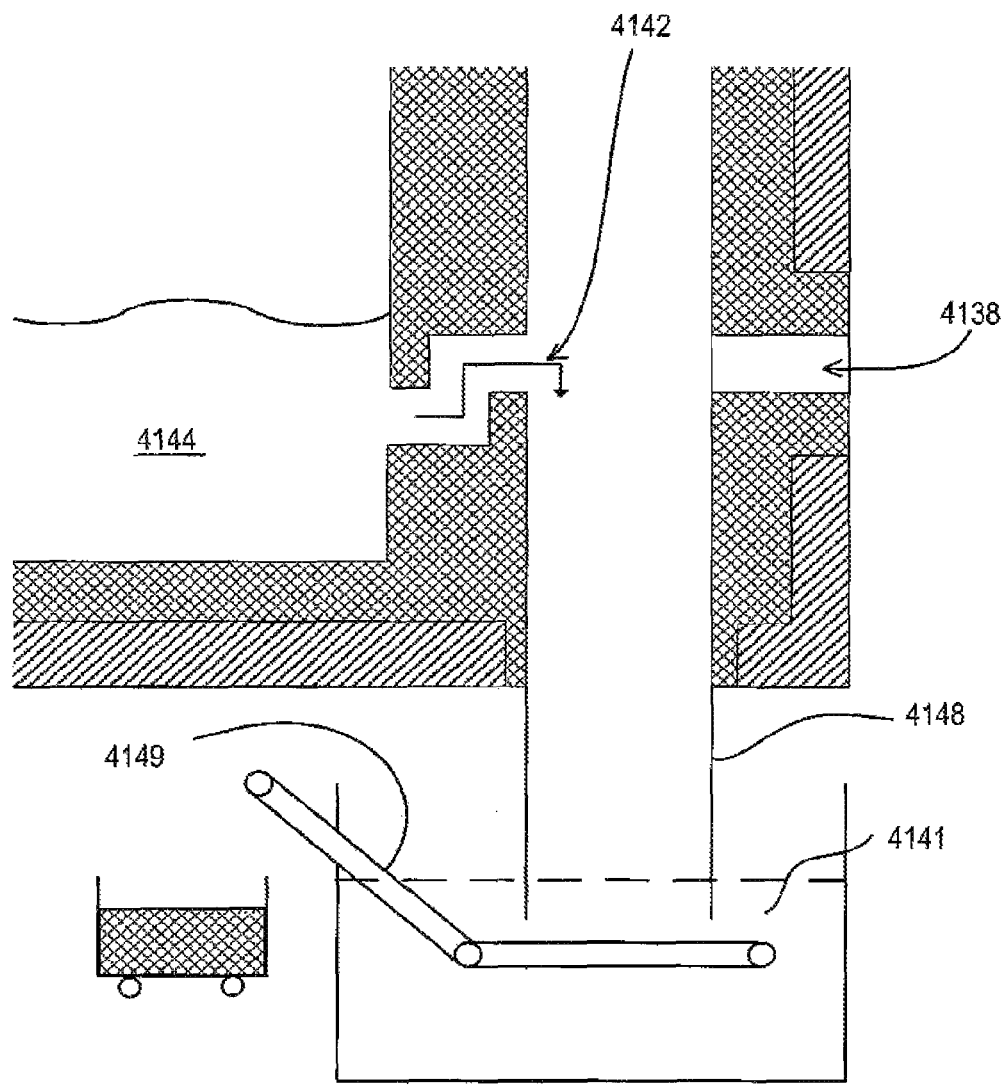
FIG. 23 depicts a partial cross-sectional view of an S-spout type slag outlet of a solid residue conditioner suitable for incorporation into a GCS in one embodiment of the invention.

For example, in one embodiment, as depicted in FIG. 23, the molten slag is exhausted through an S-trap outlet 4142. In this embodiment, the slag output means may optionally comprise a burner 4138 or other heating means located at or near the outlet 4142 in order to maintain the temperature of the molten slag at the outlet 4142 high enough to ensure that the outlet 4142 remains open through the complete slag extraction period. This embodiment also ensures that the level of the slag pool 4144 does not go below a predetermined level, thereby keeping the melt environment sealed to avoid gaseous contact with the external environment.

Figure 24:
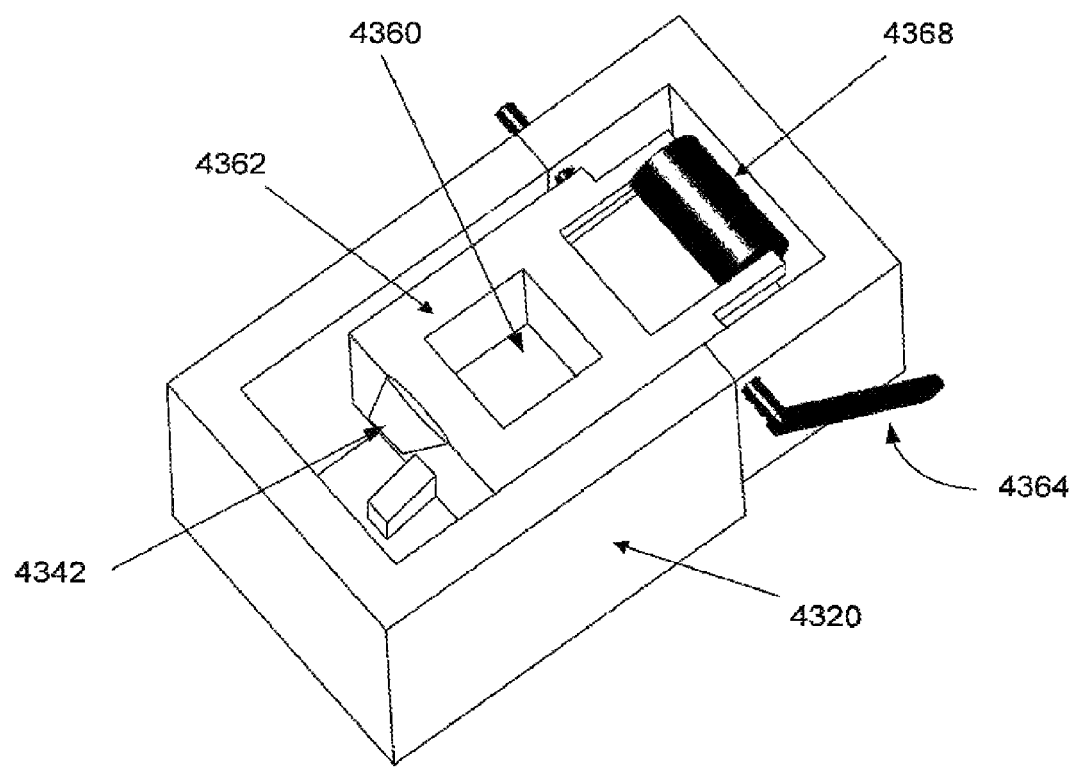
FIG. 24 depicts a partial cross-sectional view of a tiltable slag crucible in a residue conditioning chamber suitable for incorporation into a GCS in one embodiment of the invention.

FIG. 24 illustrates one embodiment that may be provided to controllably exhaust the molten slag from a reservoir by a tipping mechanism. In this embodiment, the residue conditioning chamber 4320 has a tillable crucible 4362 comprising reservoir 4360, a spout 4342, a counterweight 4368 and a lever arm 4364 provided as a mechanism for tilting the crucible 4362.

FIG. 25A to D schematically illustrate portions of different design options that may be provided for controlled exhaust of the molten slag through an appropriately adapted outlet in the reservoir or chamber. The molten slag exhaust may be controlled to ensure that the level of the molten slag is not allowed to reach below the top of the outlet, so that gases from the external atmosphere do not enter the interior melt region.

Figure 25A:
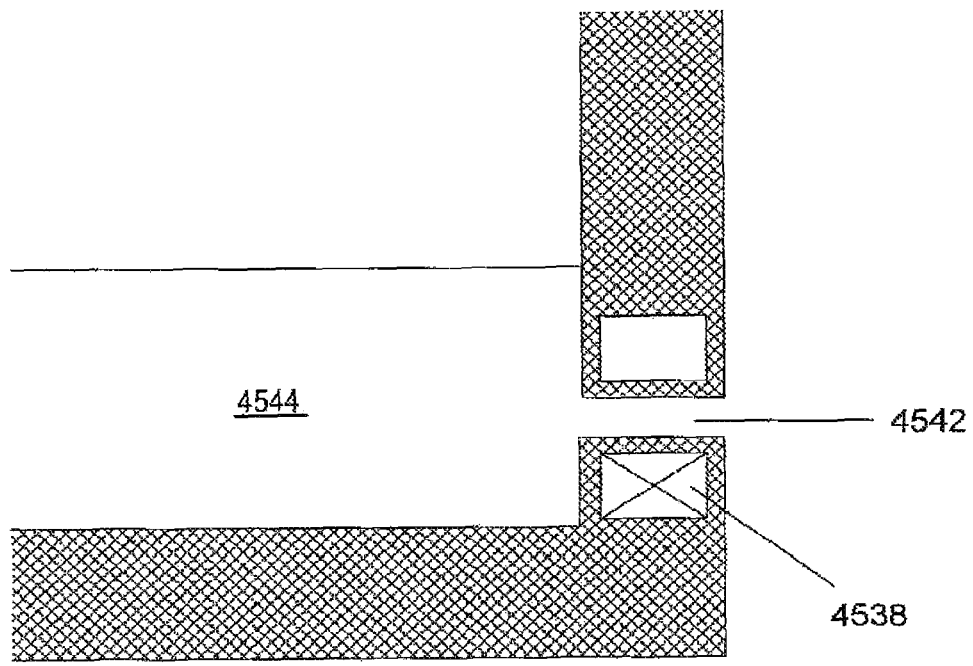
FIG. 25 A to D depict partial cross-sectional views of various slag outlets that can be used in a residue conditioning chamber for incorporation into a GCS in various embodiments of the invention.

FIG. 25A depicts a reservoir or chamber having an outlet 4542 in a side wall near the bottom of the reservoir/chamber. The outlet 4542 is surrounded by an induction heater 4538 enclosed in the refractory that can control the temperature of the refractory in the region surrounding the outlet 4542. Increasing the temperature sufficiently to maintain the slag in the molten state allows the slag to flow though the outlet 4542. When the level of the slag pool 4544 reaches the desired level, the induction heater 4538 is turned off, and the slag is allowed to solidify in the outlet 4542.

Figure 25B:
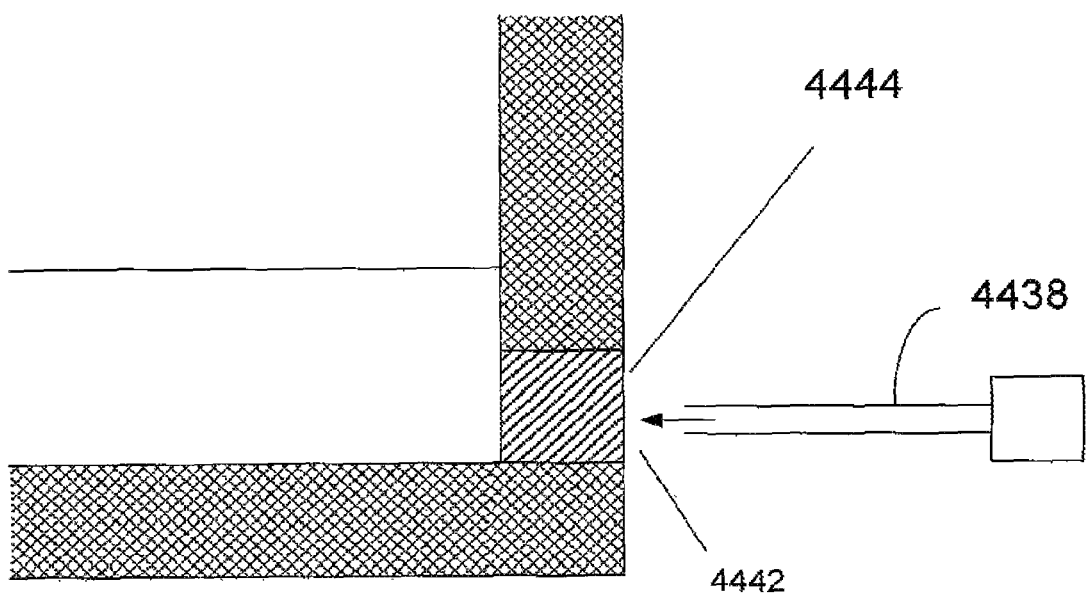

FIG. 25B depicts one embodiment wherein the outlet 4442 is "plugged" with a soft refractory paste 4444. An oxygen lance 4438 is provided in a position suitable to "burn" a hole into the soft refractory paste 4444 allowing molten slag to pour out. The flow is stopped by placing refractory or other suitable material back into the outlet 4442.

Figure 25C:
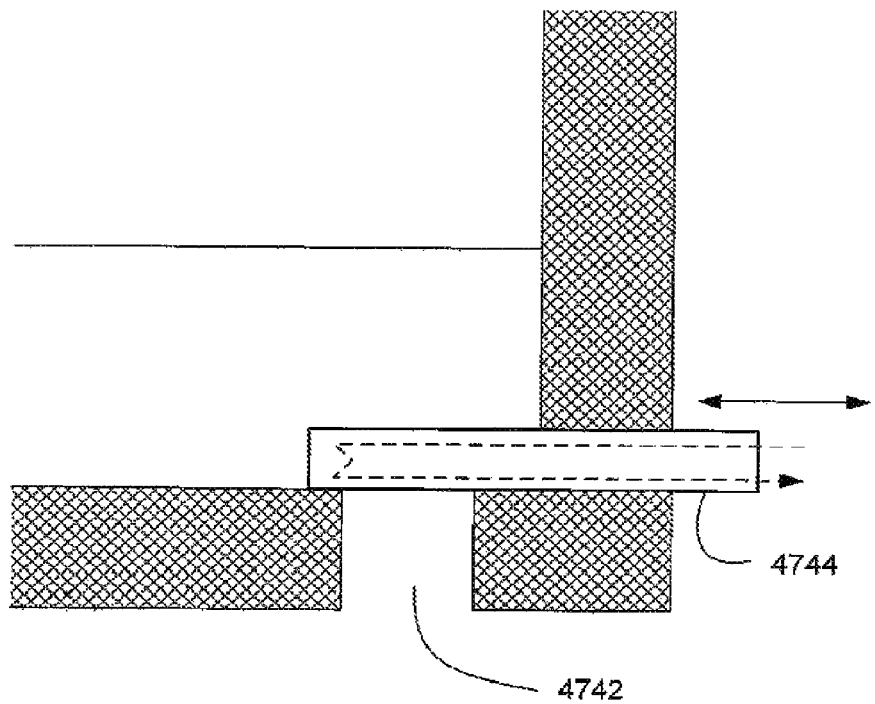
Figure 25D:
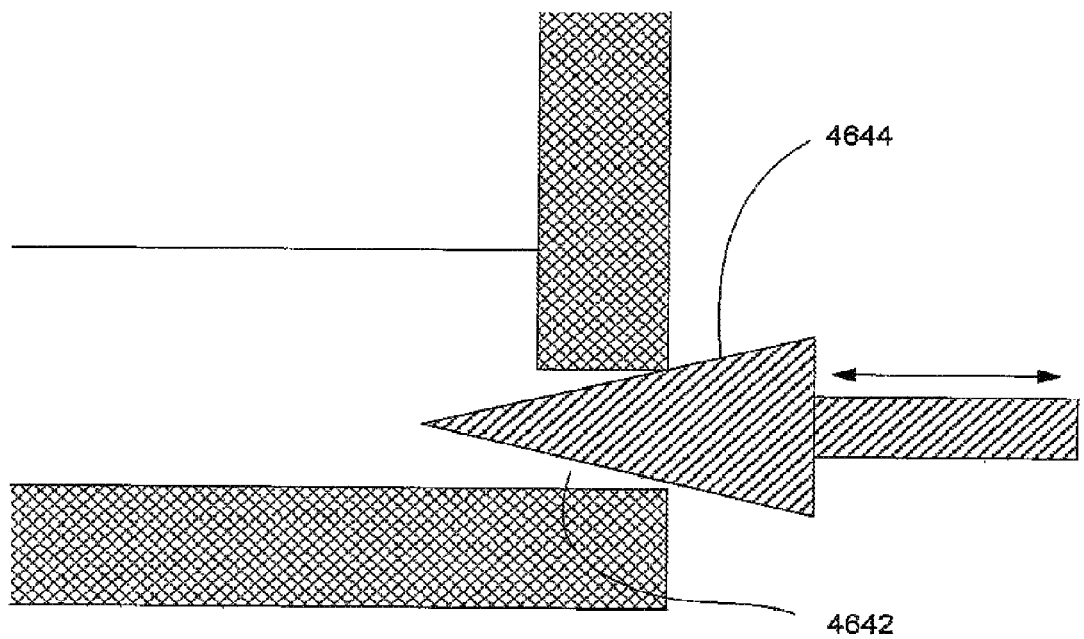

FIG. 25C depicts one embodiment wherein the outlet 4742 is covered by a movable water cooled plug 4744. The plug 4744 is movable from a closed position to an open position, thereby exposing the outlet 4742 to allow the molten slag to exhaust through the outlet 4742. The molten material should not adhere to the smooth surface of the plug 4744 because of the water cooling effect.

FIG. 25C depicts one embodiment wherein the outlet 4642 is plugged by a wedge-type device 4644. The "wedge" is pushed in and out of outlet 4642 as required to control the exhaust of the molten slag.

Due to the very high temperatures needed to melt the residue, and particularly to melt any metals that may be present, the residue conditioning chamber wall is lined with a refractory material that will be subjected to very severe operational demands. The selection of appropriate materials for the design of a residue conditioning chamber is made according to a number of criteria, such as the operating temperature that will be achieved during typical residue conditioning processes, resistance to thermal shock, and resistance to abrasion and erosion/corrosion due to the molten slag and/or hot gases that are generated during the conditioning process.

The inner refractory is selected to provide an inner lining having very high resistance to corrosion and erosion, particularly at the slag waterline, in addition to resistance to the high operating temperatures. The porosity and slag wettability of the inner refractory material must be considered to ensure that the refractory material selected will be resistant to penetration of the molten slag into the hot face. The materials are also selected such that secondary reactions of the refractory material with hydrogen are minimized, thereby avoiding a possible loss of integrity in the refractory and contamination of the product gas.

The residue conditioning chamber is typically manufactured with multiple layers of materials as are appropriate. For example, the outer layer, or shell, of the chamber is typically steel. Moreover, it may be beneficial to provide one or more insulating layers between the inner refractory layer and the outer steel shell to reduce the temperature of the steel casing. Where a second layer (for example, an insulating firebrick layer) is provided, it may also be necessary to select a material that does not react with hydrogen. An insulating board around the outer surface of the slag reservoir may also be provided to reduce the temperature of the steel casing. When room for expansion of the refractory without cracking is required, a compressible material, such as a ceramic blanket, can be used against the steel shell. The insulating materials are selected to provide a shell temperature high enough to avoid acid gas condensation if such an issue is relevant, but not so high as to compromise the integrity of the outer shell.

The refractory material can therefore be one, or a combination of, conventional refractory materials known in the art which are suitable for use in a chamber for extremely high temperature (e.g., a temperature of about 1100° C. to 1800° C.) non-pressurized reaction. Examples of such refractory materials include, but are not limited to, high temperature fired ceramics (such as aluminum oxide, aluminum nitride, aluminum silicate, boron nitride, chromic oxide, zirconium phosphate), glass ceramics and high alumina brick containing principally, silica, alumina and titania.

Due to the severe operating conditions, it is anticipated that the reservoir refractory will require periodic maintenance. Accordingly, in one embodiment, the residue conditioning chamber is provided in separable upper and lower portions, wherein the chamber lower portion (where the reservoir is located) is removable from the chamber upper portion. In one embodiment, the chamber is suspended from a support structure such that the lower portion can be dropped away from the upper portion to facilitate maintenance. This embodiment provides for removing the lower portion without disturbing any connections between the chamber upper portion and upstream or downstream components of the system.

The residue conditioning chamber may also include one or more ports to accommodate additional structural elements or instruments that may optionally be required. The chamber may also include service ports to allow for entry or access into the chamber for scrubbing/cleaning, maintenance, and repair. Such ports are known in the art and can include sealable port holes of various sizes. In one embodiment, the port may be a viewport that optionally includes a closed circuit television to maintain operator full visibility of aspects of the residue processing, including monitoring of the slag outlet for formation of blockages.

In one embodiment of the present invention, the solid residue conditioner comprised by the GCS is configured to receive solid residue from Stage One processing in the Converter GC only. In another embodiment, the solid residue conditioner comprised by the GCS is configured to receive solid residue from Stage One processing in the Converter GC and solid residue from a converter that is generating the input gas to be conditioned in the GCS.

Figure 22:
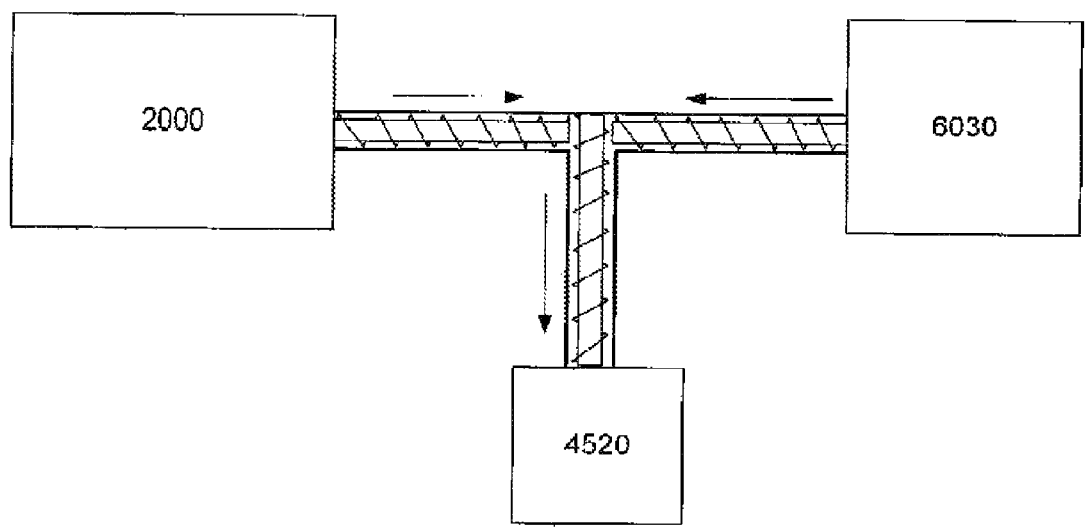
FIG. 22 is a schematic depiction of a residue conditioning chamber incorporated into a GCS in one embodiment of the invention, in which the chamber is in indirect communication with a baghouse filter of the GCS and a gasifier.

FIG. 22 depicts a solid residue conditioner in one embodiment of the present invention in which the solid residue conditioning chamber 4520 is indirectly connected to two sources of residue to be conditioned, where one source is a baghouse filter 6030 of Stage One of the GCS and the other source is a carbonaceous feedstock gasifier 2000.

Stage Two: Further Processing

Stage Two of the GCS comprises one or more components for implementing further processing steps that remove additional amounts of particulate matter and heavy metal contaminants, and optionally other contaminants present in the input gas. Stage Two processes can include dry phase separation steps as described for Stage One, and/or other separation steps including wet processing steps. Non-limiting examples of other processing steps that may be implemented in Stage Two include processes that remove acid gases, heavy metals and particulate matter, and other contaminants such as dioxin, furan, $CO_2$, and ammonia. As is known in the art, various components can be used to carry out these processes, including various wet scrubbers (such as venturi scrubbers and impinjet scrubbers), chloride guard beds, wet ESP and the like. Stage Two can also include cooling units and/or humidity controllers, as well as gas moving units for ensuring that the input gas moves through the system. Examples of Stage Two processing steps, other than those already described in Stage One, are described below.

Acid Gas Removal

Input gases to be processed in the GCS can include as contaminants acid gases such as HCl and $H_2S$. For example, syngas produced in a gasification converter contains such acid gases. The concentrations of these acid gases in syngas can range from about 0.05 to about 0.5% for HCl, and from about 100 ppm to about 1000 ppm for $H_2S$, depending on the carbonaceous feedstock used in the gasification process. The amount of HCl and $H_2S$ in the input gas can be calculated as is known in the art. In one embodiment, the GCS is configured to process input gas comprising about 0.178% of HCl and about 666 ppm (0.07%) of $H_2S$. In one embodiment, the GCS is configured to process input gas such that it meets Canadian emission limit for HCl and $H_2S$ of about 5 ppm HCl and about 21 ppm $H_2S$. Thus, in one embodiment, the GCS is configured such that the conditioned gas exiting the GCS contains between about 20 ppm and about 5 ppm HCl and between about 30 ppm and about 20 ppm $H_2S$.

Acid gas removal or separation can be achieved by dry scrubbing or wet scrubbing processes. Dry scrubbing processes are generally less efficient than wet scrubbing processes. However, a dry scrubbing process, such as those described above for Stage One processes, can be chosen for embodiments of the GCS in which ease of handling is required if, for example, the waste water stream resulting from the dry scrubbing process needs to be disposed of as hazardous material.

Wet scrubbing processes utilise wet packed columns or towers that provide a large contact area for heat transfer and mass transfer with low pressure drop that will aids in sub cooling of the gas. The principle of wet scrubbers is to remove contaminants from the gas by passing the gas through a packed structure which provides a large wetted surface area to induce intimate contact between the gas and the scrubbing liquor. The contaminant is absorbed into or reacted with the scrubbing liquor. For removal of acid gases an alkaline solution is used as the scrubbing liquor. Typically, sodium hydroxide is the alkaline solution used for wet scrubbing. However, $H_2S$ removal requires use of high pH alkaline solution in the scrubbing step. If $CO_2$ is present in the input gas, its affinity for alkaline solution results in removal of $CO_2$ from the input gas, which may not be desirable, depending on the downstream application the output gas is to be used for. Thus, the process selected for removal of the acid gases will depend on the end use of the conditioned gas.

In addition to dry and wet scrubbing processes as described above, a number of processing steps are known in the art for removing HCl vapor from gases. Non-limiting examples of such processing steps include: adsorption of the HCl on activated carbon or alumina, reaction with alkali or alkaline earth carbonates or oxides, the use of chloride guards, and the use of high temperature sorbents such as alkali and alkaline earth compounds, shortite ($Na_2CO_3.2CaCO_3$) and trona ($Na_2CO_3.NaHCO_3.2H_2O$), eutectic melts of $Li_2CO_3$ and $Na_2CO_3$, and flue gas sorbents such as alkalized alumina. In one embodiment, Stage Two of the GCS comprises an HCl scrubber for removal of HCl from the input gas using alkaline solution.

In one embodiment, the GCS provides for removal of remaining particulate matter simultaneously with separation of acid gases from the input gas (for example during removal of HCl during the HCl scrubber step). If Stage One of this embodiment of the GCS did not include a baghouse or other fine particle removal unit, the resulting liquid waste stream will require water treatment for hazardous particulate removal.

$H_2S$ may be removed from the input gas using various processes known in the art including wet and dry scrubbing processes as outlined above. Suitable methods include for example, wet absorption with NaOH or triazine, dry adsorption with Sufatreat, biological processes such as the use of Thiopaq® scrubbers, or selective oxidation, including liquid redox (Low CAT). Physical solvent processes can also be used to separate $H_2S$ from the input gas. Non-limiting examples of such physical solvent that can be used include polyethylene glycol derivatives such as Selexol®; fluor solvents such as anhydrous propylene carbonate; methanol as used in a Rectisol process.

In one embodiment, $H_2S$ is removed from the synthetic gas using a Thiopaq® scrubber. A Thiopaq® scrubber involves the use of a two step process in which input gas is treated in a wet scrubber with a mild alkaline solution (at 8.5 to 9 pH) in order to absorb hydrogen sulfide ($H_2S$). The $H_2S$ laden scrubber liquid is fed to a bioreactor where the sulphide is converted into elemental sulphur by a biological process, regenerating the scrubber liquid in the process, and enabling the bioreactor effluent to be recycled to the scrubber.

In one embodiment, the $H_2S$ removal efficiency of the GCS is such that the output gas leaving the system and used in a downstream application such as a gas engine will produce $SO_2$ emission below between about 10 ppm and about 30 ppm. In one embodiment, the $H_2S$ removal efficiency is such that the output gas leaving the system and used in a downstream application such as a gas engine will produce $SO_2$ emission below 15 ppm. In one embodiment, the $H_2S$ removal system is designed to produce output gas with an $H_2S$ concentration of about 20 ppm.

Heavy Metal/Particulate Matter Removal

Processes and particle removal units suitable for use in Stage One processes can also be used in Stage Two processes and have been described above. In one embodiment, the GCS comprises a carbon bed filter or mercury polisher as a particle removal unit in Stage Two.

As is known in the art, at a relative humidity (R.H.) of greater than 50%, water will start to adsorb on the carbon of the carbon bed filter and obstruct diffusion, which affects removal performance. This can be corrected, however, by increasing bed depth. Carbon bed filters can also be used at higher relative humidities, for example between ~70% R.H and 100% R.H., when lower performance is acceptable as the performance effect is only seen when the desired final content of mercury in the conditioned gas is in the 0.001 to 0.01 ug/Nm3 mercury range. For example, when mercury concentrations of about 19 ug/Nm3 are acceptable, the higher R.H. ranges can be used.

In one embodiment, the GCS employs an activated carbon filter as a final polishing device for removal of mercury. In one embodiment, an activated carbon filter with 7-8 inches of Water Column pressure drop is used to achieve about 99.8% removal of mercury. As will be apparent to one of skill in the art, particulate matter can also be extracted by carbon filter beds in small amounts of small particles (<1 μm) that were not captured by any upstream particle removal unit. Particulate matter that gets captured in Stage Two of the GCS can be disposed of in water or with spent carbon removal).

In one embodiment, activated carbon bed filters are also used for heavy metal removal from waste water.

An acid scrubbing system can also be an effective technique to capture heavy metals. This requires the passage of the gas containing heavy metals through a packed column with low pH (normally 1-2) solution circulation. Heavy metals and heavy metal compounds react with acid to form their stable compounds. With this technique the heavy metal concentration in the circulation solution will increase and thus treatment of the resulting waste water may be required. In one embodiment, the GCS comprises an acid scrubbing system to remove heavy metals. Examples of acid scrubbing systems include packed tower, spray tower and tray tower, impinjet systems, froth spray systems which are all capable of removing the contaminants from the input gas.

Dioxin and Furan Removal

Dioxins and furans are some of the most undesirable and toxic compounds associated with heat treatment of waste. In order for these compounds to be formed, all of the following conditions have to be present: a temperature in the range of 250-350° C., oxygen, carbon in flyash (acts as a catalyst especially if gas goes through the bed) and adequate residence time. The GCS of the present invention is configured to try to eliminate or decrease the potential for their formation. Various steps can be taken to minimise the occurrence of the required conditions for dioxin and furan formation. For example, any quenching steps can be conducted in a quencher or spray dryer absorber to ensure fast quenching when taking the gas through the above temperature range, the presence of oxygen and/or flyash can be minimised.

In embodiments where the input gas comprises dioxin and furan, he GCS can comprise an activated carbon injection step which will result in the dioxin and furan present in the gas being adsorbed to the carbon surface. The carbon can then be removed by a suitable particle removal unit. In one embodiment, the GCS comprises a spray dryer absorber that decreases the residence time at the relevant temperature range to minimise the possibility of dioxin/furan formation.

Removal of Carbon Dioxide and Ammonia

The GCS can optionally include components for the removal of carbon dioxide and/or ammonia if removal of these compounds is required. Suitable components are known in the art. As is also known in the art, ammonia can be removed from the input gas during the HCl scrubbing step.

Additional Options for the Process

Cooling Units and Humidity Controllers

Cooling units and/or humidity controllers can optionally be included in the GCS as part of Stage One (as described above) or Stage Two. Suitable components are known in the art and include, but are not limited to, evaporative cooling towers, gas coolers, chillers, recuperators, heat exchangers, indirect air to gas heat exchangers, and heat recovery steam generators (HRSGs). Recuperators and HRSGs can be used to cool the gas while utilizing the heat instead of dissipating it as is done by evaporative cooling towers, gas coolers, and chillers. Use of an HRSG leads to slower cooling of the gas, which is one of the four conditions necessary to be present simultaneously for the production of dioxins and furans, as noted above. Thus, in embodiments where an HRSG is used, more caution is exercised (for example, to ensure oxygen concentration is low) to avoid the possibility of introducing the other conditions (flyash presence and residence time).

Demisters/reheaters may be incorporated in the GCS for moisture removal and/or prevention of condensation as is known in the art. Heat exchangers can be included to reheat the final conditioned gas to the required temperature or relative humidity for the desired downstream application. A compressor can also optionally be included to compress the final conditioned gas to the required pressures for the desired downstream application.

In one embodiment in which the GCS is integrated with a plasma gasification system, evaporative cooling towers (dry quench) may be used to cool the syngas that enters the GCS from the gasification system. In one embodiment, the GCS incorporates an evaporative cooling tower in Stage One to cool the temperature of the syngas from about 1000° C. to about 150-200° C., for example, by adiabatic saturation, which involves direct injection of water into the gas stream in a controlled manner. The evaporating cooling process is a dry quench process, and can be monitored to ensure that the cooled gas is not wet, i.e. that the relative humidity of the cooled gas is still below 100% at the cooled temperature. In one embodiment of the invention, the GCS comprises an evaporative cooling tower or dry quench in Stage One that cools the syngas fed into the GCS from a temperature of about 740° C. to about 150-200° C.

In one embodiment, a gas cooler may be included in Stage Two of the GCS. The gas cooler (water cooled) functions to cool input gas that is pressurized through a gas moving unit (see below) and concomitantly heated. In one embodiment, the gas cooler cools the gas to about 35° C.

In one embodiment, the GCS comprises a humidity controller. The humidity controller functions to ensure that the humidity of the output gas is appropriate for the downstream application desired. For example, a humidity controller may include a chiller to cool the gas stream and thus condense some water out of the gas stream. This water can be removed by a gas/liquid separator. In one embodiment, the GCS comprises a humidity controller for treatment of the conditioned gas to provide a humidity of about 80% at 26° C. In one embodiment, the GCS is configured to first cool the conditioned gas to approximately 26° C. and then reheat the gas to 40° C. The conditioned gas may then be stored.

Gas Moving Units

In one embodiment, the GCS includes one or more gas moving units which supply a driving force for the gas throughout the GCS. In one embodiment in which the GCS is integrated with a plasma gasification system, the GCS comprises a gas moving unit capable of moving the input gas from the exit of the gasification system up to exit of the GCS.

Suitable gas moving units are known in the art and include, for example, process gas blowers, pressure blowers, vacuum pumps, positive displacement rotary blowers, reciprocating compressors, and rotary screw compressors and the like. As is also known in the art, the selection of the gas moving unit(s) to be used can be based on, for example, the location of the unit(s) in the system, the temperature of the input gas moving through the gas moving unit, and/or whether the presence of the gas moving unit will affect the operation of the proximal components of the system, for example, due to backpressure or suction.

Pressure blowers are similar to centrifugal pumps but are, however, designed for gas applications. The blades of the blower spin, thereby sucking air into the middle of the blower and expelling air in the radial direction at a higher pressure. The blowers can be designed for high pressure where the blades of the blower reach the outer casing to allow for positive displacement of the air in order to reach a high increase in pressure across the device.

Vacuum pumps are designed similarly to blowers but operate where the upstream pressure is a vacuum and the gas would not flow in the regular blower's direction. Therefore the vacuum pump is designed to capture a large volume of space (which is gas under vacuum, so small amount of actual gas) and compress that space between its scrolls to a higher pressure as the inner scroll rotate. The vacuum pump can only run in vacuum atmospheres (to a slight positive pressure) due to high pressure increase across the pump (high power consumption), and strain on scrolls at higher pressures.

Positive displacement rotary blowers operate as follows. As the dual, figure-8 shaped impellers of the blower rotate, a fixed quantity of gas (or air) at the inlet is trapped between the impeller and the casing parts. With each revolution, four of these "pockets" of gas are trapped, then forced out the discharge against whatever pressure exists in the system. When each of these pockets is expelled, a pulse is generated, which imposes a certain shock load on the blower and the downstream system. This allows the gas in the pocket to pressurize slowly to discharge conditions via the internal "jets," which in turn significantly reduces pulsations and shock load on the equipment.

Reciprocating compressors are positive displacement machines, meaning that they increase the pressure of the air by reducing its volume. The relationship between pressure and volume is known in the art. Reciprocating compressors comprise a crankshaft, connecting rods, and pistons. Single-stage and two-stage reciprocating compressors are commercially available. Single-stage compressors are generally used for pressures in the range of 70 psig to 100 psig. Two-stage compressors are generally used for higher pressures in the range of 100 psig to 250 psig.

Rotary screw compressors operate as follows. As the screws rotate the intake air is compressed in the reducing void between the rotor lobes and the airend casing, until the final pressure is reached and the air is discharged.

In one embodiment, the GCS comprises a process gas blower as a gas moving unit. In one embodiment, the GCS comprises a gas moving unit that additionally pressurizes the gas passing through the blower.

The optimal placement of the gas moving unit within the GCS can be determined by one of skill in the art. In one embodiment, the gas moving unit is located so as to increase the efficiency of one or more of the processing steps of the GCS. For example, in one embodiment, the gas moving unit is located upstream of a heavy metal polisher such as a mercury polisher to optimise mercury removal, as this occurs most efficiently under pressure, and can also allow a reduced size mercury polisher vessel to be used. In an embodiment where the GCS is integrated with a plasma gasification converter, the gas moving means is incorporated into the GCS downstream of a gas cooler. In one embodiment, the gas moving unit is located within the GCS upstream of a gas cooler.

Management of Waste Products

The GCS may optionally include components for the processing of waste products, if necessary. Alternatively, waste products produced by the GCS can be collected and processed, as necessary, externally to the GCS.

For example, any hydrochloric acid recovered from the acid gas separation steps may have a marketable value. If the amount of chlorine is of economically significant size, the chlorine may be reclaimed using art-known techniques. In one embodiment in which the GCS produces a sufficient amount of sulphur compound to justify the cost, a sulphur recovery system is positioned along the path of the GCS at a location where a temperature is reached where the sulphur compounds become stable. The type and size of the sulphur recovery system depends on the expected amount of sulphur in the input gas. Suitable sulphur recovery systems are known in the art. For example, for input gas that contains a high amount of sulphur, a second-stage liquid washing process can be used to remove sulphur compounds from the gas. An amine scrubber can be used to remove hydrogen sulphide and carbon dioxide from the input gas stream leaving a gas stream mainly comprising hydrogen, carbon monoxide and an inert gas. If the anticipated amount of sulphur is fairly low, as would be expected for input gas generated from low sulphur grades of coal, an iron filing technique may be used to react sulphur with elemental iron to produce iron sulphide. This may be accomplished by circulating iron pellets between a compartment in the conduit and a recovery compartment.

The present invention further contemplates that sulphur recovered from the input gas can be recovered and disposed of. For example, if the sulphur comprises limited heavy metal with biomass, it can be useful for agricultural land spreading. If the sulphur has considerable heavy metal, it can be converted to sulphate, processed for removal of the heavy metals and disposed of as sulphate salts in liquid waste form, or waste water. If government environmental regulations require additional treatment of the sulphur due to contact with *Thiobacillus* bacteria, the processed sulphur can be sterilized before disposal. Alternative means of sterilizing include the addition of disinfectants such as bleach or treatment with UV radiation.

In one embodiment of the present invention, the GCS is configured such that the waste water generated by the GCS comprises only salts and little elemental sulphur and biomass, which can be disposed of to the waste water sewer. If required by governmental regulations, the waste water can be sterilized using heat and residence time, prior to discharge to the sewer.

Figure 10:
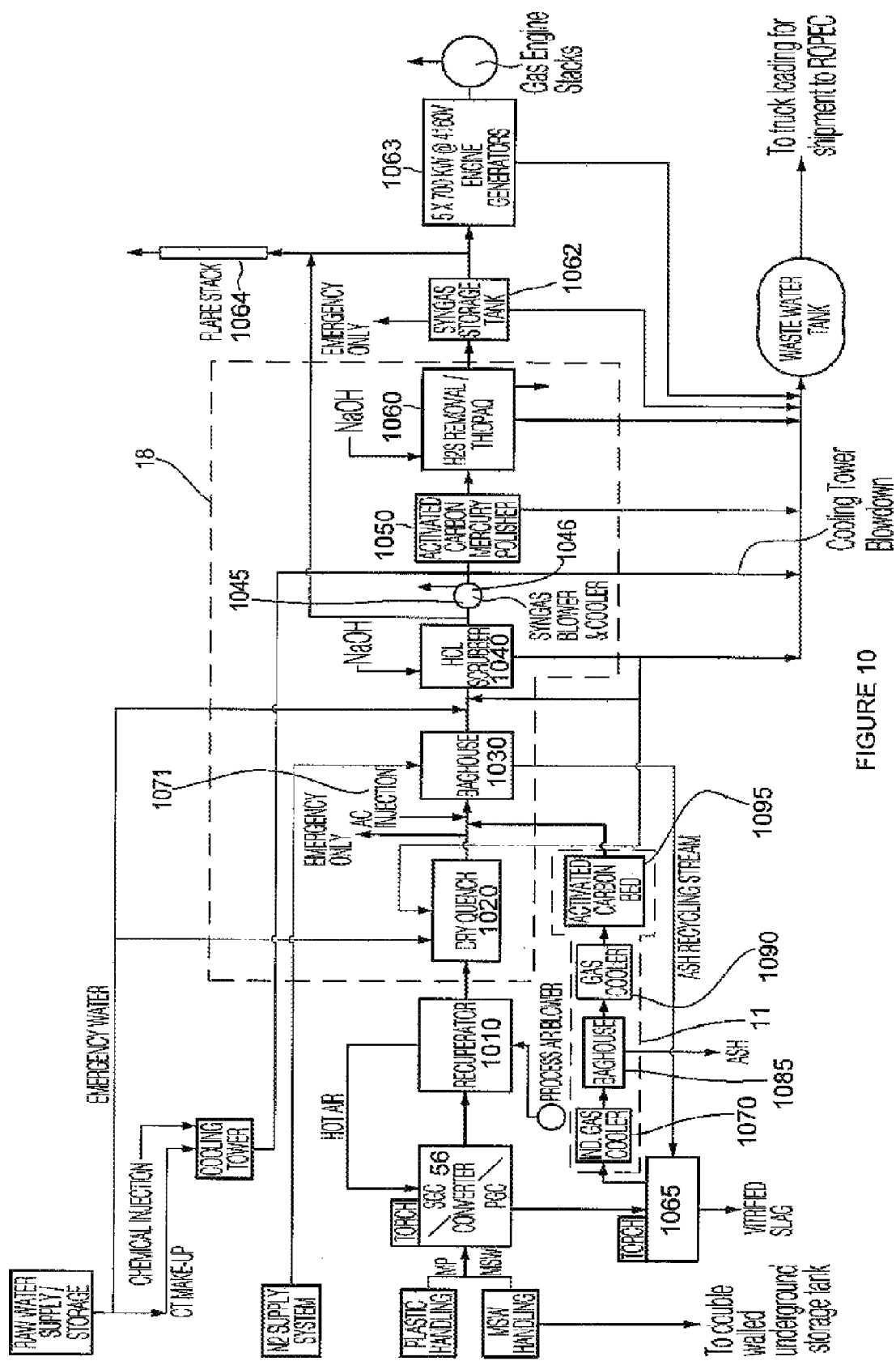
FIG. 10 depicts an overview process flow diagram of a low-temperature gasification facility incorporating an exemplary GCS system according to one embodiment of the invention, integrated with a downstream application (gas engines).

In one embodiment as shown in FIG. 10, the particulate matter and heavy metals (solids) from Stage One of the GCS are directed to the solid residue conditioner 1065 where they are melted. The solids melted in the solid residue conditioner can be used for road aggregate and building material applications; or they can be vitrified i.e. mixed with silica and encapsulated in glass for disposal. Procedures for carrying out these operations are known in the art. In some embodiments, depending upon plant considerations and local regulations, solids from the gas clean-up system may be sent off-site for safe disposal.

Design of the GCS Processing Steps

Parallel Processes

As described above, in one embodiment, the GCS carries out processing steps in parallel. In this embodiment, the GCS comprises a converter GC, a solid residue conditioner and a solid residue GC. Each of the Converter GC and Solid residue GC carries out Stage One and Stage Two processes in parallel. The solid residue conditioner receives solid residue from the Converter GC Stage One processes and optionally from the converter that is providing the input gas for the GCS. The solid residue conditioner melts the solid residue and produces a secondary gas stream, which is processed through the solid residue GC.

Converging Processes

In one embodiment, the GCS comprises a converter GC, a solid residue conditioner and a solid residue GC, and the converter GC and the solid residue GC carry out converging process steps as follows. The solid residue conditioner receives solid residue from the Converter GC Stage One processes and optionally from the converter that is providing the input gas for the GCS. The solid residue conditioner melts the solid residue and produces a secondary gas stream, which is processed through Stage One by the solid residue GC. The partially conditioned gas from the solid residue GC can then be processed either through the further processing steps (Stage Two) of the converter GC or through both the dry phase separation steps (Stage One) and the further processing steps (Stage Two) of the converter GC.

In one embodiment, as depicted in FIG. 2, the converter gas conditioner 4 receives input gas from a low temperature gasifier (or "converter") 50, and heavy metal and particulate matter that is separated from the input gas in Stage One is diverted to the solid residue conditioner 265, where it is converted to a secondary gas stream. This secondary gas stream is processed through Stage One dry phase separation steps in the solid residue GC 5, and is then fed into the converter GC 4 prior to the Stage One. In one embodiment, the secondary gas stream is processed through Stage One dry phase separation steps in the solid residue GC 5, and is then fed into the converter GC 4 after Stage One dry phase separation steps, and the secondary gas stream is processed in Stage Two further processing steps of the converter GC 4.

Linear Processes

In one embodiment, the GCS carries out a linear processing sequence in which a low temperature gasifier generates an input syngas which is processed through Stage One and Stage Two processes. The input gas is generated in the low temperature gasifier. In this embodiment, the one or more dry/solid stage separation steps (Stage One) are carried out, followed by the one or more further processing steps (Stage Two). For example, with reference to FIG. 3, the following processing steps are carried out by the GCS 6 after input gas from a converter 51 comprising low temperature gasifier is cooled in a heat exchanger 310: 1) particulate matter is removed in a cyclone filter 330 (Stage One dry phase separation); 2) acid gases (HCl) are then separated from the input gas using a chlorite guard bed 340; 3) $H_2S$ is removed from the input gas using sorbent 360, and 4) a final step to separate particulate matter using a ceramic filter 362 is carried out. As an optional step, the output gas is then stored in a storage tank.

Control of the Process

In one embodiment of the invention, a control system may be provided to control one or more processes implemented in, and/or by, the various systems and/or subsystems disclosed herein, and/or provide control of one or more process devices contemplated herein for affecting such processes. In general, the control system may operatively control various local and/or regional processes related to a given system, subsystem or component thereof, and/or related to one or more global processes implemented within a system, such as a gasification system, within or in cooperation with which the various embodiments of the invention may be operated, and thereby adjusts various control parameters thereof adapted to affect these processes for a defined result. Various sensing elements and response elements may therefore be distributed throughout the controlled system(s), or in relation to one or more components thereof, and used to acquire various process, reactant and/or product characteristics, compare these characteristics to suitable ranges of such characteristics conducive to achieving the desired result, and respond by implementing changes in one or more of the ongoing processes via one or more controllable process devices.

The control system generally comprises, for example, one or more sensing elements for sensing one or more characteristics related to the system(s), process(es) implemented therein, input(s) provided therefor, and/or output(s) generated thereby. One or more computing platforms are communicatively linked to these sensing elements for accessing a characteristic value representative of the sensed characteristic(s), and configured to compare the characteristic value(s) with a predetermined range of such values defined to characterise these characteristics as suitable for selected operational and/or downstream results, and compute one or more process control parameters conducive to maintaining the characteristic value with this predetermined range. A plurality of response elements may thus be operatively linked to one or more process devices operable to affect the system, process, input and/or output and thereby adjust the sensed characteristic, and communicatively linked to the computing platform(s) for accessing the computed process control parameter(s) and operating the process device(s) in accordance therewith.

In one embodiment, the control system provides a feedback, feedforward and/or predictive control of various systems, processes, inputs and/or outputs related to the conversion of carbonaceous feedstock into a gas, so to promote an efficiency of one or more processes implemented in relation thereto. For instance, various process characteristics may be evaluated and controllably adjusted to influence these processes, which may include, but are not limited to, the heating value and/or composition of the feedstock, the characteristics of the product gas (e.g. heating value, temperature, pressure, flow, composition, carbon content, etc.), the degree of variation allowed for such characteristics, and the cost of the inputs versus the value of the outputs. Continuous and/or real-time adjustments to various control parameters, which may include, but are not limited to, heat source power, additive feed rate(s) (e.g. oxygen, oxidants, steam, etc.), feedstock feed rate(s) (e.g. one or more distinct and/or mixed feeds), gas and/or system pressure/flow regulators (e.g. blowers, relief and/or control valves, flares, etc.), and the like, can be executed in a manner whereby one or more process-related characteristics are assessed and optimized according to design and/or downstream specifications.

Alternatively, or in addition thereto, the control system may be configured to monitor operation of the various components of a given system for assuring proper operation, and optionally, for ensuring that the process(es) implemented thereby are within regulatory standards, when such standards apply.

In accordance with one embodiment, the control system may further be used in monitoring and controlling the total energetic impact of a given system. For instance, a given system may be operated such that an energetic impact thereof is reduced, or again minimized, for example, by optimising one or more of the processes implemented thereby, or again by increasing the recuperation of energy (e.g. waste heat) generated by these processes. Alternatively, or in addition thereto, the control system may be configured to adjust a composition and/or other characteristics (e.g. temperature, pressure, flow, etc.) of a product gas generated via the controlled process(es) such that such characteristics are not only suitable for downstream use, but also substantially optimised for efficient and/or optimal use. For example, in an embodiment where the product gas is used for driving a gas engine of a given type for the production of electricity, the characteristics of the product gas may be adjusted such that these characteristics are best matched to optimal input characteristics for such engines.

In one embodiment, the control system may be configured to adjust a given process such that limitations or performance guidelines with regards to reactant and/or product residence times in various components, or with respect to various processes of the overall process are met and/or optimised for. For example, an upstream process rate may be controlled so to substantially match one or more subsequent downstream processes.

In addition, the control system may, in various embodiments, be adapted for the sequential and/or simultaneous control of various aspects of a given process in a continuous and/or real time manner.

In general, the control system may comprise any type of control system architecture suitable for the application at hand. For example, the control system may comprise a substantially centralized control system, a distributed control system, or a combination thereof. A centralized control system will generally comprise a central controller configured to communicate with various local and/or remote sensing devices and response elements configured to respectively sense various characteristics relevant to the controlled process, and respond thereto via one or more controllable process devices adapted to directly or indirectly affect the controlled process. Using a centralized architecture, most computations are implemented centrally via a centralized processor or processors, such that most of the necessary hardware and/or software for implementing control of the process is located in a same location.

A distributed control system will generally comprise two or more distributed controllers which may each communicate with respective sensing and response elements for monitoring local and/or regional characteristics, and respond thereto via local and/or regional process devices configured to affect a local process or sub-process. Communication may also take place between distributed controllers via various network configurations, wherein a characteristics sensed via a first controller may be communicated to a second controller for response thereat, wherein such distal response may have an impact on the characteristic sensed at the first location. For example, a characteristic of a downstream product gas may be sensed by a downstream monitoring device, and adjusted by adjusting a control parameter associated with the converter that is controlled by an upstream controller. In a distributed architecture, control hardware and/or software is also distributed between controllers, wherein a same but modularly configured control scheme may be implemented on each controller, or various cooperative modular control schemes may be implemented on respective controllers.

Alternatively, the control system may be subdivided into separate yet communicatively linked local, regional and/or global control subsystems. Such an architecture could allow a given process, or series of interrelated processes to take place and be controlled locally with minimal interaction with other local control subsystems. A global master control system could then communicate with each respective local control subsystems to direct necessary adjustments to local processes for a global result.

The control system of the invention may use any of the above architectures, or any other architecture commonly known in the art, which are considered to be within the general scope and nature of the present disclosure. For instance, processes controlled and implemented within the context of the invention may be controlled in a dedicated local environment, with optional external communication to any central and/or remote control system used for related upstream or downstream processes, when applicable. Alternatively, the control system may comprise a sub-component of a regional an/or global control system designed to cooperatively control a regional and/or global process. For instance, a modular control system may be designed such that control modules interactively control various sub-components of a system, while providing for inter-modular communications as needed for regional and/or global control.

The control system generally comprises one or more central, networked and/or distributed processors, one or more inputs for receiving current sensed characteristics from the various sensing elements, and one or more outputs for communicating new or updated control parameters to the various response elements. The one or more computing platforms of the control system may also comprise one or more local and/or remote computer readable media (e.g. ROM, RAM, removable media, local and/or network access media, etc.) for storing therein various predetermined and/or readjusted control parameters, set or preferred system and process characteristic operating ranges, system monitoring and control software, operational data, and the like. Optionally, the computing platforms may also have access, either directly or via various data storage devices, to process simulation data and/or system parameter optimization and modeling means. Also, the computing platforms may be equipped with one or more optional graphical user interfaces and input peripherals for providing managerial access to the control system (system upgrades, maintenance, modification, adaptation to new system modules and/or equipment, etc.), as well as various optional output peripherals for communicating data and information with external sources (e.g. modem, network connection, printer, etc.).

The processing system and any one of the sub-processing systems can comprise exclusively hardware or any combination of hardware and software. Any of the sub-processing systems can comprise any combination of none or more proportional (P), integral (I) or differential (D) controllers, for example, a P-controller, an I-controller, a PI-controller, a PD controller, a PID controller etc. It will be apparent to a person skilled in the art that the ideal choice of combinations of P, I, and D controllers depends on the dynamics and delay time of the part of the reaction process of the gasification system and the range of operating conditions that the combination is intended to control, and the dynamics and delay time of the combination controller. It will be apparent to a person skilled in the art that these combinations can be implemented in an analog hardwired form which can continuously monitor, via sensing elements, the value of a characteristic and compare it with a specified value to influence a respective control element to make an adequate adjustment, via response elements, to reduce the difference between the observed and the specified value. It will further be apparent to a person skilled in the art that the combinations can be implemented in a mixed digital hardware software environment. Relevant effects of the additionally discretionary sampling, data acquisition, and digital processing are well known to a person skilled in the art. P, I, D combination control can be implemented in feed forward and feedback control schemes.

In corrective, or feedback, control the value of a control parameter or control variable, monitored via an appropriate sensing element, is compared to a specified value or range. A control signal is determined based on the deviation between the two values and provided to a control element in order to reduce the deviation. It will be appreciated that a conventional feedback or responsive control system may further be adapted to comprise an adaptive and/or predictive component, wherein response to a given condition may be tailored in accordance with modeled and/or previously monitored reactions to provide a reactive response to a sensed characteristic while limiting potential overshoots in compensatory action. For instance, acquired and/or historical data provided for a given system configuration may be used cooperatively to adjust a response to a system and/or process characteristic being sensed to be within a given range from an optimal value for which previous responses have been monitored and adjusted to provide a desired result. Such adaptive and/or predictive control schemes are well known in the art, and as such, are not considered to depart from the general scope and nature of the present disclosure.

The GCS according to the invention comprises a control system for maintaining a set point for reaction conditions within a specified range of variability during the processing of an input syngas to a conditioned gas which has a desired chemical and physical composition. This control system is automatable and can be configured to be applicable to a variety of gas conditioning systems.

In one embodiment, if the control system senses a decrease in efficiency or alternate functional deficiency in a process of the GCS, which is outside a desired operational range, the control system can be configured to enable the diversion of the gas stream to a backup process, a flare stack, a combustion chamber or a backup GCS. However and as is known in the art, if for example the level of HCl and/or $H_2S$ in the gas stream is above allowable emission limits, the gas stream is not diverted to a flare stack and thus may be diverted to a backup process which can modify the level of HCl and/or $H_2S$.

The control system of this invention comprises: a Process Monitoring Subsystem and a Process Controlling Subsystem. The Process Monitoring Subsystem includes one or more sensing elements which are configured to analyze one or more of the chemical composition of the gas stream through the GCS, the gas flow rate, pressure, thermal parameters and the like. The Process Control Subsystem comprises one or more response elements, the action of which is in response to a process characteristic sensed by the sensing elements of the Process Monitoring Subsystem, as well as other information monitoring elements which are configured as an integrated Process Control Subsystem.

In one embodiment, the control system may provide a means for fine-tuning the processing steps of the GCS and thus may provide a means for substantially minimizing drift from desired optimal conditions for processing of the input gas. By having a single integrated control system that is controlled by a real time application running on a computer processor which is capable of monitoring the operational components of the GCS and process steps and modifying them if required, the control system can ensure the substantially optimum and continuous generation of a conditioned gas in a safe manner and can ensure substantially efficient and self sustaining operation of the GCS.

The Process Control Subsystem includes response elements for adjusting the conditions within the GCS to optimize the efficiency of processing input gas and the resulting characteristics of the conditioned gas, for example the composition thereof. Ongoing adjustments to the reactants (for example, activated carbon injection, pH control for the HCl scrubber, reactants required for $H_2S$ system optimization) can be executed in a manner which enables this process to be conducted efficiently and optimized according to design specifications. Some factors influencing the efficiency of the GCS are the air flow rate (redox), caustic addition rate (pH), conductivity (bleed) into the bioreactor of the $H_2S$ removal system, and the pressure in the mercury polisher (heavy metal removal system). The Process Monitoring Subsystem includes one or more sensing elements for measuring parameters including, for example, the temperature, pressure, flowrate, composition and the like, of the gas at various points within the GCS. The sensing elements can measure these parameters in real time and use the data collected to determine if, for example, the operation of the GCS requires modification. For example, a sensing element can detect a particular condition which may result in a requirement for more activated carbon to be injected into the GCS, or that the pH of the HCl scrubber needs to be adjusted, or that the air flow into the bioreactor of the $H_2S$ removal system needs to be adjusted, or that the pH or conductivity of the $H_2S$ removal system needs to be adjusted. These required adjustments as determined by the Process Monitoring Subsystem based on the sensed information, can be enabled by the Process Control Subsystem.

In one embodiment of the invention, the Process Monitoring Subsystem incorporates a sensing means configured to monitor the conditioned gas output and based on predetermined parameters or conditioned gas objectives, this facilitates the operating conditions within the GCS to be closely controlled by the response elements of the Process Control Subsystem thereby achieving a suitable conditioned gas composition which can meet the gas input requirements of one or more downstream applications in terms of energy requirements, temperature, pressure or other conditioned gas requirements.

Control Elements

Sensing elements contemplated within the present context, as defined and described above, can include, but are not limited to sensors, detectors, analyzers, thermocouples, pressure transducers, chemical analyzers or the like, wherein a worker skilled in the art would readily understand the format of a sensing element which can collect information relating to a specific characteristic.

Response elements contemplated within the present context, as defined and described above, can include, but are not limited to, various control elements operatively coupled to process-related devices configured to affect a given process by adjustment of a given control parameter related thereto. For instance, process devices operable within the present context via one or more response elements, may include, but are not limited to particular matter is monitored to determine if a filtering system is to be activated; gas temperature is monitored at input of GCS to adjust flow of process air therethrough; pressure is monitored within GVS to adjust downstream blower in order to maintain desired pressure.

Gas Composition Monitoring

Sensing elements that can be used to measure the composition of the gas flow through the GCS are known in the art and include, for example, gas monitors, in situ gas analyzers, in situ probe gas analyzers, extractive gas analyzers, and the like. These sensing elements are used to determine the amount of components such as hydrogen, carbon monoxide, oxygen, $H_2S$, carbon dioxide or the like, which are present in the input gas, conditioned gas or a gas at an intermediate state between input composition and conditioned composition.

As is known in the art, the amount of particulate matter that is present in the input gas can vary depending on the source of the input gas. For example, as is known in the art of plasma gasification processing, the amount of particulate matter in a gas stream exiting a gasifier can have a direct relationship on the amount of particular matter or other pollutants in the gas stream. For example, pollutants tend to adhere to particulate matter, which assists their exit from the reactor vessel and through the exhaust piping. Therefore substantially minimizing the amount of particulate matter in the input gas stream may also minimize the emission rate of pollutants. In one embodiment of the invention, changes in the amount of particulate matter in the gas stream can be determined by monitoring the opacity of the gas stream and establish a baseline for an acceptable level which can be based on particular matter concentration in accordance with regulatory authority restrictions within the location of processing.

Thus, in one embodiment of the invention, the amount of particulate matter in the gas at various locations within the GCS is monitored using one or more opacity monitors installed within the gas transfer devices or piping within the GCS to provide real-time feedback of opacity of the gas, thereby providing an optional mechanism for automation of the adjustment of the filtering process. For example, the adjustment of the amount of activated carbon that is injected into the input gas stream in order to maintain the level of particulate matter below the maximum allowable concentration.

In one embodiment and in order to substantially optimize the operation of the opacity monitors, it is desirable to maintain sensor elements which are free of deposits therein to ensure accuracy of readings. The prevention of deposition on the sensor elements can be achieved by for example the provision of a small amount of nitrogen across the face of each sensing element to prevent airborne particles from settling; the maintenance of a slightly negative pressure in this portion of the gas handling system to ensure airborne particles are drawn past the sensor elements or other method as would be readily understood. In one embodiment, nitrogen is used unless the use thereof will be detrimental to the chemical composition of the conditioned gas required for a downstream application. As would be know to a worker skilled in the art, other examples of gases that can be used to mitigate the deposition of particular matter on the one or more sensing elements can include argon, $CO_2$, or other gas as would be readily understood.

Temperature Monitoring

In one embodiment of the invention, there is provided one or more sensing elements configured to monitor the temperature at one or more sites located throughout the GCS, wherein such data can be acquired on a periodic, intermittent or continuous basis. As is known in the art, a sensing element capable of monitoring the temperature of the gas flowing through the GCS include thermocouples, optical thermometers and pressure gauges. In one embodiment of the invention, the sensing elements for monitoring the temperature are thermocouples installed at locations in the GCS as required. In one embodiment, the sensing elements for monitoring the temperature are optical thermometers. Suitable optical thermometers are known in the art, wherein a non-limiting example of an optical thermometer is a thermowell. In one embodiment a plurality of thermocouples and pressure gauges can be used to monitor the temperature at critical points throughout the GCS.

Sensing elements for monitoring the temperature of the gas stream may be located throughout the GCS, and for example, at a location prior to entry of the syngas into the GCS, exit of the conditioned from the GCS as well as at various locations throughout the GCS.

Pressure Monitoring

In one embodiment of the invention, there is provided sensing elements for monitoring the pressure within the GCS, wherein such data are acquired on a continuous, intermittent, periodic or real-time basis. In one embodiment, the sensing elements for monitoring the pressure comprise pressure sensors such as pressure transducers, and/or pressure gauges located throughout the GCS.

Suitable locations for pressure sensors are, for example, at the exit point of the recuperator prior to entry of the input gas into the GCS, at the outlet blower, or at locations where the pressure can be measured across a particle removal unit such as a baghouse, or a carbon filter bed. In one embodiment, the sensing elements for monitoring the pressure are located across an acid gas removal system such as an HCl scrubber, or an $H_2S$ scrubber. Sensing elements for monitoring the pressure can also be located in the solid residue conditioner.

In one embodiment, sensing elements for monitoring pressure are located on the vertical wall of a converter that is integrated with the GCS. The efficiency of certain processes within the GCS can depend upon the pressure in the GCS. For example, the efficiency of a mercury polisher is improved when the GCS is under pressure rather than a vacuum. Data relating to the pressure of the system is used by the feedback control system to determine, for example on a real time basis, whether adjustments to pressure dependent processes such as the heavy metal polisher are required.

In one embodiment, a continuous readout of differential pressures throughout the complete system is provided. In this manner, the pressure drop across each individual processing component of the GCS can be monitored to substantially rapidly pinpoint developing or actual problems in the GCS during processing of the input gas stream.

Flow Rate Monitoring

In one embodiment of the invention, there are provided sensing elements to monitor the rate of gas flow rate at sites located throughout the GCS, wherein such data is acquired on a continuous, intermittent or periodic basis. A sensing element to monitor the rate of gas flow include gas flow meters or the like. In one embodiment, the rate of gas flow is monitored using one sensing element. In another embodiment, when a duplicate system is provided as a backup GCS, a second sensing element to monitor the rate of gas flow is provided in the backup GCS.

For example, syngas production can be uneven due to the non-homogeneous nature of the feedstock and possible upsets such as failure of support equipment such as the process air blower, torch water leak, control valves, waste feed rate, and/or baghouse backpulse. These changes can be monitored by observing the temperatures and pressure in the GCS as well as gas flow and composition among others. A resulting fluctuation can be corrected by proper control of the syngas blower, control valves, waste feed rate, and/or baghouse backpulse, the amount of air going to each stage, and varying the rates (and ratio) of MSW and HCF addition, for example.

Gas Moving Units

The control system can also integrate with the gas moving units. The gas moving units can be controlled by adjusting the speed at which it moves the input gas through the GCS. In one embodiment, where the GCS is integrated with a low temperature gasifier system to produce energy to operate internal combustion engines, the speed at which the gas moving unit moved gas is controlled in order to control the pressure in the converter.

Optional Manual Controls

The GCS can optionally comprise manual sampling and or control systems as a back up for the automated control system. For example, the input gas stream within the GCS can be sampled and analyzed by gas chromatography (GC) to determine chemical composition of the input gas stream. In one embodiment, sample locations for these analyses are spread throughout the GCS. In one embodiment, the input gas stream is sampled at a location between Stage One and Stage Two processes, and more specifically between the step in which particulate matter and heavy metals are removed and the removal of HCl. In another embodiment, the syngas stream is sampled immediately after the syngas stream exits the HCl scrubber in Stage Two. In still another embodiment, the syngas is sampled immediately after it exits the $H_2S$ scrubber.

In an alternate manual control step, the heavy metal or mercury content in feedstock can be measured, and the appropriate amount of carbon injected into the GCS can be pre-set depending on the heavy metal content of the feedstock.

The concentration of $H_2S$ exiting the $H_2S$ scrubber can also be measured and controlled manually as is known in the art. For example, the concentration of $H_2S$ exiting the $H_2S$ scrubber can be altered by adjusting the appropriate parameters for the $H_2S$ scrubber. Alternatively, the concentration of $H_2S$ exiting the scrubber can be altered by lowering the amount of sulphur fed into the system by, for example, decreasing the tire content in the HCF in the feedstock.

One of skill in the art will understand that additional sensing and response elements can be included in the control system as appropriate.

Incorporation of the GCS into a Gasification Facility

In one embodiment, the GCS is integrated with a gasification system. A schematic diagram of a GCS incorporated into a gasification facility in one embodiment of the invention is shown schematically in FIG. 10. The product gas produced from such gasification systems or converters can be processed through a GCS in order to provide an output syngas having a desired set of characteristics. As noted above, the desired set of characteristics depends on the desired downstream application in which the output syngas is to be used. The syngas product produced from the gasification converter is transferred to the GCS via one or more gas transfer means.

Gas transfer means are known in the art and suitable gas transfer means can be readily identified by one of skill in the art. Non-limiting examples of suitable gas transfer means include pipes, ducts and conduits. In one embodiment, where the GCS is integrated with a plasma gasification converter, vacuum extraction using an induction fan is used to continuously withdraw hot syngas product from the plasma gasification converter through an exit gas outlet(s) of the plasma gasification converter.

The control system for the GCS can function independently of the facility control system to manage processing of the gas through the GCS. Alternatively, the control system for the GCS can be incorporated into the control system for the entire facility.

Downstream Applications for Output Gas

The conditioned gas produced by the GCS can be used in downstream applications. Examples of such downstream applications include, but are not limited to, internal combustion engines, fuel cell technologies, combustion turbine engines, polygeneration of electricity and synthetic fuels, and chemical synthesis. The conditioned gas produced by the GCS of the present invention may also be used in the plastics and fertilizer industries.

Selected technologies are described below.

Combustion Turbine Engines

A combustion turbine engine combines air ($O_2$ with CO and the $H_2$ to generate $CO_2$, $H_2O$ and energy. The energy is in the form of heat and pressure. As the gas expands during the combustion process, it expands across a multiple stage power turbine to drive for the axial flow air compressor and the generator to make electricity. The fuel gas must be pressurized in order to feed the gas turbine as the combustion takes place at a pressure approximately equivalent to the compression ratio of the combustion turbine.

If the syngas is to be delivered to one or more combustion turbine engines, the syngas would either be compressed prior to delivery to the engine or the entire gasification process is operated under a pressure sufficient for delivery. In one embodiment, the pressure would range from 100-600 psig depending of the compression ratio of the particular engine. In one embodiment, the pressure would range from 20 to 80 bars. In one embodiment, the pressure is 36 bars.

Before entering the gas turbine fuel system, the pressurized, dry product gas may be further filtered to collect any trace quantities of particulate matter that may have been picked up in the processing equipment and piping.

A pre-heating system can be employed to pre-heat the cooled and compressed fuel gas if desired. In one embodiment, the pre-heating step results in a temperature increase that is sufficient to decrease the relative humidity of the gas to at or below 80%. In one embodiment, the pre-heating step results in a temperature increase that is sufficient to decrease the condensation of moisture when passing through the combustion turbine engine. A pre-heating system can be configured to use waste heat from a gas cooling system located somewhere else in the system, either upstream when the gas is cooled after leaving the gasification process, or downstream, such as recovered from the turbines. Pre-heating may be useful where the gas cooling system cools the fuel gas to a temperature required by a scrubber, and that temperature is below a desirable temperature for the cleaned fuel gas that is to be introduced into combustion chamber. Steam injection can also be used on some combustion turbines to control NOx formation, and constitutes an alternate to dry emission technology.

An Internal Combustion Engine

Energy can be produced using a process similar to that discussed above except that the compressor, combustor and gas turbine are replaced by an internal combustion engine. An internal combustion engine may be easier to utilize and may be more cost efficient than a compressor-gas turbine, especially for small-scale gasification electroconversion units. Air and auxiliary fuel may be fed to the internal combustion engine in a predetermined manner based on the composition of fuel gas.

Environmentally attractive low emission internal combustion engine-generator systems for gasification systems can be provided to greatly improve efficiency and pollution reduction. Spark ignition internal combustion engines are advantageous in that such engines are less expensive for very small units and are easier to start and stop than turbines. To facilitate production of a desired level of electrical power, particularly during startup, an auxiliary power such as hydrogen-rich gas, propane, natural gas or diesel fuel may be used to power the internal combustion engine. The amount of auxiliary fuel may vary depending on the heating value of the carbonaceous feedstock being gasified and the power requirements for the overall gasification system.

The use of internal combustion engines to generate electricity, particularly in the context of distributed electric power generating systems, represents an already mature technology. Although diesel engines have captured the majority of this market, other types of internal combustion engines can be readily adapted to run on the syngas produced by this system.

Output syngas from the GCS suitable for use in internal combustion engines contains limited concentrations of HCl and $H_2S$. In one embodiment, output syngas comprises less than 10 ppm HCl. In one embodiment, output syngas comprises less than 7 ppm HCl. In one embodiment, output syngas comprises less than 5 ppm HCl. In one embodiment, output syngas comprises less than 3 ppm HCl. In one embodiment, output syngas comprises less than 30 ppm $H_2S$. In one embodiment, output syngas comprises less than 25 ppm $H_2S$. In one embodiment, output syngas comprises less than 20 ppm $H_2S$. In one embodiment, output syngas comprises less than 10 ppm $H_2S$.

Fuel Cell Technologies

The syngas from plasma converter can be fed into a high temperature fuel cell (either SOFC or MCFC), after removing contaminants, such as PM, HCL and H2S, at relatively high temperatures (SOFC, 1000° C.; MCFC 650° C.). More stringent contaminant limits have to be met in order to prevent the degradation of fuel cell performance. The GCS configuration is required to vary to fit the fuel cell operation conditions. The syngas and oxidant compositions also need to be adjusted to optimize the efficiency or output of a high temperature fuel cell.

Molten carbonate fuel cells (MCFC) contain an electrolyte that is a combination of alkali (Li, Na, and K) carbonates stabilized in a $LiAlO_2$ ceramic matrix. The gaseous input fuel mixture can include carbon monoxide, hydrogen, methane, and hydrocarbons, with limits on total hydrocarbons, particulate loading, sulphur (in the form of $H_2S$), ammonia, and halogens (e.g., HCl). At the operating temperature of about 1200° F. (650° C.), the salt mixture is liquid and a good ionic conductor.

The anode process for an MCFC involves a reaction between hydrogen and carbonate ions ($CO_3^-$) from the electrolyte, which produces water and carbon dioxide ($CO_2$), while releasing electrons to the anode. The cathode process combines oxygen and $CO_2$ from the oxidant stream with electrons from the cathode to produce carbonate ions, which enter the electrolyte. If the $CO_2$ content in the fuel gas is insufficient, $CO_2$ can be recycled from the emission stream. An MCFC produces excess heat at a temperature, which is sufficiently high to be usable in producing high pressure steam that may be fed to a turbine to generate additional electricity. In combined cycle operation (steam turbine powered generation and fuel cell power generation), electrical efficiencies in excess of 60% are predicted for mature MCFC systems.

A solid oxide fuel cell (SOFC) uses a hard ceramic electrolyte instead of a liquid and operates at temperatures up to 1,000° C. (about 1,800° F.). In this type of fuel cell, a mixture of zirconium oxide and calcium oxide forms a crystal lattice, although other oxide combinations have also been used as electrolytes. The solid electrolyte is coated on both sides with specialized porous electrode materials. At a relatively high operating temperature, oxygen ions (with a negative charge) migrate through the crystal lattice.

The fuel gas containing hydrogen and carbon monoxide is passed over the anode while a flow of negatively charged oxygen ions moves across the electrolyte to oxidize the fuel.

The oxygen is supplied, usually from air, at the cathode. Electrons generated at the anode travel through an external load to the cathode, completing the circuit that carries the electrical current.

Generating efficiencies can range up to about 60 percent. Like molten carbonate fuel cells, solid oxide cells require high operating temperatures that provide the opportunity for "co-generation"—i.e., a combined heat and power application using waste heat to generate steam for space heating and cooling, industrial processing, or for use in driving a steam turbine to generate more electricity.

A (high-temperature) fuel cell would consume the hydrogen and (primarily in SOFCs) and carbon monoxide from the syngas provided by the GCS. Methane contained in the fuel gas would be partially reformed in a high-temperature fuel cell, resulting again in hydrogen and carbon monoxide. The gas mixture exiting the fuel cell would likely still include useful quantities of methane and carbon monoxide gases. These hot gases could be directed back into a regulation system or diverted to more heat exchangers, which could be used for the production of steam that is used in the converter.

Alternatively, hot but cleansed syngas can be input to a high temperature hydrogen membrane filtering system to split the synthesis gas into two distinct gas streams. One stream is composed of pure hydrogen and the other of pure carbon monoxide (CO). Carbon monoxide can either be combusted in a gas-fired boiler to facilitate the recovery of carbon dioxide ($CO_2$) and the conversion of its potential energy in steam, or it can be transported to a compressor and bottled. The hydrogen ($H_2$) can either be converted into energy in fuel cells or it can be transported to a compressor and then fed into containers holding either/or a graphite nano-fiber storage medium or an anhydrous aluminum storage medium, so that the $H_2$ can be safely stored or transported.

A hydrogen feed line can be provided from the high temperature hydrogen membrane filtering system, to fuel cell stacks as a fuel supply to them. Fuel cell stacks of this system are of the molten carbonate type that use hydrogen gas at the anode and $CO_2$ at the cathode to produce electricity. The carbon monoxide present in the syngas produces extra hydrogen as well as heat (up to 1500° F.) which can be recovered to produce steam, carbon dioxide and water.

A carbon monoxide line may be provided to direct carbon monoxide from the high temperature hydrogen membrane filtering system to a conventional gas-fired boiler. The gas fired boiler combusts the CO so that $CO_2$ and the potential energy value of the CO manufactured by the gasification system may be recovered more cost effectively.

Some upstream gasification systems will be designed for the input of more than one fuel or feedstock into the boiler, thereby providing versatility for increased amounts of power generation as required or desirable. Examples of additional fuel sources include natural gas, as well as the gases obtained from the anaerobic digestion of organic wastes (also referred to as biogas).

Depending on the specific electric power generating device selected, it may be beneficial to include other types of fuel, in addition to the syngas generated in the gasification system, to maximize the efficiency of the electrical generator. Such additional fuels, indicated by optional fuels, can include natural gas, oil, and other conventional hydrocarbon-based fuels. It should be noted that the optional fuels are not intended to provide the majority of the BTUs or energy consumed by the electrical generators, but instead are included only when they can enhance the overall efficiency of the system.

An alternative configuration employs a gasification system that allows for the use of molten carbonate fuel cells, together with the production of $CO_2$ and $H_2O$ with greatly reduced emissions of oxides of nitrogen, carbon monoxide or unburned hydrocarbons. Instead of employing a gas fired boiler to make use of the carbon monoxide, the carbon monoxide is fed, along with hydrogen, to fuel cells. These fuel cells may be molten carbonate or other types of fuel cells, which consume the carbon monoxide as a valuable fuel.

Cooled pure hydrogen is ideal for use in proton exchange membrane fuel cell (PEMFC) stacks. As in other fuel cells, the chemical energy of the fuel is directly transformed into electricity. Electricity is generated via the following electrochemical reactions:

Anode: $2H_2 => 4H^+ + 4e^-$

Cathode: $O_2 + 4H^+ + 4e^- => 2H_2O$

These reactions occur at low temperature (<100° C.) and involve splitting hydrogen into electrons and positive charged hydrogen ions (protons) at the platinum catalytic layer of the anode, passing protons through the proton exchange membrane (electrolyte) and their electrochemical oxidation at the cathode catalyst. The electrolyte (solid polymer membrane) must be saturated with water and as a result a careful control of the moisture of the anode and cathode streams is required. Moreover, low quantities of CO (higher than 1 ppm) and $H_2S$ poison catalyst on the anode what renders strict requirements to the purity of hydrogen. Comparing to other types of fuel cells, PEMFCs generate more power for a given volume and weight and allow a rapid start-up. The contemporary efficiency of the PEMFC stacks reaches values of 35-45%.

A system can also be designed which allows the use of hydrogen gas driven turbines to generate electricity without damage to critical internal components from the high combustion temperature of synthesis gas and greatly reduced emissions of oxides of nitrogen. The hydrogen from the high temperature hydrogen membrane may be input to a fogger water injection system where de-ionized water is added before the combination is burned in a gas turbine (or alternatively an internal combustion engine) to convert the energy to mechanical force and drive a generator which provides electricity. The water limits the internal temperatures and thereby prevents heat damage to critical internal components. In addition, the fogger water injection system makes operation possible in locations and/or at times when such alternative fuels may not be readily available in quantity. In addition, the use of the irrigation fogger markedly lowers nitrous oxide emissions caused by the high temperatures of the combustion of synthesis gas and/or alternative fuel mixes.

As is known in the art, the desired characteristics for syngas that is to be used in fuel cells can vary depending on the type of fuel cell used, as shown in Table 3 below.

TABLE 3

General Fuel Cell Characteristics

| Fuel Cell Type | Typical Operation (° C.) | Allowable Concentrations of Gas-Phase Constituents: | | | |
|---|---|---|---|---|---|
| | | CO | $CO_2$ | Sulfur | Hydrocarbons |
| PEM | 80 | <5 ppm | <50 ppm | <1 ppm | Restrictive[a] |

TABLE 3-continued

General Fuel Cell Characteristics

| Fuel Cell Type | Typical Operation (° C.) | Allowable Concentrations of Gas-Phase Constituents: | | | |
|---|---|---|---|---|---|
| | | CO | $CO_2$ | Sulfur | Hydrocarbons |
| Alkaline[b] | 120 | <50 ppm[c] | <50 ppm[c] | <1 ppm | <300 ppm |
| Phosphoric Acid | 200 | <1% | Diluent[d] | <1 ppm | Diluent[d] |
| Molten Carbonate | 650 | Unrestricted[e] | Unrestricted[e] | <0.5 ppm | <10%[f] |
| Solid Oxide | 1000 | Unrestricted[e] | Unrestricted[e] | <1 ppm | <10%[f] |

[a]Variable depending on construction, usually <100 ppm
[b]Designed primarily for use with pure hydrogen and oxygen
[c]Total CO + $CO_2$ concentrations <50 ppm required. Cell particularly sensitive to $CO_2$
[d]Serves primarily as diluent; low concentrations preferred
[e]Unrestricted within the range of values typical for gasification
[f]Higher concentrations in the fuel stack impact economics due to dilution Thus, in one embodiment where the fuel cell is an SOFC, the content of HCl in the output syngas should be less than 1 ppm, the sulphur content should be less than 1 ppm, and the hydrocarbon content should be less than 10%.

In one embodiment where the fuel cell is an MCFC, the content of HCl in the syngas is less than 0.5 ppm, the sulphur content should be less than 0.5 ppm, and the hydrocarbon content should be less than 10%.

To gain a better understanding of the invention described herein, the following examples are set forth. It will be understood that these examples are intended to describe illustrative embodiments of the invention and are not intended to limit the scope of the invention in any way.

EXAMPLES

Example 1

A GCS for Production of Conditioned Gas Suitable for Use in Gas Engines

The following example describes a GCS that is configured to produce conditioned gas suitable for use in gas engines. The GCS comprises the following process operations:
Stage One Processes:
1. Evaporative Cooling (Quench)
2. Dry injection system
3. Particulate matter/heavy metal removal
4. Processing of the solid residue in a solid residue gas conditioner and associated solid residue GC
Stage Two Processes:
5. HCl Scrubber
6. Process Gas Blower
7. Gas Cooler
8. Mercury polisher
9. Sulphur Removal The conditioned gas produced by the above process operations is stored and subsequently heated prior to use.

The above process operations are shown in FIG. 2 and described below. As can be seen from FIG. 2 the GCS employs converging process steps and comprises a converter gas conditioner 4 integrated with a solid residue gas conditioner 5, as well as a solid residue conditioner 265. Syngas exiting from the converter 50 (input gas) is cooled using a heat exchanger 210 from approximately 1000° C. to about 740° C. prior to being fed into the GCS.

The output gas that results from processing through the GCS contains less than 17 mg/$Nm^3$ particulate matter, less than 5 ppm HCl, and less than 10 ppm $H_2S$.

Stage One

Input gas particulate and heavy metal loading (mainly fly-ash with heavy metals) is as follows:

| Design Gas flow rate | 9500 $Nm^3$/hr |
|---|---|
| Dust loading | 7.4 g/$Nm^3$ |
| Cadmium | 2.9 mg/$Nm^3$ |
| Lead | 106.0 mg/$Nm^3$ |
| Mercury | 1.3 mg/$Nm^3$ |

Guaranteed Stage One Output Gas Specifications:

| Particulate matter | 11 mg/$Nm^3$ (about 99.9% removal) |
|---|---|
| Cadmium | 15 µg/$Nm^3$ (about 99.65% removal) |
| Lead | 159 µg/$Nm^3$ (about 99.9% removal) |
| Mercury | 190 µg/$Nm^3$ (about 90% removal) |

(1) Evaporative Cooling 220

After initial cooling in the heat exchanger 210, the input syngas is further cooled by dry quenching, which effectively lowers the syngas temperature and prevents condensation. Evaporative cooling is carried out by an evaporative cooling tower 220 (dry quench) to bring down the syngas temperature to about 260° C. (range 150° C. to 300° C.). This is achieved by direct injection of water into the gas stream in a controlled manner (adiabatic saturation). This is a dry quench, and there are controls to ensure that water is not present in the exiting gas and the relative humidity at the exiting gas temperature is, therefore, below 100%.

(2) Dry Injection System 271

Once the gas stream exits the evaporative cooling tower 220, activated carbon is then injected directly inside the gas stream, to remove heavy metals from the gas stream. The activated carbon is stored in a hopper and injected pneumatically into the gas stream. Carbon injection captures most of the heavy metals and the spent carbon granules are collected by the baghouse 230 and recycled back to the solid residue conditioner 265 for further energy recovery as described in the next steps. Activated carbon is injected in the gas with sufficient residence time so that the fine heavy metal particles (cadmium, lead, mercury) are adsorbed on the activated carbon surface.

(3) Particulate Matter Removal

Particulate matter and activated carbon with heavy metal on its surface is then removed from the input syngas in the baghouse 230 with extremely high efficiency, to provide an output gas that meets local metals emissions limits and to protect the downstream gaseous contaminant removal subsystems and the gas engines that will utilise the conditioned gas.

Particulate matter removal proceeds as follows. In the baghouse 230, a filter cake is formed with particulate matter on the fabric filters. This filter cake improves particulate removal efficiency of the baghouse 230 operation. The baghouse 230 employs lined fibreglass bags, unlined fibreglass bags, or P84 basalt bags and is operated at a temperature between 200° C. and 260° C. The baghouse is thus designed for 99.9% particulate matter removal efficiency. Heavy metals like cadmium and lead are in particulate form at this temperature and are collected in the baghouse with very high collection efficiency. A pulse jet of nitrogen is used to clean the bags when the pressure drop across the bags increases to a certain set limit. Nitrogen is the pulsing gas in this embodiment for safety reasons since air and syngas form an explosive mixture.

The baghouse utilises cylindrical filters, which typically do not require any additional supports. The baghouse itself may be cylindrical or rectangular.

The operating parameter setup avoids any water vapour condensation. Special reagents such as feldspar can be used to absorb the high molecular weight hydrocarbon compounds (tars) in order to protect the baghouse. The gas exiting the Stage One processing is then processed through Stage Two processes.

(4) Processing of Particulate Matter in a Solid Residue Gas Conditioner 265 and Associated Solid Residue GC 5

The quantity of solid residue contaminated with heavy metals exiting the converter gas conditioner 4 is large and is, therefore, sent to a solid residue conditioner 265 for conversion of the solid residue into slag. The gas created in the solid residue conditioner 265 is then treated in a solid residue gas conditioner 5 for removal of heavy metals by cooling in an indirect air-to-gas heat exchanger 270 and removal of particulate matter and heavy metals in a small baghouse filter 285. The small baghouse filter 285 is dedicated to treating gas from the solid residue conditioner 265. As shown in FIG. 2, additional steps carried out by the solid residue gas conditioner 5 include cooling the gas further using a gas cooler 290, and removing heavy metals and particulate matter in a carbon bed 295. The processed secondary syngas stream is then diverted back to the converter gas conditioner 4 to feed back into the input syngas stream prior to the baghouse filter step 230.

The quantity of solid residue removed from the small baghouse 285 of the solid residue gas conditioner 5 is significantly less than that removed from the baghouse 230 in the converter gas conditioner 4. The small baghouse 285 acts as a purge for the heavy metals. The amount of heavy metals purged out of the solid residue gas conditioner 5 varies depending on MSW feed composition. In general, only a periodic purge is required when the heavy metals build-up to a specified limit. As an alternative to purging from the small baghouse 285 to hazardous waste disposal, solid residue from the small baghouse can be re-circulated back to the solid residue conditioner 265 for melting.

Design Specifications for Solid Residue Conditioner Baghouse 285:

Inlet Gas Particulate and Heavy Metal Loading (Mainly Fly Ash with Heavy Metals)

| | |
|---|---|
| Design Gas flow rate | 150 Nm³/hr |
| Dust loading | 50 g/Nm³ |
| Cadmium | 440 mg/Nm³ |
| Lead | 16.6 g/Nm³ |
| Mercury | 175 mg/Nm³ |

Guaranteed Output:

| | |
|---|---|
| Particulate Matter | 10 mg/Nm³ (99.99% removal) |
| Cadmium | 13 µg/Nm³ (99.997% removal) |
| Lead | 166 µg/Nm³ (99.999% removal) |
| Mercury | 175 µg/Nm³ (99.9% removal) |

Both the converter gas conditioner baghouse 230 and the solid residue gas conditioner baghouse 285 have a dust sensor on the exit (direct feedback or monitoring) to notify of a bag rupture. If a bag rupture occurs, the system may be shutdown for maintenance.

Stage Two (5) HCl Removal

Figure 13:
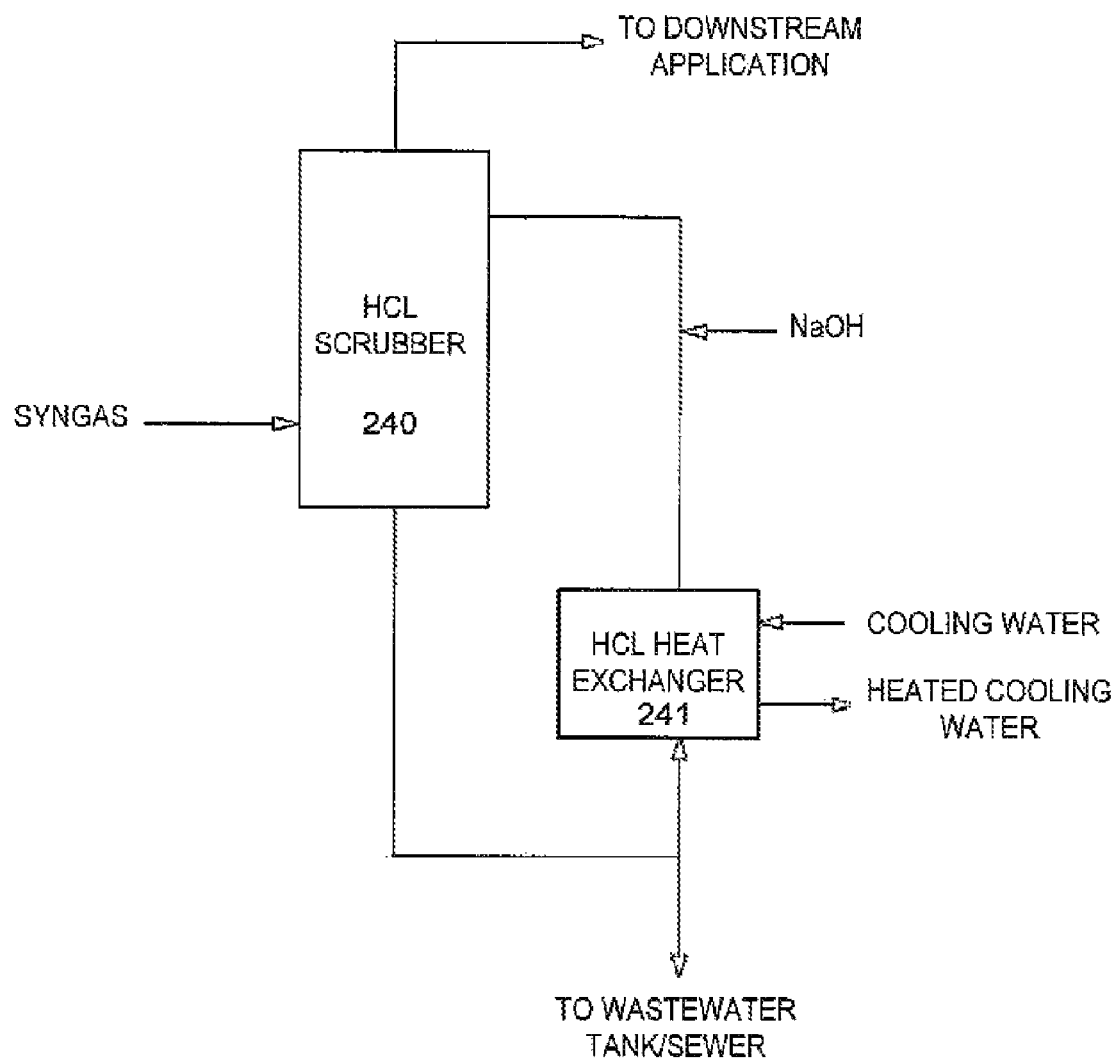
FIG. 13 presents an exemplary schematic diagram of a portion of a GCS according to an embodiment of the invention, showing an HCl scrubber and associated components.
Figure 14:
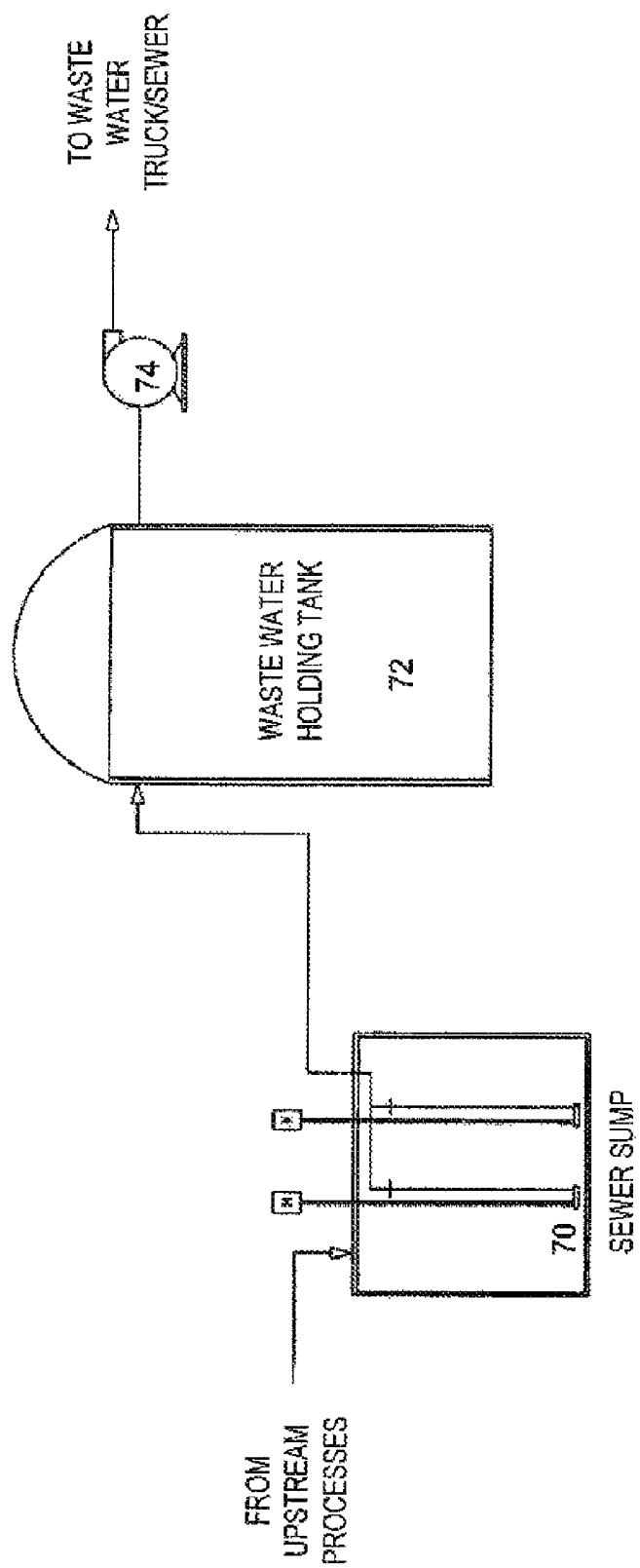
FIG. 14 shows a system for collecting and storing waste water from the GCS, according to one embodiment.

After particulate matter is removed from the syngas in the converter gas conditioner 4, an HCl scrubber 240 is used for HCl removal. The HCl scrubber 240 is located upstream of a gas moving means or process gas blower 245 for metallurgical considerations on the blower. The HCl scrubber 240 can include an associated heat exchanger 241 as shown in FIG. 13. As shown in FIG. 13, the HCl scrubber 240 is a packed tower where almost all the HCl in the gas stream will react with a re-circulating alkaline solution, NaOH as shown. A heat exchanger 241 regulates the temperature of the system. The packed tower also provides enough contact area to cool down the gas to about 35° C. A carbon bed filter 242 is used to separate potential soluble water contaminants, such as heavy metals, HCN, ammonia, tars and the like from the liquid solution. The HCl scrubber 240 is designed for 5 ppm HCl outlet concentration. This reduces emission of HCl from engine exhaust of a downstream application up to 2 ppm. A waste water bleed stream is sent to a waste water storage tank for disposal. FIG. 14 shows an exemplary system for collecting and storing waste water from the GCS, in which waste water is collected from the HCl scrubber 240 and/or other upstream processes in a sewer sump 70 and then fed into a waste water holding tank 72. A waste water pump 74 is used to transfer waste water from the holding tank to the sewer or to a truck for transport offsite.

| | |
|---|---|
| Design Gas flow rate | 9500 Nm³/hr |
| Normal Inlet/Max HCl loading to scrubber | 0.16%/0.29% |
| HCl outlet concentration | 5 ppm |

The water stream in the HCl scrubber 240 is analyzed at start-up to confirm particulate matter removal efficiency.

(6) Process Gas Blower

After HCl is removed from the input syngas, a gas blower 245 is employed at this point to provide the driving force for the gas throughout the process from the exit of the converter 50 up to the engines of the downstream application. It is located upstream of the mercury polisher 250 because the polisher 250 has a better mercury removal efficiency under pressure. This also allows the size of the mercury polisher vessel to be reduced.

The blower 245 is designed using all upstream vessel design pressure drops. It is also designed to provide the required pressure for downstream equipment pressure losses to have a final pressure of ~2.5 psig in the gas storage tank (or "homogenization chamber").

(7) Gas Cooler

As the gas is pressurized through the blower 245, its temperature rises to about 77° C. As the input gas passes through the gas cooler 246 the temperature of the input gas is reduced back to 35° C. This is required for the operation of the downstream $H_2S$ removal system 260. The $H_2S$ system maximum design temperature is 40° C.

(8) Mercury Polisher

A carbon bed filter 250 is used as a finial polishing device for any heavy metal remaining in the input syngas stream. The carbon bed efficiency is improved when the system is under pressure instead of vacuum, is at lower temperature, gas is saturated and HCl is removed from the gas so that it does not deteriorate the carbon. This additional metal removal step also provides the flexibility in controlling the metals in the system.

The performance of the mercury polisher is measured by analyzing the gas for mercury. The monitoring does not need to be on-line and can simply involve periodic verification by snap sampling. Corrections are made by modifying the carbon feed rate and monitoring the pressure drop across the polisher 250, and by analyzing the carbon bed efficiency via sampling.

The carbon bed filter is designed for over 99% mercury removal efficiency.

| | |
|---|---|
| Design Gas flow rate | 9500 Nm3/hr |
| Normal/Max Mercury loading | 190 μg/Nm3/1.3 mg/Nm3 |
| Carbon bed life | 3-5 years |
| Guaranteed mercury carbon bed outlet | 19 μg/Nm3 (99%) |

(9) Sulphur Removal

Figure 15:
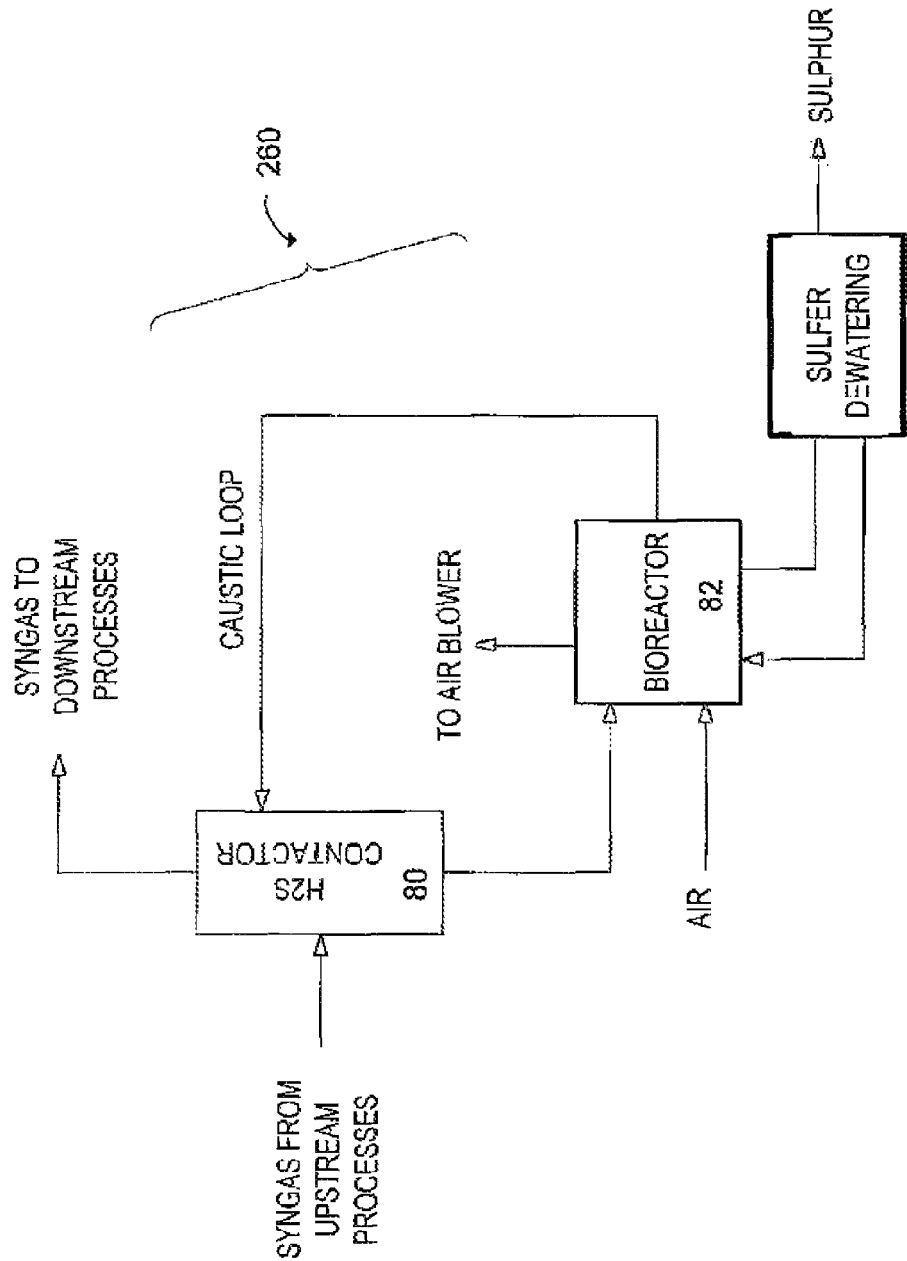
FIG. 15 depicts a process flow diagram of an $H_2S$ removal process using Thiopaq according to one embodiment of the invention.

After additional heavy metals are removed in the mercury polisher 250, sulphur in the input gas is removed using an $H_2S$ removal system 260. The $H_2S$ removal system 260 is based on $SO_2$ emission limitations outlined in A7 guide lines of the Ministry of Environment, Ontario, Canada. $H_2S$ removal efficiency will be such that the gas leaving the GCS and being combusted in the gas engines will produce $SO_2$ emission below 15 ppm. The $H_2S$ removal system 260 is designed for 20 ppm $H_2S$ outlet concentration (outlet of $H_2S$ system). FIG. 15 shows an exemplary schematic diagram of a suitable $H_2S$ removal system 260 and associated components that utilises Shell paques technology. Paques is a two step process: (1) $H_2S$ removal from gas stream in an $H_2S$ contactor 80, and (2) sulphur recovery—This includes a bio-reactor 82 for oxidation of sulphide into elemental sulphur, filtration of sulphur, sterilization of sulphur and bleed stream to meet regulatory requirements.

Input gas from the carbon bed filter 250 passes through a $H_2S$ contactor 80 where $H_2S$ is removed from syngas by re-circulating an alkaline solution. The sulphide containing solution from the scrubber is sent to a bio-reactor 82 for regeneration of alkalinity.

In the bio-reactor, *Thiobacillus* bacteria convert sulphide into elemental sulphur by oxidation with air. A control system controls the airflow rate into the bio-reactor 82 to maintain sulphur inventory in the system. A slipstream of the bio-reactor 82 is filtered into a filter press. Filtrate from filter-press is sent back to the process, a small stream from this filtrate is sent as a liquid bleed stream.

There are two sources of discharge; one solid discharge—sulphur with some biomass and one liquid discharge—water with sulphate, carbonate and some biomass. Both streams are sterilized before final disposal.

| | |
|---|---|
| Design Gas flow rate | 8500 Nm3/hr |
| Normal/Max H$_2$S loading | 353 ppm/666 ppm |

Performance guarantee required after $H_2S$ removal system:
Guaranteed $H_2S$ outlet for system—20 ppm
Gas Storage and Gas Heating The cleaned and cooled output syngas is transferred to a gas storage tank for storage. The purpose of the gas storage tank is to homogenize its composition (heating value—LHV) and its pressure.

As gas engine design requires that the inlet gas be of a specific composition range at a specified relative humidity, prior to use, the gas can be passed through a chiller to condense the water out of the syngas and sub-cools the gas from 35° C. to 26° C. The water condensed out from the input gas stream is removed by a gas/liquid separator. This ensures that the gas has a relative humidity of 80% once reheated to 40° C. (engine requirement) after the gas storage prior to being sent to the engines.

The above-described GCS has the following specifications:

TABLE 4

| GCS specifications | |
|---|---|
| Quench Tower | quench gas from 740° C. to 200° C. in 2 sec residence time |
| Activated Carbon Injection | 90% mercury removal efficiency |
| Baghouse | 99.9% Particulate removal efficiency |
| | 99.65% Cadmium removal efficiency |
| | 99.9% Lead removal efficiency |
| Hcl Scrubber | 99.8% HCl removal efficiency |
| Gas Blower | zero leak seal rotary blower |
| Gas Cooler | 0.5 MBtu/hr cooling load |
| Carbon Bed Filter | 99% mercury removal efficiency |
| H$_2$s Scrubber | H$_2$S at scrubber outlet - 20 ppm |
| Bio Reactor | Maximum regeneration efficiency with minimum blow-down |
| Filter Press | 2 days sulphur removal capacity |
| Gas Storage Tank | 2 min gas storage capacity |

The gas composition and condition of the input gas fed into the GCS as described in this example and the conditioned gas that results from processing through the GCS is shown in Table 5:

TABLE 5

| Gas Composition and Condition before and after GCS | | | |
|---|---|---|---|
| Syngas Composition | Unit | Inlet to GCS | Outlet of GCS |
| CH$_4$ | ppm | 215.00 | 242 |
| CO | % | 15.10 | 17.00 |
| CO$_2$ | % | 7.82 | 8.80 |
| COS | ppm | 21.00 | 0 |
| H$_2$ | % | 16.00 | 18.01 |
| HCl | ppm | 1,780.00 | 5 |
| H$_2$O | % | 16.03 | 5.73 |
| H$_2$S | ppm | 666.00 | 10 |
| N$_2$ | % | 44.77 | 50.41 |
| NH$_3$ | ppm | 8.00 | 0 |
| S$_2$ | ppm | 2.00 | 0 |
| SO$_2$ | ppm | 7.00 | 0 |
| Particulates | mg/Nm$^3$ | 5,000.00 | 17 |

Example 2

Overview of a GCS Comprising Converging Process Steps

Figure 9:
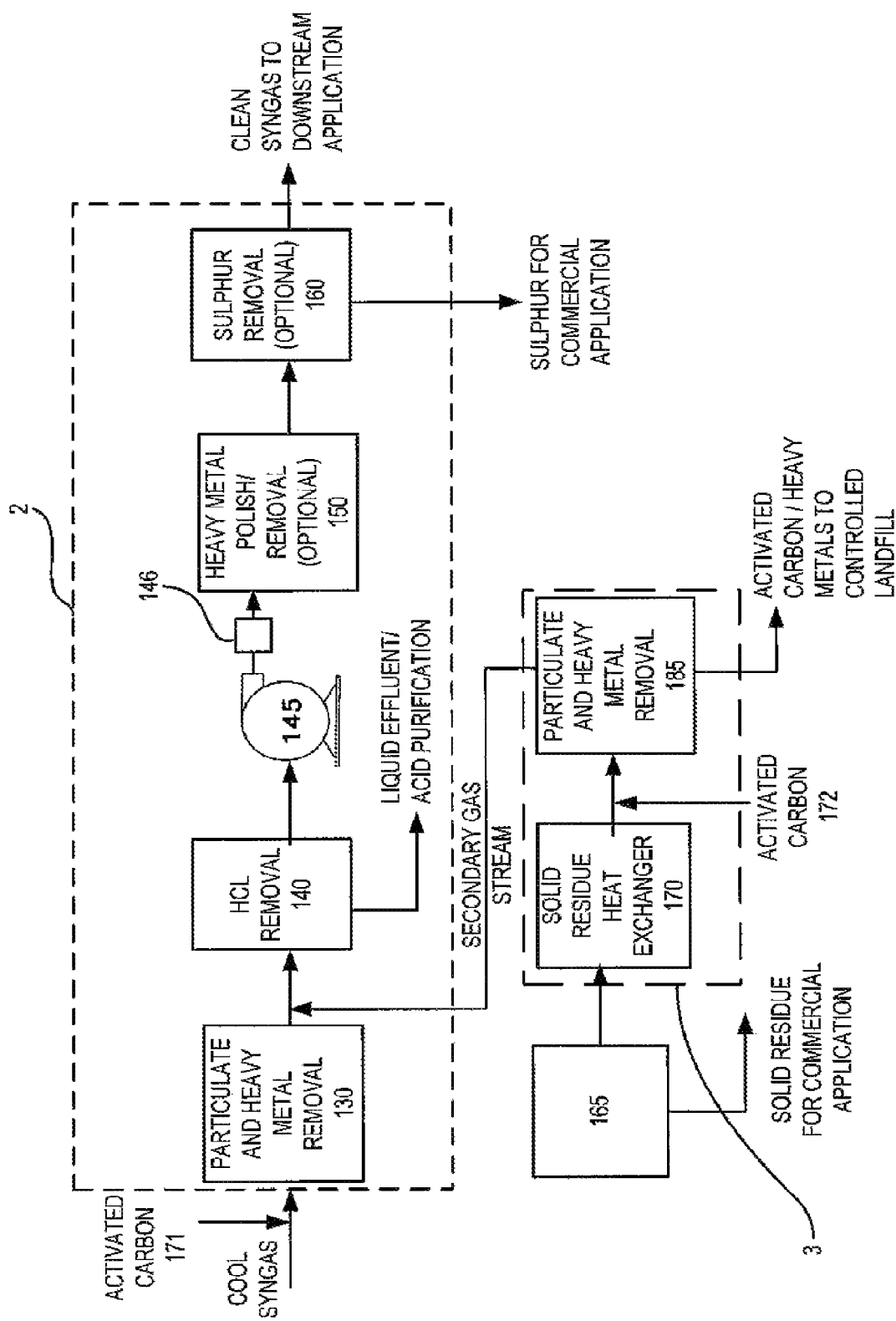
FIG. 9 depicts a process flow diagram of the processing steps carried out by a GCS according to one embodiment of the invention.

The following example provides an overview of a GCS which comprises converging process steps as shown in FIG. 9. In this example, the GCS comprises a converter gas conditioner 2 and a solid residue gas conditioner 3. in which a secondary gas stream generated in a solid residue conditioner 165 is processed in a solid residue gas conditioner 3 and then fed into the converter gas conditioner 2. In this example, the input gas has already been cooled prior to entering the GCS, for example, in a recuperator.

Stage One Processes

Activated carbon 171 is injected into the input syngas stream, and particulate matter and heavy metals are removed from the input gas using particle removal unit 130. The particulate matter and heavy metal removed from the input gas is collected and transferred to the solid residue conditioner 165 where it is converted to a solid residue and a secondary gas stream.

The secondary gas stream then enters a solid residue heat exchanger 170 where it is cooled. In a subsequent step, activated carbon 172 is injected into the secondary gas stream, and heavy metals or particulate matter in the secondary gas stream are separated from the secondary gas stream using particle removal unit 185. The secondary gas stream is then directed back to the converter gas conditioner 2 where it enters and is combined with the input gas stream after the particle removal unit 130 of the converter gas conditioner 2.

Stage Two Processes

Still with reference to FIG. 9, once particulate matter and heavy metals are removed from the input gas stream, the input gas stream combined with the secondary gas stream from the solid residue gas conditioner 3, is then directed to an HCl removal system 140 in which acid gases are separated from the input gas. HCl is present in the syngas if the carbonaceous feedstock used to generate the syngas in the low temperature gasifier includes chlorinated hydrocarbons.

In order to aid in the transfer of the input syngas from the HCl removal system 140 to the next process of the system, a gas moving unit 145 such as a blower or other suitable unit is used. In this example, an optional next step in the GCS is to remove heavy metals in a heavy metal polisher 150. The heavy metals and particulate matter removed in this step, along with those removed from the secondary syngas stream in the solid residue gas conditioner 3 are sent to a controlled landfill for disposal.

The next process as shown in FIG. 9 is also optional and is removal of sulphur 160 from the input syngas. Sulphuric acid is present if the carbonaceous feedstock used to generate the syngas in the converter is coal with a high sulphur content. Sulphur that is removed is collected and used in commercial applications. The output syngas is fed to a downstream application. Sulphur generated from this step can be further processed for use in commercial applications or for disposal.

Example 3

Overview of a GCS for High Temperature Gas Conditioning

This example describes a GCS for high temperature gas conditioning and provides an example of a linear process sequence. An overview of the processing steps carried out by this GCS is shown in FIG. 3. At large capacity applications, in order to improve the overall thermal efficiency, the syngas can be cleaned at temperatures as high as 760° C. The syngas exiting the converter 51 is cooled to approximately 760° C. in a heat exchanger 310. This cooled syngas (input syngas) then enters the GCS 6. Particulate matter and heavy metals are then removed from the input syngas in a cyclone separator or filter 330 (Stage One Process). The following Stage Two Processes are then carried out. A chloride guard bed 340 (Nahcolite) is used to remove HCl, followed by $H_2S$ removal 360 by sorbents. Finally, a ceramic filter 362 is used to remove any particles in the hot input syngas, prior to storage of the conditioned syngas.

The GCS according to this example generates minimal amounts of liquid waste (possibly the least of the examples as described in Examples 1, and 3 to 7) but may increase the amount of solid waste discharged, even if the sorbents used for acid gas removal are regenerated.

Example 4

Overview of a GCS in which there is No Activated Carbon Injection Step

Figure 4:
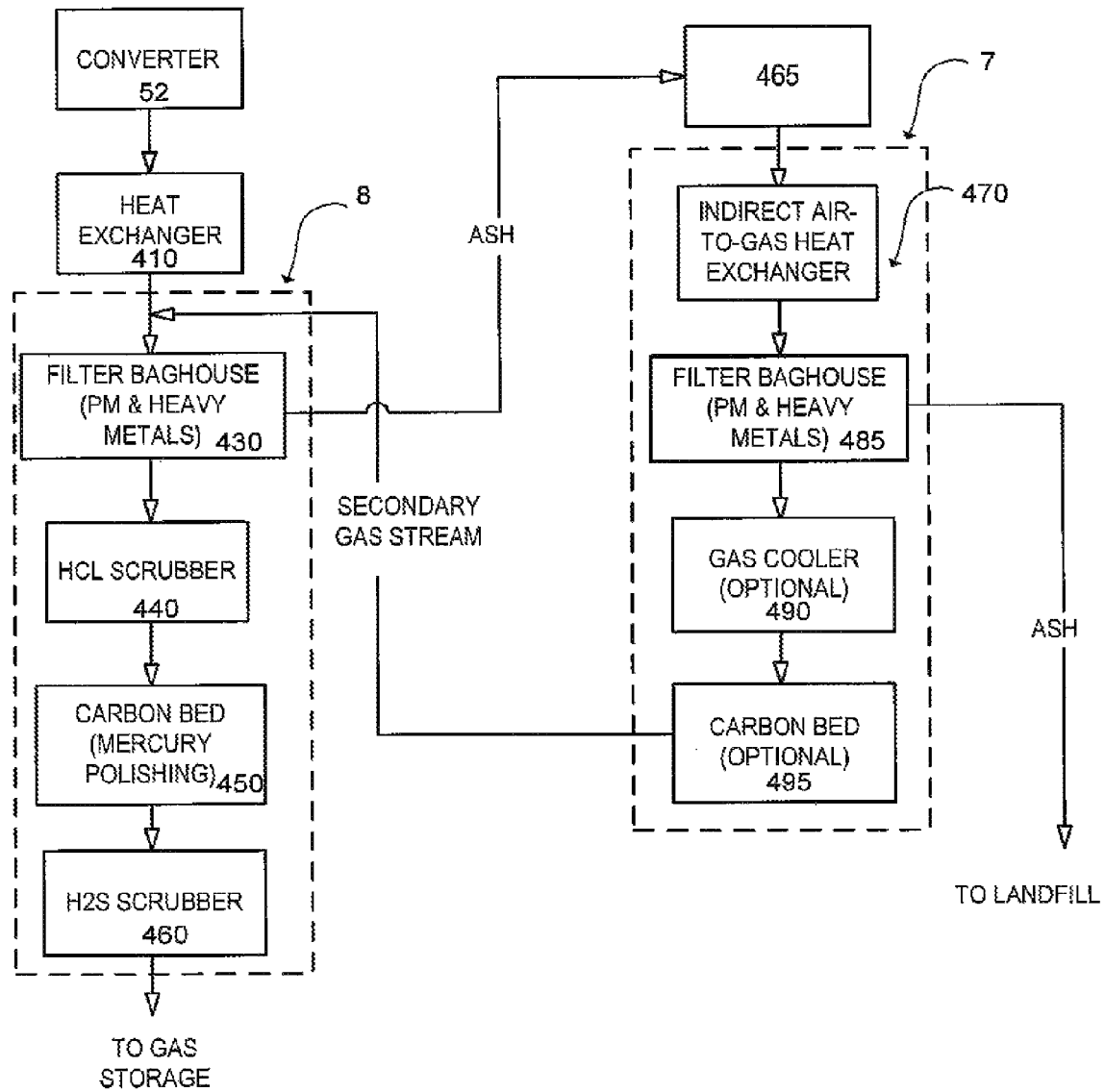
FIG. 4 depicts a process flow diagram of a GCS according to one embodiment of the invention.

This example describes an overview of the processing steps carried out by a GCS as shown in FIG. 4, in which no activated carbon is injected into the system. This example incorporates a converging process sequence.

Input gas from a converter 52 is cooled with a heat exchanger 410 and then enters a converter gas conditioner 8, where particulate matter is removed from the input gas stream using a baghouse 430. Particulate matter collected from the baghouse 430 is sent to a solid residue conditioner 465 to produce a secondary gas stream and a solid residue. The secondary gas stream is then processed in a solid residue gas conditioner 7. The solid residue gas conditioner 7 carries out Stage One processing steps of cooling the secondary gas stream in an indirect air-to-gas heat exchanger 470 and removing particulate matter from the secondary gas stream in a baghouse 485. Optional steps include gas cooling 490 and removal of heavy metals and particulate matter in a carbon bed 495. The secondary gas stream is then fed back to the converter gas conditioner 8 prior to the baghouse 430 and then flows through the baghouse 430. The input gas is then processed in Stage Two processing steps of acid gas removal in an HCl scrubber 440, followed by removal of heavy metals and particulate matter in a mercury polisher 450, and sulphur removal in an $H_2S$ scrubber 460.

The distinctions between the GCS shown in Example 1 and the GCS described in this example include:

A significant portion of the heavy metals pass through the baghouse 430 and are partially absorbed in the liquid streams in the subsequent subsystems, and eventually captured in the carbon bed 450. The heavy metal loading in the aqueous streams is higher than that observed for the GCS described in Example 1.

particulate matter loading decreases prior to baghouse 430

The amount of solids (ash) from the baghouse 430 is less than in the GCS described in Example 1.

The liquid stream (waste water) resulting from this GCS described in this Example has more contaminants such as heavy metals in it, as compared to the GCS described in Example 1, thus increasing the possibility that this liquid stream or waste water could be classified as hazardous waste and may require the use of a carbon filter on the waste water, which can increase the cost of the system. In this example, the lifetime of the downstream carbon bed might be shortened due to higher heavy metal loading, and more spent carbon will be generated, which will also be classified at hazardous waste if no regeneration is required.

Example 5

Overview of a GCS in which a Portion of the Cooled Syngas is Recycled

Figure 5:
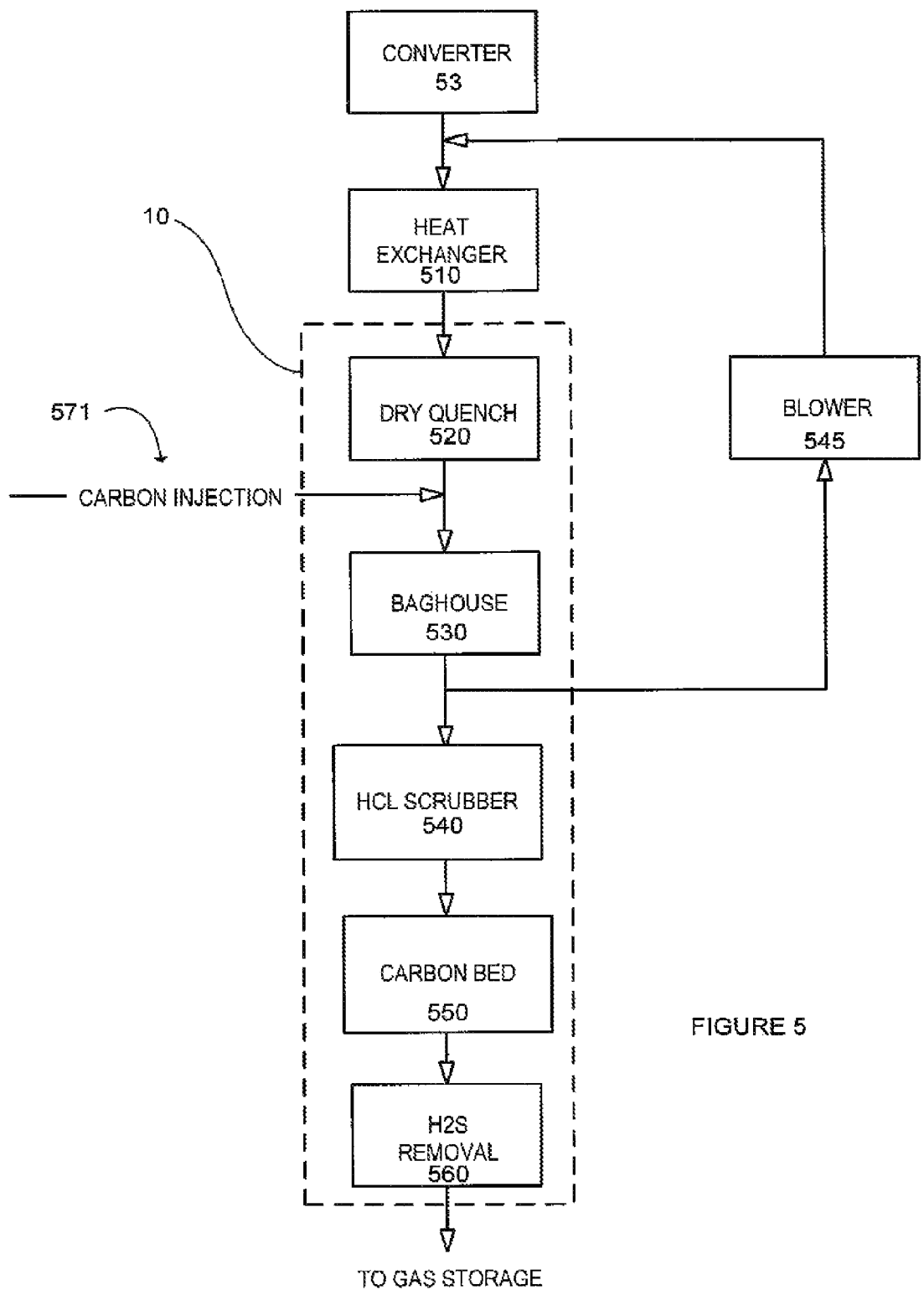
FIG. 5 depicts a process flow diagram of a GCS according to one embodiment of the invention.

An overview of the processing steps carried out by a GCS in which some of the cooled gas processed through the GCS is recycled through the system is shown in FIG. 5. This GCS provides an example of a linear process sequence.

Stage One Processes

The input gas is a syngas which exits the converter 53 and is cooled in a heat exchanger 510. This input gas then enters the GCS 10 and is cooled in a dry quencher 520 as described in Example 1. Carbon 571 is injected into the input syngas stream, and heavy metal and particulate matter are removed in a baghouse filter 530. The syngas exiting the baghouse 530 is split into two streams. In one stream, up to 30% of the syngas is recycled back to the exit of recuperator 510 (before dry quench 520) by the use of a blower 545. In this example, the cost and size of the dry quenching tower and the amount of water consumed can be minimized. In the other stream, the syngas exiting the baghouse 530 is processed through Stage Two processes in which HCl is removed in an HCl scrubber 540, followed by heavy metal and particulate matter removal in a carbon bed 550, and finally, $H_2S$ removal 560.

In this example, less liquid waste is generated than in the GCS described in Example 1, and the amount of solid waste generated is approximately the same as that generated in Example 1.

Example 6

Overview of a GCS in which Particulate Matter is Removed from the Input Syngas at High Temperature An example of a GCS in which particulate matter is removed from the input gas in a high temperature Stage One process is shown in FIG. 6 and differs from the GCS described in Example 1 in that a high temperature filter (particle separator) 605, such as a cyclone, is used to remove the coarse particles from the syngas. This significantly reduces particulate matter loading in syngas before the baghouse 630. The remaining fine particles are collected by the baghouse 630. In this example, the secondary gas stream processed through the solid residue gas conditioner 9 is fed back to the converter gas conditioner 12 prior to the heat exchanger 610.

In this example, input syngas from a converter 54 is processed to remove particulate matter at high temperature (Stage One Process) in a cyclone filter 605. Syngas from the cyclone filter 605 can either be further processed in Stage One processes of cooling in a heat exchanger 610, and removal of particulate matter and heavy metals in a baghouse filter 630, and then processed through Stage Two processes, or the syngas from the cyclone filter 605 can be fed directly to Stage Two processes of HCl removal 640, heavy metal and particulate removal in a carbon bed 650, and $H_2S$ removal 660, prior to gas storage. In this example, the waste stream generated from the HCl scrubber 640 is treated by filtration through a carbon bed 642 to remove heavy metals and particulate matter.

Particulate matter or ash from the baghouse 630 of the converter gas conditioner 12, is heated in the solid residue conditioner 665 to produce a solid material and a secondary gas stream. The secondary gas stream is processed via Stage One processing steps including cooling in an indirect air-to-gas heat exchanger 670, followed by removal of particulate matter and heavy metals in a baghouse 685. Further optional steps include cooling of the secondary gas stream in a gas cooler 690, and removal of heavy metals and particulate matter in a carbon bed 695. The secondary gas stream is then fed back to the converter gas conditioner 12 prior to cooling of the gas in the heat exchanger 610.

In this example the quantities of both the liquid waste stream and solid waste discharge are not significantly different from that of the GCS described in Example 1. However, the lifetime of the baghouse filter is prolonged.

Example 7

Figure 7:
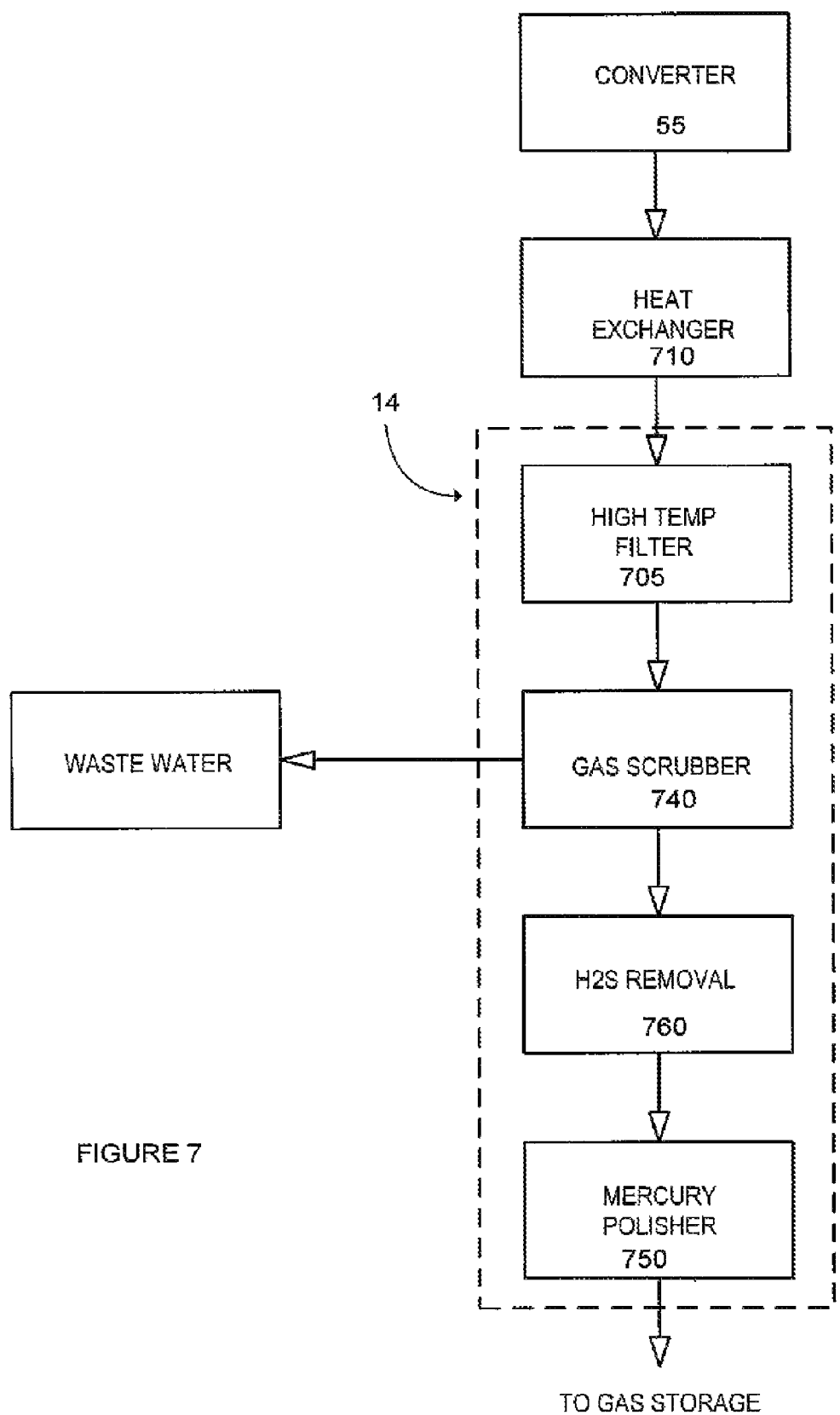
FIG. 7 depicts a process flow diagram of a GCS according to one embodiment of the invention.

Overview of a GCS which does not Include a Baghouse Filter for Removal of Particulate Matter An example of a GCS in which particulate matter is removed from the input gas stream using a particle removal unit other than a baghouse filter is described as follows and shown in FIG. 7. This GCS provides an example of a linear process sequence. As shown in FIG. 7, input gas is produced in a converter 55 and cooled in a heat exchanger 710. The input gas then enters the GCS 14. In this example, a baghouse is not incorporated into the Stage One processes of the GCS, but a high temperature filter 705 (either cyclonic or ceramic) is employed to remove a portion or most of the particulates before the syngas is processed through Stage Two processes including wet quenching in a water scrubber 740. Contaminants, which may include particulate matter, $NH_3$, HCN, HCl, tars and metals are absorbed in the liquid and treated in a waste water treatment facility. After the input gas is processed through the water scrubber 740, sulphur is removed in an $H_2S$ removal system 760, and heavy metals and particulate matter are removed in a mercury polisher 750.

In this example, large amounts of liquid waste containing the contaminants noted above will be generated and these amounts of liquid waste will require stringent treatment prior to disposal. The solid waste (separated ash) may contain heavy metals, organics and other inorganic species, and thus will be classed as hazardous waste, which will require the appropriate disposal procedures. As an optional process, if the solid waste is fed back to a solid residue conditioner, the solid waste will first require dewatering and drying, which will add to the cost of operating the GCS.

Example 8

Figure 8:
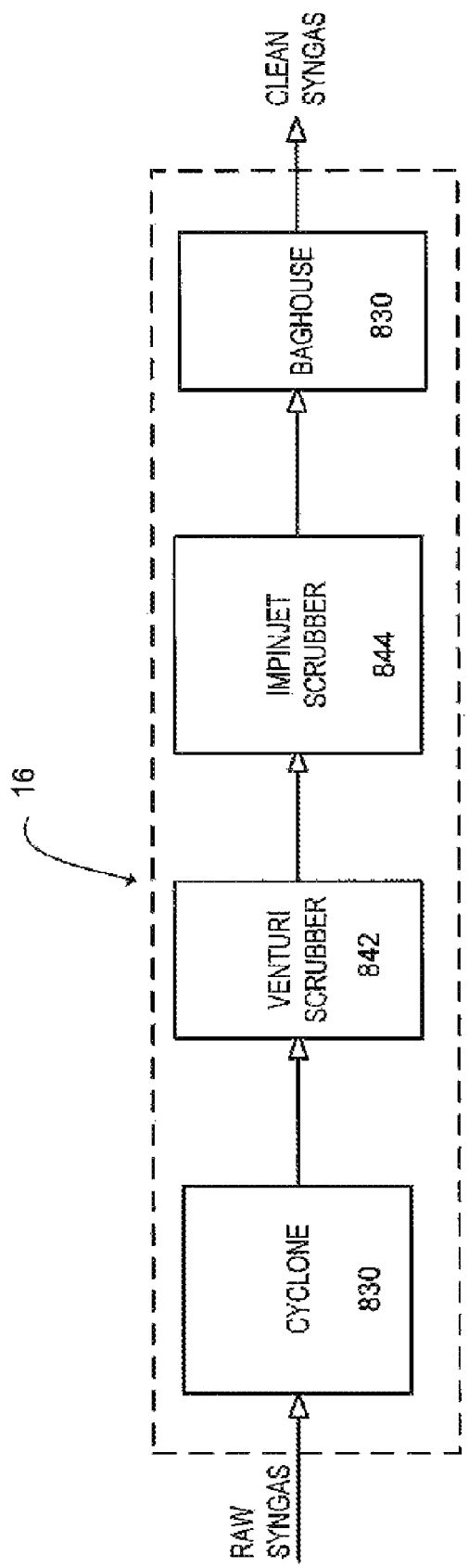
FIG. 8 presents a process flow diagram of the processing steps carried out by a GCS according to one embodiment of the invention.

Overview of a GCS in which Conditioned Gas is not Used for the Generation of Energy in Downstream Applications FIG. 8 depicts an example of a GCS in which the output gas is not used for the generation of energy in a downstream application. The GCS 16 in this example provides for the routing of the input gas through a Stage One process in which heavy metals and particulate matter are removed from the input syngas in a cyclone filter 830, followed by subsequent Stage Two processing steps using: a venturi scrubber 842, an impinjet scrubber 844, a condenser, a baghouse filter 830, an orifice and then into an exhaust mechanism. The GCS described here provides an example of a linear process.

Example 9

A Municipal Solid Waste Gasification Plant Comprising a GCS

The GCS can be integrated with a plasma gasification system and/or downstream applications. FIG. 10 depicts an overview process flow diagram of municipal solid waste gasification plant comprising an exemplary GCS which is integrated with a downstream application involving gas engines. In this example, the solid residue gas conditioner 11 comprises a gas cooler 1090 and an activated carbon bed 1095 after the baghouse 1085, and feeds back into the converter gas conditioner 18 prior to the baghouse 1030.

In this example, and with reference to the GCS shown in FIG. 10, input gas from the converter 56 of the plasma gasification system is cooled in a recuperator 1010 and then processed through a converter gas conditioner 18 in Stage One processes of further cooling in a dry quench process 1020, addition of activated carbon 1071 to the input gas stream, and removal of particulate matter and heavy metals in a baghouse 1030. The input gas is then processed through Stage Two processes including HCl removal in an HCl scrubber 1040, removal of heavy metals and particulate matter in a mercury polisher 1050 and $H_2S$ removal in an $H_2S$ removal system 1060. The material collected in the baghouse 1030 of the converter gas conditioner 18 is sent to the solid residue conditioner 1065 where it is converted to a solid residue and a secondary gas stream. The secondary gas stream generated in the solid residue conditioner 1065 is processed in a solid residue gas conditioner 11, through Stage One processes of cooling in an indirect air-to-gas heat exchanger 1070, removal of particulate matter in a baghouse 1085, followed by cooling in a gas cooler 1090 and additional heavy metal and particulate matter removal in an activated carbon bed 1095. The secondary gas stream is then is fed into the converter gas conditioner 18 where it is combined with the input gas stream prior to entry of the input gas stream into the baghouse 1030 of the converter gas conditioner 18. The input gas stream is then processed through the remaining Stage One and Stage Two processing steps of the converter gas conditioner 18.

Additional details of the process are described as follows:
Process Overview

Figure 16:
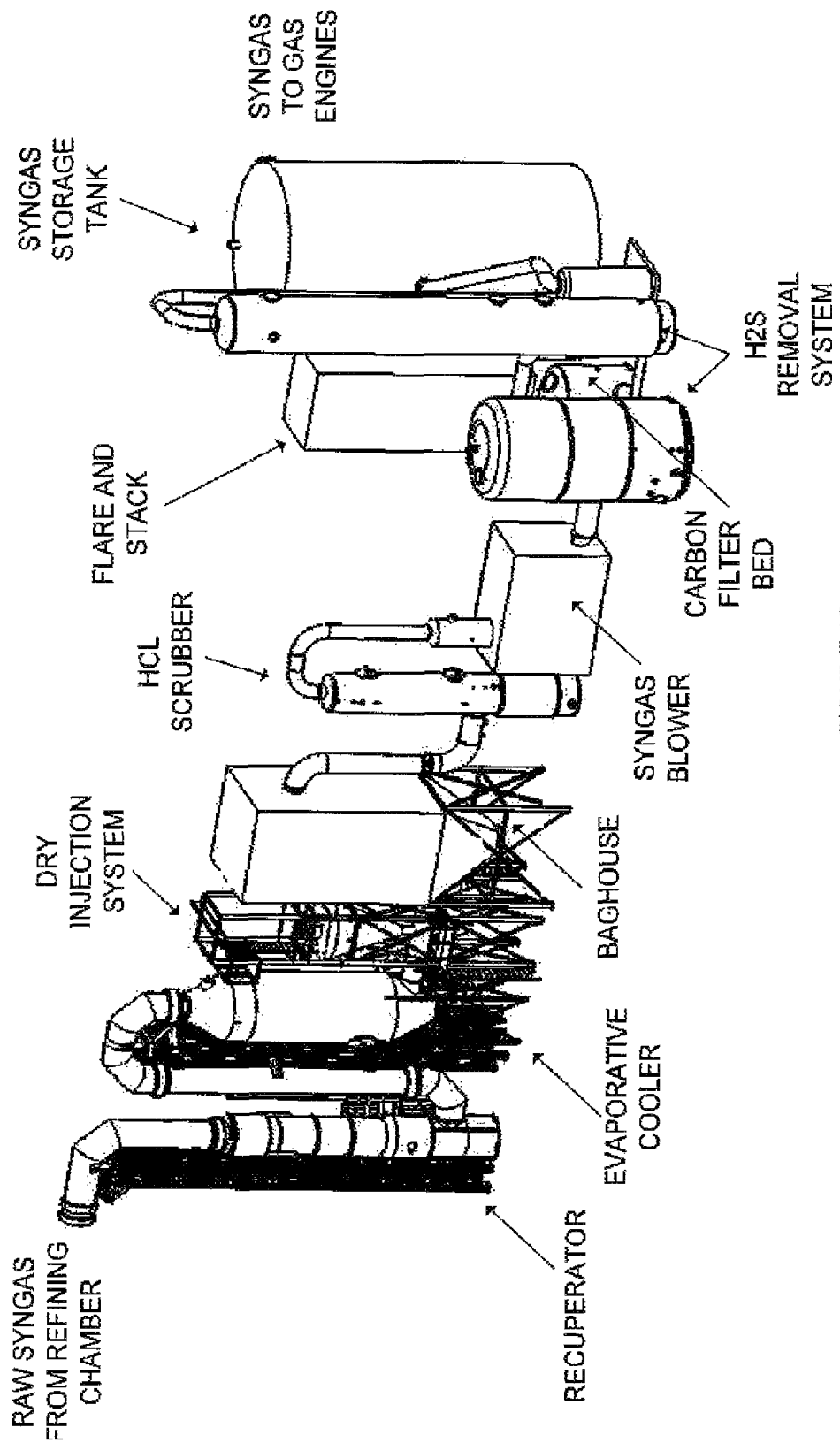
FIG. 16 depicts a GCS according to one embodiment integrated with a syngas regulation system.

The raw syngas exits the converter 56 and passes through a recuperator 1010. The recuperator 1010 cools the gas and the sensible heat is used to preheat the process air that is introduced into the converter 56. The cooled syngas then flows into a GCS, where the syngas is further cooled and cleaned of particulates, metals and acid gases sequentially. The GCS in this example comprises a converter gas conditioner 18 and a solid residue gas conditioner 11. The cleaned and conditioned syngas (output gas, with desired humidity) is stored in the syngas storage tank 1062 before being fed into gas engines 1063, from which electricity is generated. The functions of major components (equipment) in the system are illustrated in the following sections (see Table 6), following the sequence that the syngas is processed. The equipment figure and process diagram of the MSW gasification plant are presented in FIGS. 16 and 10, respectively.

TABLE 6

| Main Function of Subsystem | |
| --- | --- |
| Subsystem or equipment | Main Function |
| Recuperator 100 | Cool down syngas and recover sensible heat |
| Evaporative Cooler (Dry Quench) 1020 | Further cooling down of syngas prior to baghouse |
| Dry Injection System 1071 | Heavy metal adsorption |
| Baghouse 1030 | Particle or dust collection |
| HCL Scrubber 1040 | HCL removal and syngas cooling/conditioning |
| Carbon Filter Bed 1050 | Further mercury removal |
| $H_2S$ Removal System 1060 | $H_2S$ removal and elemental sulfur recovery |
| Solid residue gas conditioner 11 | Slag chamber off-gas cleaning and cooling |
| Syngas Regulation System (Homogenization Chamber, Chiller and Gas/Liquid | Syngas storage, homogenization, and humidity control |

TABLE 6-continued

| Main Function of Subsystem | |
| --- | --- |
| Subsystem or equipment | Main Function |
| Separator Gas Engines 1063 | Primary driver for electricity generation |
| Flare Stack 1064 | Burning syngas during start-up |

Recuperator

In order to recover the syngas sensible heat, the raw syngas exiting from refining chamber is cooled by air using a shell-tube type heat exchanger, called a recuperator 1010. The syngas flows through the tube side and the air passes through the shell side. The syngas temperature is reduced from 1000° C. to 738° C. while increasing the air temperature from ambient to 600° C. The input syngas then enters the converter gas conditioner 18.

Evaporative Cooler (Stage One Processing)

The evaporative cooler carries out the first step of the converter gas conditioner 18. The evaporative cooler 1020 drops Syngas temperature to 250° C. via direct injection of water in a controlled manner (adiabatic saturation). This process is also called dry quench in that there is no liquid present in the cooling. The water is atomized and sprayed co-currently into syngas stream. When the water is evaporated, it absorbs the sensible heat from syngas and decreases the syngas temperature to approximately 250° C. before it is fed to the baghouse.

Dry Injection System (Stage One Processing)

The dry injection system 1071 injects activate carbon into the input syngas stream. Activated carbon has a very high porosity, a characteristic that is conducive to the surface adsorption of large molecular species such as mercury and dioxin. Activated carbon, stored in a hopper, is pneumatically injected into the input gas stream and captured in the baghouse 1030. In this way, the metals and other contaminants are separated from the gas stream. Alternatively other materials such as feldspar, lime, and other sorbents can be injected into the gas stream to control and capture heavy metals & tars found in the input syngas stream without blocking it.

Baghouse (Stage One Processing)

Particulate matter and activated carbon with heavy metal on its surface is removed from the Syngas in the baghouse 1030. In the baghouse 1030, a filter cake is formed with particulate matter. This filter cake enhances the particulate removal efficiency of the baghouse. Heavy metals like cadmium and lead are in particulate form at this temperature and are also collected in the baghouse with very high collection efficiency. When the pressure drop across the baghouse 1030 increases to a certain set limit, nitrogen pulse-jets are used to clean the bags. The solids falling from the outside surface of the bags are collected in the bottom hopper and are sent to the solid residue conditioner 1065 for further conversion or disposal (see solid residue gas conditioner step below).

HCL Scrubber (Stage Two Processing)

The input syngas exiting from the baghouse 1030 (particulate free) is scrubbed in an HCl scrubber 1040 in a packed tower to remove HCl in the gas stream by an alkaline solution. Inside the scrubber 1040, there is enough contact area to cool down the gas to 35° C. The outlet HCl concentration will reach 5 ppm level. A waste water bleed stream is sent to a waste water storage tank for disposal.

Syngas Blower (Stage Two Processing)

A gas blower 1045 is required at this point to provide the driving force for the gas throughout the process from the exit of the converter 56 up to the engines 1063. It is located upstream of the mercury polisher 1050 because the polisher has a better mercury removal efficiency under pressure. The blower 1045 is designed using all upstream vessel design pressure drops. It is also designed to provide the required pressure for downstream equipment pressure losses to have a final pressure of ~2.1 to 3.0 psig in the gas storage tank 1062.

Carbon Filter Bed (Stage Two Processing)

The syngas pressure is boosted by a blower 1045 and further cooled by a water-cooled heat exchanger 1046 prior to the carbon bed filter 1050 which is used as a final polishing device for heavy metal in the gas stream. It is also capable of absorbing other organic contaminants, such as dioxins from the gas stream if present. The carbon bed filter 1050 is designed for over 99.0% mercury removal efficiency.

$H_2S$ Removal System (Stage Two Processing)

After the input gas stream passes through the carbon filter bed, $H_2S$ removal 1060 is carried out using Shell Paques Biological technology. Input syngas from the carbon bed filter 1050 passes through a scrubber where $H_2S$ is removed from syngas by re-circulating an alkaline solution. Then, the sulfide containing solution from the scrubber is then sent to the bioreactor for regeneration of alkalinity. The sulphur recovery occurs in the bio-reactor for oxidation of sulphide into elemental sulphur, followed by filtration of sulphur, sterilization of sulphur and bleed stream discharge to meet regulatory requirements. The $H_2S$ removal system 1060 is designed for 20 ppm $H_2S$ outlet concentration. Once the input gas exits the $H_2S$ removal system 1060 it is then directed to a syngas regulation system comprising amongst other components a chiller, a gas/liquid separator and homogenization chamber.

Solid Residue Gas Conditioner (Stage One Processing)

The material captured in the converter gas conditioner baghouse 1030 (which may contain activated carbon and metals) is purged periodically by nitrogen and conveyed to the solid residue conditioner 1065, where the material is vitrified. The secondary gas stream coming out of the solid residue conditioner 1065 enters a solid residue gas conditioner 11 where it is cooled in a gas cooler 1070. The secondary gas stream is then directed through the solid residue gas conditioner baghouse 1085 to remove particulates and then cooled by a heat exchanger 1090 before entering an activated carbon bed 1095 where heavy metals are removed. The baghouse 1085 of the solid residue gas conditioner 11 is also periodically purged based on pressure drop across the system. The solid residue collected in the solid residue gas conditioner baghouse 1085 is disposed by appropriate means. The combustible gas (secondary gas stream) exiting from the solid residue gas conditioner 11 is sent back to the converter gas conditioner 18 to fully utilize the recovered energy.

Syngas Regulation System

The output gas exiting the GCS is stored in a syngas regulation system 1062 prior to use as a fuel for gas engines. The gas engine design requires that the syngas be of a specific composition range at a specified relative humidity. Therefore, once the cleaned syngas exits the $H_2S$ scrubber 1060, it is sub-cooled from 35° C. to 26° C. using a chiller. This condenses some water out of the gas stream. This water is removed by a gas/liquid separator. This ensures that the gas has a relative humidity of 80% once reheated to 40° C. (engine requirement) after the gas storage prior to being sent to the engines in circumstances where the output gas is used to power an engine. The cleaned and cooled gas enters a homogenization chamber designed to hold approximately 2 minutes of output from processing operations, thus blending any variations in "richness" of the gas, to achieve a highly consistent gas quality (a regulated gas) flowing to the engines. The homogenization chamber is operated at 2.2 to 3.0 psig to meet gas engine fuel specifications. Once the regulated gas exits the homogenization chamber, it is heated to the engine requirement and directed to the gas engines 1063.

Gas Engines

Five GE Jenbacher gas engine sets 1063 are used to produce electricity based on the scale of the plant. Jenbacher gas engine is a type of reciprocating engine. It is capable of combusting low or medium heating value syngas with high efficiency and low emissions. Each gas engine has 1.0 MW capacity. So, the full capacity of electricity generation is 5 MW. However, due to the relatively low gas heating value (as compared to fuels such as natural gas) the engines have been derated to operate around 700 kW at their most efficient operating point.

Flare Stack

An enclosed flare-stack 1064 is used to burn syngas during start-up, shut-down and process stabilization phases. Once the process has been stabilized the flare stack 1064 will be used for emergency purposes only. The flare stack 1064 should achieve 99.99% destruction efficiency.

Example 10

A Municipal Solid Waste Gasification Plant Comprising a GCS

Figure 11:
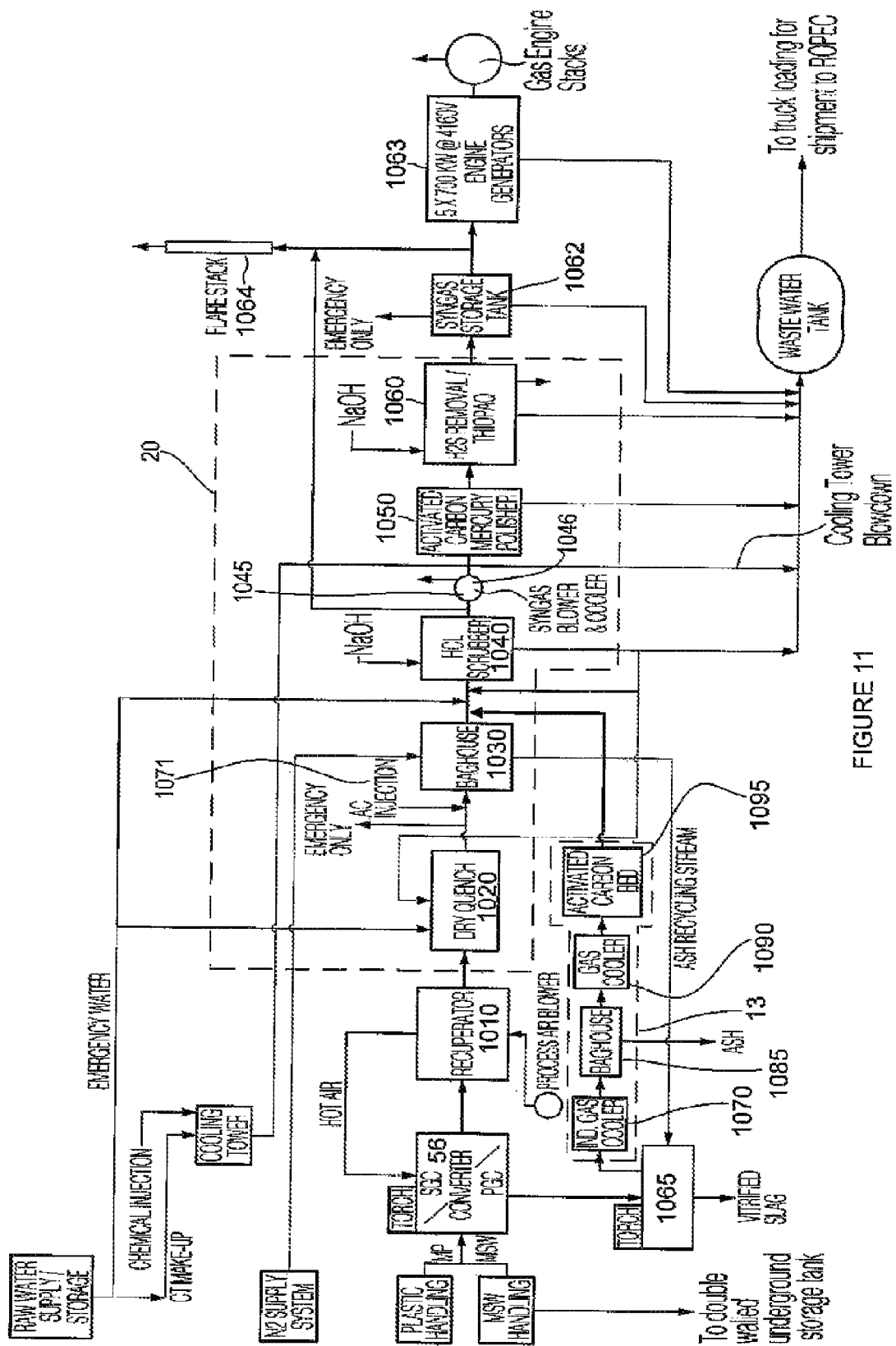
FIG. 11 depicts an alternate overview process flow diagram of a low-temperature gasification facility incorporating an exemplary GCS system according to one embodiment of the invention, integrated with a downstream application (gas engines).

FIG. 11 depicts an example of a municipal solid waste gasification plant comprising a GCS similar to that described in Example 9, with the exception that the secondary gas stream generated in the solid residue conditioner 1065 is processed in a solid residue gas conditioner 13 and fed into the converter gas conditioner 20 after the Stage One separation step of removing particulate matter and heavy metals in the baghouse 1030 of the converter gas conditioner 20, and is then processed through Stage Two of the converter gas conditioner 20.

Example 11

Figure 17:
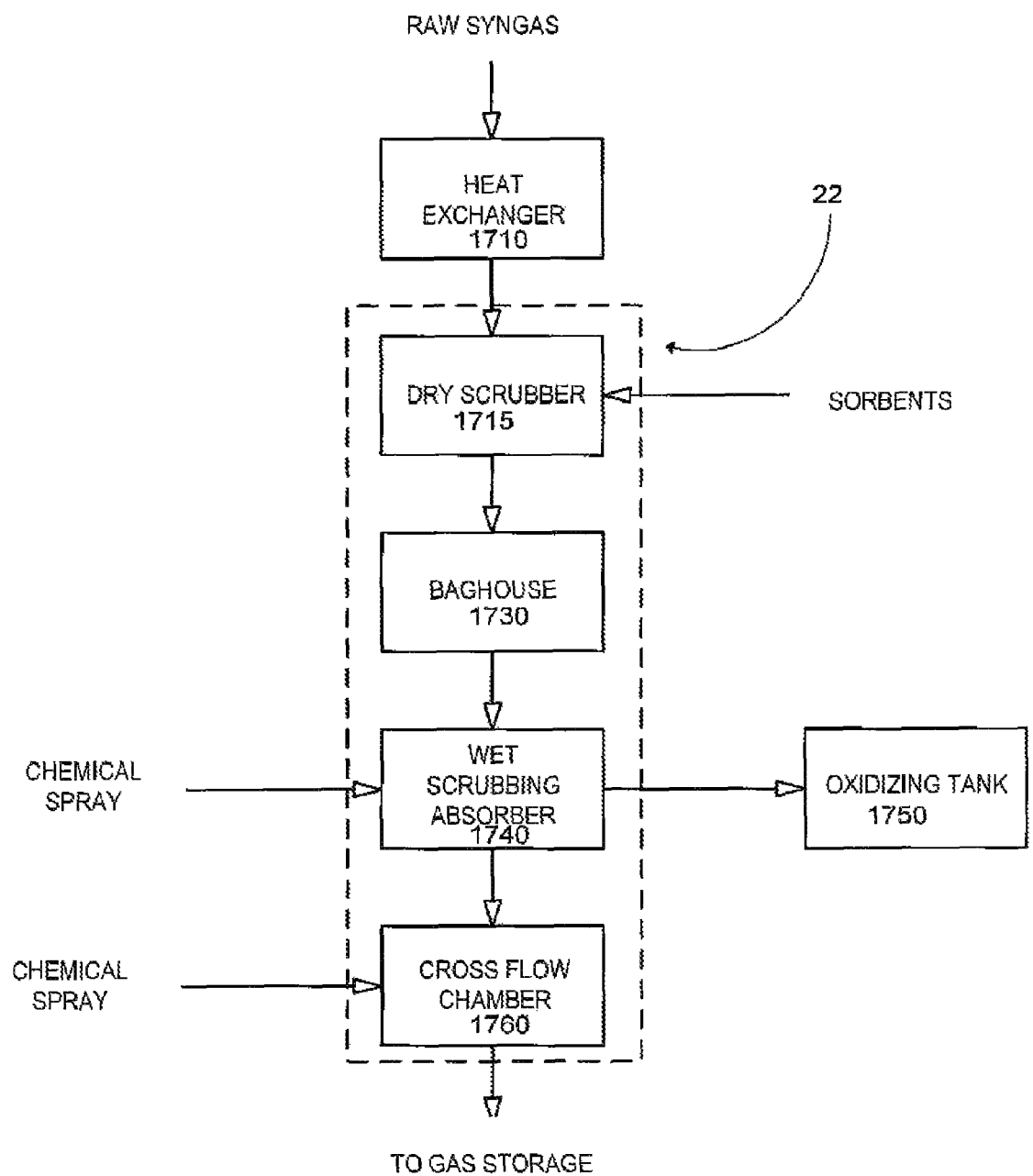
FIG. 17 depicts a GCS according to one embodiment of the invention.

Overview of a GCS in which a Dry Scrubber and a Baghouse is Used to Remove Particulate Matter The following describes an exemplary gas conditioning system as shown in FIG. 17, in which a dry scrubber and a baghouse are used to remove particulate matter from the input gas.

As shown in FIG. 17, input gas from a converter is first cooled in a heat exchanger 1710 prior to entering the GCS. The GCS in this example includes the necessary equipment for injection of dry, activated carbon and sodium bicarbonate into the duct and baghouse 1730. The input gas after dry scrubbing 1715 (Stage One processing) and particulate matter removal in a baghouse 1730 (Stage One processing) is sent to wet scrubbing 1740 (Stage Two processing) mainly in a packed tower followed by a cross flow chamber 1760 as illustrated in FIG. 17.

In the dry scrubbing system 1715, a reagent containing powdered, dry, activated carbon and sodium bicarbonate is stored in bulk bag dischargers. A regulated amount of this reagent is injected into the duct through a pneumatic conveying system upstream of the baghouse filter 1730. The activated carbon adsorbs the heavy metals in the input gas stream, and is carried with other particulates to the baghouse 1715. The particulates are collected on the exterior of the filter bags, and the resulting dust cake further filters the input gas stream.

The input gas exiting from each fabric filter compartment is further cleaned and sub-cooled in a packed bed scrubber (wet scrubbing absorber 1740), in which HCl is removed from the input gas, and a cross flow chamber 1760, in which $H_2S$ is removed from the input gas.

Functional and Technical Requirements of Equipment

The functional and technical requirements of the equipment described above are as follows:

Quench Reactor (Spray Dry Absorber)

The quench reactor or dry scrubber 1715 operates on a counter current flow arrangement; hot syngas is quenched by cool alkaline solution from the packed tower solution oxidizing tank. In the quench reactor 1715 some of the HCl present in the input gas is absorbed in the alkaline solution, and salt is precipitated that is removed in the baghouse filter 1730.

Reagent and Activated Carbon Addition

Reagent and activated carbon is added to the input gas stream from overhead silos. A screw feeder and rotary feeder feeds this material into a mixing duct for mixing (reacting with input gas) before it reaches the baghouse filter 1730.

Baghouse Filter

Two baghouse filters 1730 each with 60% capacity with 3:1 air to Cloth ratio are used to avoid any unwanted shut down. During maintenance of one of the baghouses the other baghouse can take full load with higher air to cloth ratio without damaging bags and reducing plant throughput. Each baghouse has isolation valves for isolation during maintenance.

A heating system is provided to maintain baghouse and bottom hopper temperature above gas dew point all the time. Proper insulation is provided to ensure no radiation heat losses.

Baghouse filters 1730 are cleaned intermittently based on pressure drop across the filter with nitrogen (Pulse jet type baghouse).

Packed Tower (Absorber)

Gas from baghouse filter 1730 is absorbed in a counter current flow packed bed absorber or wet scrubbing absorber 1740. The packed bed absorber 1740 provides enough contact area and time for heat transfer and mass transfer. An alkaline solution of sodium carbonate with 8.5 to 9.5 pH ranges is re-circulated to scrub acid gases.

Cross Flow Chamber

Carbon dioxide in the input gas stream is acidic and has affinity to alkaline solution at higher pH (11.2-11.8), however $H_2S$ cannot be absorbed with higher efficiency at low pH. To balance between $H_2S$ absorption and sodium carbonate consumption, the concept of a cross flow chamber 1760 is adopted. In a cross flow chamber 1760 sodium carbonate solution with high pH is sprayed in cross flow pattern with input gas to reduce contact time and hence reducing the reaction with $CO_2$.

The sodium carbonate solution is prepared in a batch preparation tank where sodium carbonate is mixed with water in appropriate ratio to make an unsaturated sodium carbonate solution. This solution is supplied to a high pH feed tank which provides the solution to the cross flow chamber.

Heat Exchanger

Two heat exchangers one with 6.0 MBTU/hr (with cooling water as a cooling medium) and other with 2 MBTU/hr (with sub-cooled water as cooling medium, for summer) remove heat from re-circulating solutions.

Oxidizing Tank

Scrubbing of hydrogen sulphide with sodium carbonate produces sodium sulphides; this sulphide is converted into more stable form as sulphate by oxidizing it with air into a separate oxidizing tank 1750. Activated carbon is added as catalyst for this reaction.

In terms of liquid waste and solid waste discharge, the GCS described in Example 11 may have slightly higher solid waste discharge and liquid waste discharge compared to the embodiment described in Example 1.

Example 12

High Level Process Control of a Municipal Solid Waste (MSW) Plant Comprising a GCS This example provides a high level description of a control strategy for an MSW plant comprising a GCS. The high level process control includes control of components of the GCS. A 2 phase approach is used with regard to development and implementation of the process control strategy for an MSW plasma gasification plant:

Phase 1: Operation During Start-up and Commissioning

For start-up and commissioning, a simple front-to-back (or supply-driven) control strategy is used where the converter is run at a fixed feed rate of MSW and process variations are absorbed by the downstream equipment (engines/generators & flare). The plant is operated with a small buffer of excess syngas production, requiring a small continuous flare. Syngas production beyond this normal amount increases the amount flared and deficient syngas production first eats into this buffer, but may eventually require generator power output to be reduced (generators can be operated from 50-100% power output via an adjustable power set point).

The benefits of this control scheme are:

It is less complex. It improves the ability to start-up and commission the plant, and then to make use of the operating data to implement more sophisticated control. It decouples the back-end from the front-end such that problems with one section of the plant are less likely to cascade to the rest of the plant. This increases the uptime and improves the ability to troubleshoot and optimize each part of the process. The small continuous flare eliminates the risk of large visible flame at the flare stack which can occur if the flare is operated in stop/start mode.

Phase 2: Long-term Operating Strategy

The long-term control strategy for the MSW plant is to achieve back-to-front control (or demand-driven control) where the gas engines/generators at the back-end of the system drive the process. The gas engines consume a certain volume/hr of fuel depending on the energy content of the fuel gas and the electrical power being generated. Therefore the high level goal of the control system is to ensure that adequate MSW/HCF feed enters the system and is converted to syngas of adequate energy content to run the generators at full power at all times, while precisely matching syngas production to syngas consumption such that flaring of syngas is eliminated and the electrical power produced per ton of MSW consumed is optimized.

Figure 18:
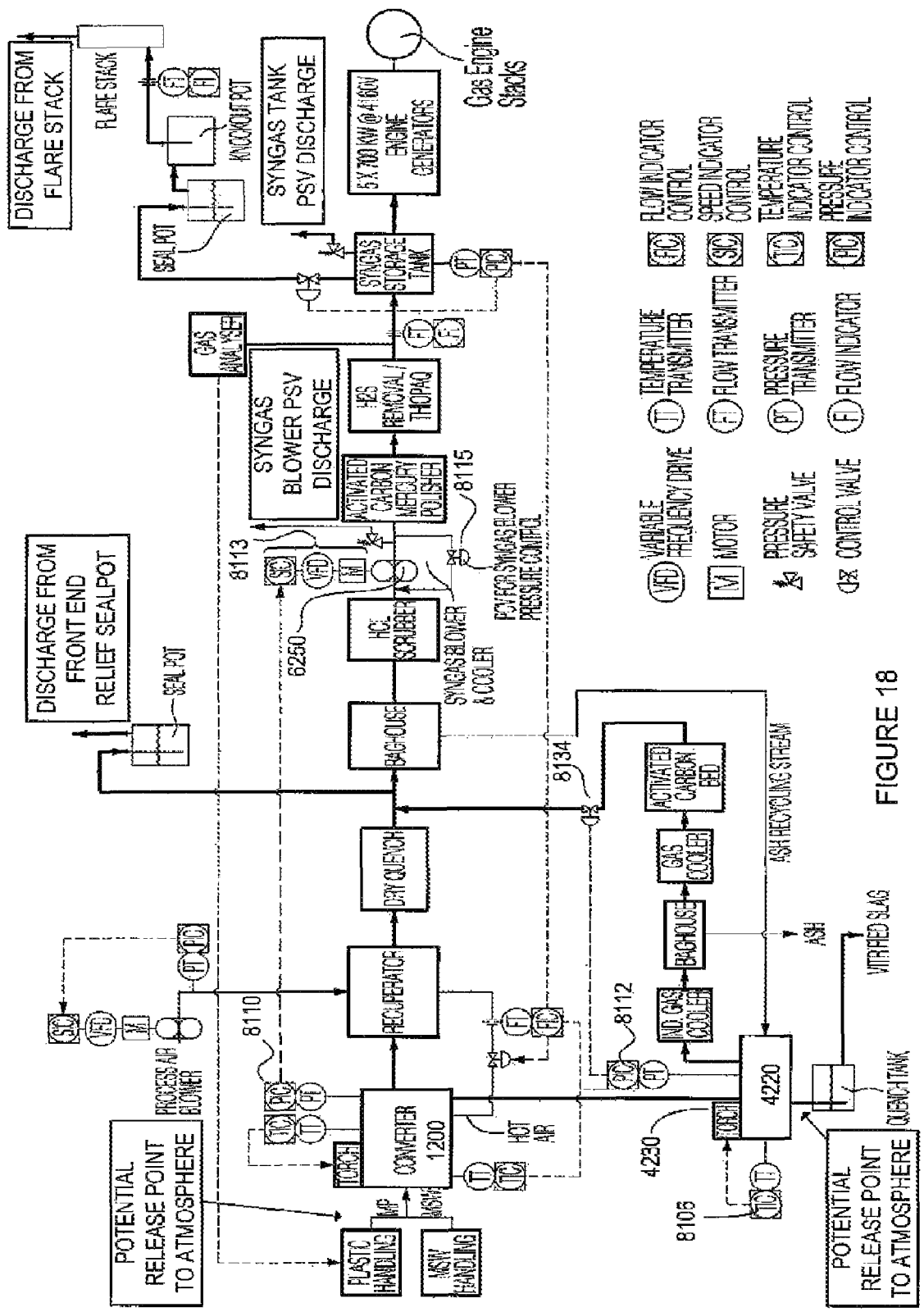
FIG. 18 depicts a high-level process control schematic for a Municipal Solid Waste Gasification Plant comprising a GCS according to one embodiment of the invention.

A high-level process control schematic for Phase 2 operation is shown in FIG. 18. Phase 1 operation is a sub-set of the control schematic shown.

Phase 1 Operation—Main Process Control Goals:

a) Stabilize the pressure in the syngas storage tank.
b) Stabilize the composition of the syngas being generated.
c) Control pile height of material in the converter main chamber.
d) Stabilize temperatures in the converter main chamber.
e) Control temperatures in the converter refining chamber.
f) Control converter process pressure.

Description of Each Goal a) Stabilize the Pressure in the Syngas Storage Tank.

The GE/Jenbacher gas engines are intolerant of changes in supply pressure. The specifications are as follows: minimum pressure=150 mbar (2.18 psig); maximum pressure=200 mbar (2.90 psig); allowed fluctuation of fuel gas pressure=+/−10% (+/−17.5 mbar, +/−0.25 psi); maximum rate of gas pressure fluctuation=10 mbar/sec (0.145 psi/sec). The engines have an inlet regulator that can handle small disturbances in supply pressure, and the holdup in the piping and homogenization chamber act somewhat to deaden these changes, but this remains by necessity the fastest acting control loop on the converter.

The initial Phase 1 pressure control strategy is based on the operating premise that the converter is run at sufficient MSW feed rate to generate a small buffer of excess syngas production, which is flared continuously. Therefore the homogenization chamber pressure control is a simple pressure control loop where the pressure control valves in the line from syngas storage tank to the flare are modulated as required to keep chamber pressure at the desired set point.

b) Stabilize the Composition of the Syngas being Generated.

The gas engines can operate over a wide range of fuel values, provided that the rate of change is not excessive. The allowable rate of change for Lower Heating Value is <1% fluctuation in syngas LHV/30 sec. For $H_2$ based fuels, the fuel gas is adequate with as little as 15% $H_2$ by itself, and the LHV can be as low as 50 btu/scf (1.86 MJ/nm3). For reference, typical LHV for the syngas produced is in the 4.0-4.5 MJ/nm3 range. The system volume and homogenization chamber greatly simplify the task of stabilizing the rate of change by providing mixing of about 2 minutes worth of syngas production.

The gas composition is measured by a gas analyzer installed in the inlet of the homogenization chamber. Based on this measurement the controller will adjust the fuel-to-air ratio (i.e. slightly increase/decrease MSW feed rate) in order to stabilize the gas fuel value. Increasing either the MSW or HCF feed relative to the air addition increases the fuel value of the gas. Note: Since this control action has a fairly long response time, it is tuned to only prevent long-term drift, not to respond to short-term variation.

While the HCF is by itself a much richer (~2×LHV) fuel source, it is typically added in a 1:20 ratio with the MSW, and is not therefore the dominant player in terms of fuel being added to the system. It is uneconomical to add too much HCF to the system. HCF therefore is used as a trim and not as a primary control. HCF is ratioed to the total feed with the ratio adjusted to stabilize the total C exiting the system in the syngas, as measured by the gas analyzer. This dampens fluctuations in MSW fuel value.

c) Control Pile Height of Material in the Converter Main Chamber.

A level control system is required to maintain stable pile height inside the converter. Stable level control is needed to prevent fluidization of the material from process air injection which could occur at low level and to prevent poor temperature distribution through the pile owing to restricted airflow that would occur at high level. Maintaining stable level also maintains consistent converter residence time.

A series of level switches in the converter main chamber measure pile depth. The level switches are microwave devices with a emitter on one side of the vessel and a receiver on the other side, which detect either presence or absence of solid material at that point inside the converter.

The inventory in the vessel is a function of feed rate and ram motion (and to a lesser degree conversion efficiency. Stage 3 ram sets converter throughput by moving at a fixed stroke length and frequency to discharge ash from the vessel. Stage 2 ram follows and moves as far as necessary to push material onto Stage 3 and change the Stage 3 start-of-stage level switch state to "full". Stage 1 ram follows and moves as far as necessary to push material onto Stage 2 and change the Stage 2 start-of-stage level switch state to "full". All rams are then withdrawn simultaneously, and a scheduled delay is executed before the entire sequence is repeated. Additional configuration may be used to limit the change in consecutive stroke lengths to less than that called for by the level switches to avoid excess ram-induced disturbances.

The rams need to be moved fairly frequently in order to prevent over-temperature conditions at the bottom of the converter. In addition, full extension ram strokes to the end of each stage may need to be programmed to occur occasionally to prevent stagnant material from building up and agglomerating near the end of the stage.

d) Stabilize Temperatures in the Converter Main Chamber

In order to get the best possible conversion efficiency, the material is kept at as high a temperature as possible, for as long as possible. However, temperatures cannot go too high or the material will begin to melt and agglomerate (form clinkers), which: 1) reduces the available surface area and hence the conversion efficiency, 2) causes the airflow in the pile to divert around the chunks of agglomeration, aggravating the temperature issues and accelerating the formation of agglomeration, 3) interferes with the normal operation of the rams, and 4) potentially causes a system shut down due to jamming of the ash removal screw.

The temperature distribution through the pile will also be controlled to prevent a second kind of agglomeration from forming—in this case, plastic melts and acts as a binder for the rest of the material.

Temperature control within the pile is achieved by changing the flow of process air into a given stage (ie. more or less combustion). The process air flow provided to each stage in the bottom chamber will be adjusted to stabilize temperatures in each stage. Temperature control utilizing extra ram strokes may also be necessary to break up hot spots.

e) Control Temperatures in the Converter Refining Chamber

Plasma torch power is adjusted to stabilize the refining chamber exit temperatures at the design set point (1000° C.). This ensures that the tars and soot formed in the main chamber are fully decomposed. Addition of process air into the refining chamber also bears part of the heat load by releasing heat energy with combustion of syngas. The flow rate of process air is adjusted to keep torch power in a good operating range.

f) Control Converter Process Pressure

Converter pressure is stabilized by adjusting the syngas blower's speed. At speeds below the blower's minimum operating frequency, a secondary control overrides and adjusts the recirculation valve instead. Once the recirculation valve returns to fully closed, the primary control re-engages. Additional description of these control is found below.

Phase 2 Process Control Goals:

For Phase 2 operation, all of the process control goals listed above are maintained. However the key new requirements are to eliminate flaring of syngas and to optimize the amount of electrical power produced per ton of MSW consumed. This requires that the flow of syngas being produced must exactly match the fuel being consumed by the engines. Therefore back-to-front control (or demand-driven control) must be implemented where the gas engines/generators at the back-end of the system drive the process.

In order to stabilize syngas flow out of the converter, process airflow into the converter is increased. Adjusting the rate of MSW or HCF addition to the system eventually changes the syngas flow, but with a 45+ minute residence time and no significant gasification reactions taking place at the point of material entry, there is no chance of a fast response due to these adjustments (it is expected that significant response may take about 15 minutes). Adjusting total airflow provides the fastest possible acting loop to control pressure. In the short term, because of the large inventory of material in the converter, adding more air to the bottom chamber does not necessarily dilute the gas proportionately. The additional air penetrates further into the pile, and reacts with material higher up. Conversely, adding less air will immediately enrich the gas, but eventually causes temperatures to drop and reaction rates/syngas flow to decrease.

Total airflow is ratioed to material feed rate (MSW+HCF), so the means of increasing air flow is to boost material feed rate. Controller tuning is set such that the effect of increased air is seen immediately. Controller tuning for feed rate is slower, but the additional feed eventually kicks in and provides the longer term solution to stabilizing syngas flow. Optionally, temporarily reducing generator power output is required depending on system dynamics to bridge the dead time between increasing the MSW/HCF feed rate and seeing increased syngas flow.

Control elements within the GCS are described as follows with reference to FIG. 18. The control elements within the GCS as discussed here integrate with control elements throughout the MSW plant to ensure efficient operation of the system. With reference to FIG. 18, a temperature sensing element 8106 is provided for sensing a temperature within the solid residue conditioner 4220, wherein this temperature is at least partially associated with the output power of the solid residue conditioner plasma heat source 4230. It will be appreciated that other temperature sensing elements may also be used at various points downstream of the converter 1200 for participating in different local, regional and/or global processes. For example, temperature monitors may also be associated with the GCS to ensure gases conditioned thereby are not too hot for a given sub-process, for example. Other such examples should be apparent to the person skilled in the art.

In controlling the residue processing within the solid residue conditioner, the power of the plasma torch 4230 may be adjusted as needed to maintain temperatures adequate for the melting operation. The solid residue gas conditioner 4220 temperature instrumentation (e.g. temperature sensing element 8106) may include, for example, two optical thermometers (OT's) which measure the surface temperature of the surface upon which they are aimed, 3 vapour space thermocouples mounted in ceramic thermo wells above the melt pool, and 5 external skin mounted thermocouples mounted on the outer metal shell. The solid residue gas conditioner 4220 may also include a pressure transmitter for measuring process pressure (e.g. pressure sensing element 8112) inside the solid residue gas conditioner 4220.

The pressure in the solid residue gas conditioner 4220 may be monitored by a pressure transmitter tapped into the vapour space of the vessel (e.g. element 8112). In general, the operating pressure of the solid residue gas conditioner 4220 is somewhat matched to that of the converter gasification chamber such that there is minimal driving force for flow of gas through the screw conveyors in either direction (flow of solid residue particles only). A control valve (e.g. valve 8134) is provided in the gas outlet line which can restrict the flow of gas that is being removed by the downstream vacuum producer (syngas blower). A DCS PID controller calculates the valve position needed to achieve the desired operating pressure.

Converter pressure and the pressure through the GCS may be stabilized by adjusting the syngas blower's 6250 speed. At speeds below the blower's minimum operating frequency, a secondary control may override and adjust a recirculation valve instead. Once the recirculation valve returns to fully closed, the primary control re-engages. In general, a pressure sensor 8110 is operatively coupled to the blower 6250 via the control system, which is configured to monitor pressure within the system, for example at a frequency of about 20 Hz, and adjust the blower speed via an appropriate response element 8113 operatively coupled thereto to maintain the system pressure within a desired range of values.

Example 13

A Municipal Solid Waste Gasification Plant Comprising a GCS

Figure 19:
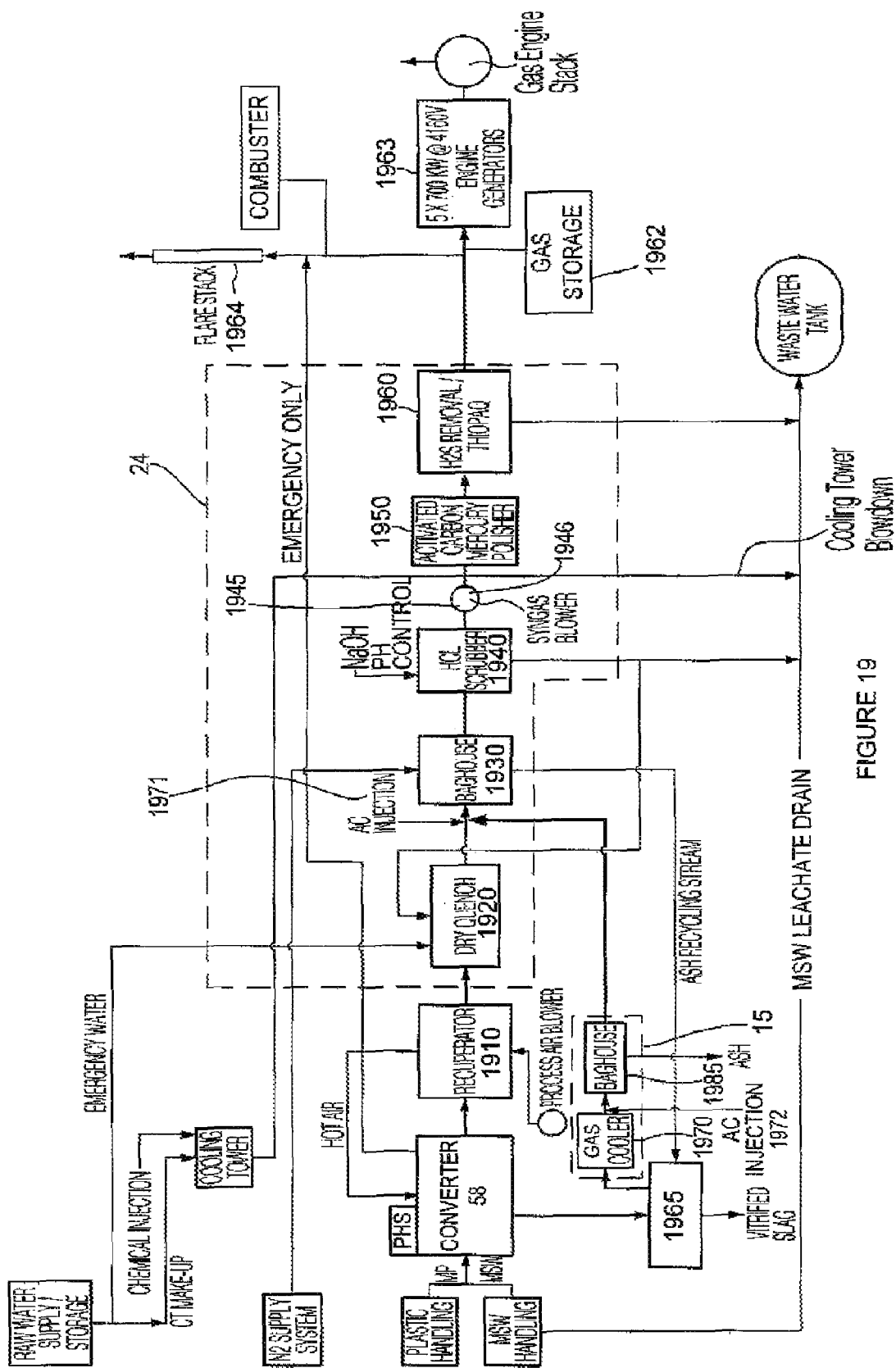
FIG. 19 depicts an overview process flow diagram of a low-temperature gasification facility incorporating an exemplary GCS system according to one embodiment of the invention, integrated with a downstream application (gas engines).

FIG. 19 depicts an overview process flow diagram of a municipal solid waste gasification plant comprising an exemplary GCS which is integrated with a downstream application involving gas engines. In this example, the solid residue gas conditioner 15 does not include a gas cooler or activated carbon bed after the baghouse 1985. The secondary gas stream, once it is processed through the solid residue gas conditioner 15 feeds into the converter gas conditioner 24 prior to the baghouse 1930.

In this example, input gas from the converter 58 of the plasma gasification system is cooled in a recuperator 1910 and then processed through a converter gas conditioner 24 in Stage One processes of further cooling in a dry quench process 1920, addition of activated carbon 1971 to the input gas stream, and removal of particulate matter and heavy metals in a baghouse 1930. The input gas is then processed through Stage Two processes including HCl removal in an HCl scrubber 1940, processing of gas through a gas blower 1945 and cooler 1946, removal of heavy metals and particulate matter in a mercury polisher 1950 and $H_2S$ removal in an $H_2S$ removal system 1960.

The material collected in the baghouse 1930 of the converter gas conditioner 24 is sent to the solid residue conditioner 1965 where it is converted to a solid residue and a secondary gas stream. The secondary gas stream generated in the solid residue conditioner 1965 is processed in a solid residue gas conditioner 15, through Stage One processes of cooling in a gas cooler 1970, activated carbon addition 1972, and subsequent removal of particulate matter in a baghouse 1085. The secondary gas stream is then is fed into the converter gas conditioner 24 where it is combined with the input gas stream prior to entry of the input gas stream into the baghouse 1930 of the converter gas conditioner 24. The input gas stream is then processed through the remaining Stage One and Stage Two processing steps of the converter gas conditioner 24.

Additional details of the process are described below.
Process Overview

The raw syngas exits the converter 58 and passes through a recuperator 1910. The recuperator 1910 cools the gas and the sensible heat is used to preheat the process air that is introduced into the converter 58. The cooled syngas then flows into a GCS, where the syngas is further cooled and cleaned of particulates, metals and acid gases sequentially. The GCS in this example comprises a converter gas conditioner 24 and a solid residue gas conditioner 15. The output gas, a cleaned and conditioned syngas (with desired humidity) is stored in the syngas storage tank 1962 before being fed into gas engines 1963, from which electricity is generated. The functions of major components (equipment) in the system are illustrated in the following sections (see Table 7), following the sequence that the syngas is processed. The process diagram of the MSW gasification plant is presented in FIG. 19.

TABLE 7

Main Function of Subsystem

| Subsystem or equipment | Main Function |
| --- | --- |
| Recuperator 1910 | Cool down syngas and recover sensible heat |
| Evaporative Cooler (Dry Quench) 1920 | Further cooling down of syngas prior to baghouse |
| Dry Injection System 1971 | Heavy metal adsorption |
| Baghouse 1930 | Particle or dust collection |
| HCL Scrubber 1940 | HCL removal and syngas cooling/conditioning |
| Carbon Filter Bed 1950 | Further mercury removal |
| $H_2S$ Removal System 1960 | $H_2S$ removal and elemental sulfur recovery |
| Solid residue gas conditioner 15 | Solid residue conditioner off-gas cleaning and cooling |
| Syngas Regulation System (Homogenization Chamber, Chiller and Gas/Liquid Separator) 1962 | Syngas storage, homogenization, and humidity control |
| Gas Engines 1963 | Primary driver for electricity generation |
| Flare Stack 1964 | Burning syngas during start-up |

Recuperator

In order to recover the syngas sensible heat, the raw syngas exiting from refining chamber is cooled by air using a shell-tube type heat exchanger, called a recuperator 1910. The syngas flows through the tube side and the air passes through the shell side. The syngas temperature is reduced from 1000° C. to 738° C. while increasing the air temperature from ambient to 600° C. The input syngas then enters the converter gas conditioner 24.

Evaporative Cooler (Stage One Processing)

The evaporative cooler carries out the first step of the converter gas conditioner 24. The evaporative cooler 1020 drops the input gas temperature to 250° C. via direct injection of water in a controlled manner (adiabatic saturation). This process is also called dry quench in that there is no liquid present in the cooling. The water is atomized and sprayed co-currently into input syngas stream. When the water is evaporated, it absorbs the sensible heat from syngas and decreases the syngas temperature to approximately 250° C. before it is fed to the baghouse.

Dry Injection System (Stage One Processing)

The dry injection system 1971 injects activated carbon into the input syngas stream. Activated carbon, stored in a hopper, is pneumatically injected into the input gas stream and captured in the baghouse 1930. In this way, the metals and other contaminants are separated from the gas stream. Alternatively other materials such as feldspar, lime, and other sorbents can be injected into the gas stream to control and capture heavy metals & tars found in the input syngas stream without blocking it.

Baghouse (Stage One Processing)

Particulate matter and activated carbon with heavy metal on its surface is removed from the input syngas in the baghouse 1930. In the baghouse 1930, a filter cake is formed with particulate matter. This filter cake enhances the particulate removal efficiency of the baghouse. Heavy metals like cadmium and lead are in particulate form at this temperature and are also collected in the baghouse with very high collection efficiency. When the pressure drop across the baghouse 1930 increases to a certain set limit, nitrogen pulse jets are used to clean the bags. The solids falling from the outside surface of the bags are collected in the bottom hopper and are sent to the solid residue conditioner 1965 for further conversion or disposal (see solid residue gas conditioner step below).

HCL Scrubber (Stage Two Processing)

The input syngas stream exiting from the baghouse 1930 (particulate free) is scrubbed in an HCl scrubber 1940 in a packed tower to remove HCl in the input gas stream by an alkaline solution. Inside the scrubber 1940, there is enough contact area to cool down the gas to 35° C. The outlet HCl concentration will reach 5 ppm level. A waste water bleed stream is sent to a waste water storage tank for disposal.

Gas Blower (Stage Two Processing)

A gas blower 1945 is required at this point to provide the driving force for the gas throughout the process from the exit of the converter 58 up to the engines 1963. It is located upstream of the mercury polisher 1950 because the polisher has a better mercury removal efficiency under pressure. The blower 1945 is designed using all upstream vessel design pressure drops. It is also designed to provide the required pressure for downstream equipment pressure losses to have a final pressure of ~2.1 to 3.0 psig in the gas storage tank 1962.

Carbon Filter Bed (Stage Two Processing)

The syngas pressure is boosted by the gas blower 1945 and further cooled by a water-cooled heat exchanger 1946 prior to the carbon bed filter 1950 which is used as a final polishing device for heavy metal in the gas stream. It is also capable of absorbing other organic contaminants, such as dioxins from the input gas stream if present. The carbon bed filter 1950 is designed for over 99.0% mercury removal efficiency.

$H_2S$ Removal System (Stage Two Processing)

After the input gas stream passes through the carbon filter bed, $H_2S$ removal 1960 is carried out using Shell Paques Biological technology. Input syngas from the carbon bed filter 1950 passes through a scrubber where $H_2S$ is removed from the input syngas by re-circulating an alkaline solution. The sulfide-containing solution from the scrubber is then sent to the bioreactor for regeneration of alkalinity. The sulphur recovery occurs in the bio-reactor for oxidation of sulphide into elemental sulphur, followed by filtration of sulphur, sterilization of sulphur and bleed stream discharge to meet regulatory requirements. The $H_2S$ removal system 1960 is designed for 20 ppm $H_2S$ outlet concentration. Once the input gas exits the $H_2S$ removal system 1960 it is then directed to a syngas regulation system comprising amongst other components a chiller, a gas/liquid separator and homogenization chamber.

Solid Residue Gas Conditioner (Stage One Processing)

The material captured in the converter gas conditioner baghouse 1930 (which may contain activated carbon and metals) is purged periodically by nitrogen and conveyed to the solid residue conditioner 1965, where the material is vitrified. The gas coming out of the solid residue conditioner 1965 enters a solid residue gas conditioner 15, where it is cooled in a gas cooler 1970. Activated carbon 1972 is injected into the cooled gas which is then directed through a solid residue gas conditioner baghouse 1985 to remove particulates. The baghouse 1985 of the solid residue gas conditioner 15 is also periodically purged based on pressure drop across the system. The solid residue collected in the solid residue gas conditioner baghouse 1985 is disposed by appropriate means. The combustible gas (secondary gas stream) exiting from the solid residue gas conditioner 15 is sent back to the converter gas conditioner 24 where it feeds into this system prior to heavy metal and particulate matter removal in the baghouse 1930, to fully utilize the recovered energy.

Syngas Regulation System

The output gas exiting the GCS is stored in a syngas regulation system 1962 prior to use as a fuel for gas engines. The gas engine design requires that the output syngas be of a specific composition range at a specified relative humidity. Therefore, once the output syngas exits the $H_2S$ scrubber 1960, it is sub-cooled from 35° C. to 26° C. using a chiller. This condenses some water out of the gas stream. This water is removed by a gas/liquid separator. This ensures that the gas has a relative humidity of 80% once reheated to 40° C. (engine requirement) after the gas storage prior to being sent to the engines. The cleaned and cooled gas enters a homogenization chamber designed to hold approximately 2 minutes of output from processing operations, thus blending any variations in "richness" of the gas, to achieve a highly consistent gas quality (a regulated gas) flowing to the engines. The homogenization chamber is operated at 2.2 to 3.0 psig to meet gas engine fuel specifications. Once the regulated gas exits the homogenization chamber, it is heated to the engine requirement and directed to the gas engines 1963.

Gas Engines

Five GE Jenbacher gas engine sets 1963 are used to produce electricity based on the scale of the plant. Jenbacher gas engine is a type of reciprocating engine. It is capable of combusting low or medium heating value syngas with high efficiency and low emissions. Each gas engine has 1.0 MW capacity. So, the full capacity of electricity generation is 5 MW. However, due to the relatively low gas heating value (as compared to fuels such as natural gas) the engines have been derated to operate around 700 kW at their most efficient operating point.

Flare Stack

An enclosed flare-stack 1964 is used to burn syngas during start-up, shut-down and process stabilization phases. Once the process has been stabilized the flare stack 1964 will be used for emergency purposes only. The flare stack 1964 should achieve 99.99% destruction efficiency.

Example 14

A Municipal Solid Waste Gasification Plant Comprising a GCS

Figure 20:
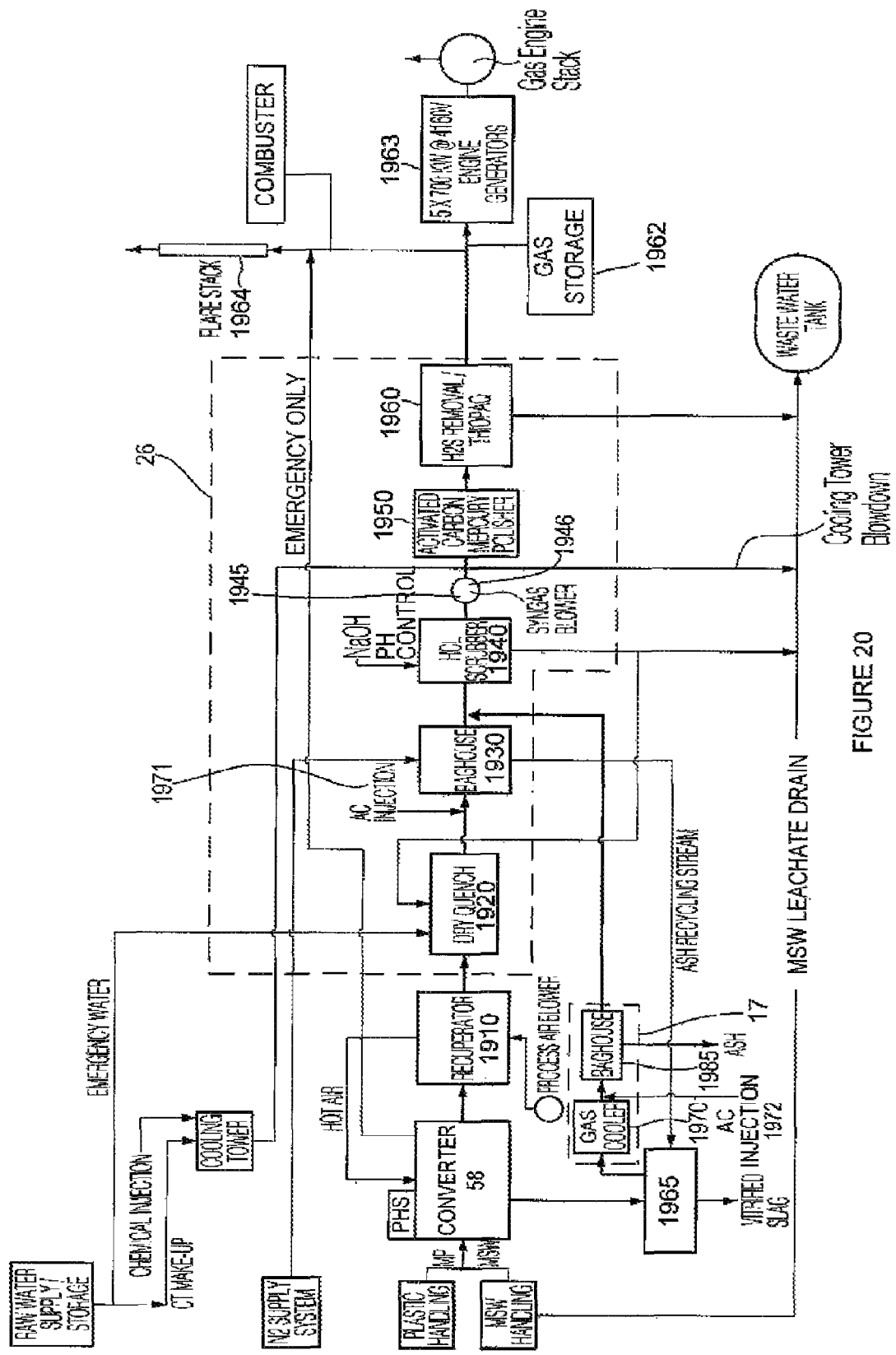
FIG. 20 depicts an alternate overview process flow diagram of a low-temperature gasification facility incorporating an exemplary GCS system according to one embodiment of the invention, integrated with a downstream application (gas engines).

FIG. 20 depicts an example of a municipal solid waste gasification plant similar to that described in Example 13, except that the secondary gas stream generated in the solid residue conditioner 1965 and processed in a solid residue gas conditioner 17 is fed into the converter gas conditioner 26 after the Stage One processing step of removing particulate matter and heavy metals in the baghouse 1930 of the converter gas conditioner 26. The input gas stream is then processed through Stage Two of the converter gas conditioner 26.

Example 15

Specifications for Evaporative Cooling Tower, Baghouse Filter, HCL Scrubber, and Carbon Bed Filter Examples of an evaporative cooling tower, baghouse filter, HCl scrubber and carbon bed filter that can be employed in the GCS described in Example 1 are provided below.

Evaporative Cooling Tower

Input gas from the heat exchanger or recuperator is cooled prior to entering the gas-solid filtration system (baghouse). This cooling is achieved by evaporative cooling (dry bottom quench) in order to minimize the amount of water (liquid) going to the baghouse.

A redundant water supply system is designed in order to ensure the temperature of the syngas exiting the quench tower never exceeds the design temperature of the baghouse. Quench water is provided from the HCl scrubber, at 35° C. The quench tower is located outdoors where temperature will be between −40° C. to 35° C. Table 8 describes the design specifications for the quench tower.

TABLE 8

Specifications of the Quench Tower

| | |
|---|---|
| Normal Inlet Pressure | −0.3 psig |
| Normal/Max Inlet Temperature | 740° C. (if recuperator is used)/ 1000° C. (if no recuperator) |
| Desired Outlet Temperature | 260° C. |
| Normal/Max Inlet Flow | 7950-9500 Nm³/hr |
| Mechanical Design Vacuum/Pressure | −2.5 psig/ 1.0 psig |
| Mechanical Design Temperature | 1100° C. |
| Maximum Allowable Pressure Drop | 5" H2O |

Selected Components of the Quench Tower:
1. Quench tower to achieve required cooling of the syngas to 260° C.
2. Emergency water system to cool down the gas in case of pump failure.
3. All the instruments with 4-20 mA signal or SMART transmitters, wired to a junction box and all valves required for the operation of the quench tower.

Gas-solid Filtration System (Baghouse Filter):

Table 9 provides a description of the characteristics of syngas flowing through the baghouse filter. Table 10 shows the composition of syngas flowing through the baghouse filter.

TABLE 9

Characteristics of syngas flow through baghouse filter:

| | |
|---|---|
| Normal Inlet Pressure | −0.48 psig |
| Normal Inlet Temperature | 260° C. |
| Normal/Max Inlet Flow | 11000-13200 Nm³/hr |
| Mechanical Design Vacuum/Pressure | −5 psig/ 2.5 psig |
| Mechanical Design Temperature | 260° C. |
| Maximum Allowable Pressure Drop | 5" $H_2O$ |

TABLE 10

Gas composition of syngas flowing through baghouse filter
Gas Composition (v/v wet basis)

| | |
|---|---|
| $CH_4$ | 182 ppm |
| CO | 12.10% |
| $CO_2$ | 4.86% |
| COS | 7 ppm |
| $H_2$ | 13.55% |
| HCl | 0.14% |
| $H_2O$ | 37.84% |
| HS | <4 ppm |
| $H_2S$ | 256 ppm |
| $N_2$ | 31.47% |
| $NH_3$ | 7 ppm |

TABLE 10-continued

Gas composition of syngas flowing through baghouse filter
Gas Composition (v/v wet basis)

| | |
|---|---|
| $SO_2$ | 1.5 ppm |

Inlet gas particulate and Heavy metal loading (Mainly fly-ash with heavy metals) in the baghouse filter is as follows:

| | |
|---|---|
| Dust loading | 7.4 g/Nm³ |
| Cadmium | 2.9 mg/Nm³ |
| Lead | 106 mg/Nm³ |
| Mercury | 1.3 mg/Nm³ |

Performance Guarantee Required after Filtration System
Guaranteed Filtration System Outlet

| | |
|---|---|
| Particulate matter | 11 mg/Nm³ (99.9% removal) |
| Cadmium | 15 µg/Nm³ (99.65% removal) |
| Lead | 159 µg/Nm³ (99.9% removal) |
| Mercury | 190 µg/Nm³ (90% removal) |

Selected Components of Baghouse Filtration System:
1. A single filtration unit operating 100% capacity.
2. Provision for double isolation to meet confined space entry regulations and best practices. Acceptable examples include zero leak isolation dampers (total two) and provision for inserting blanking plate into duct to isolate module from process.
3. Nitrogen blow back system with nitrogen manifold to common supply point.
4. High quality acid resistance, abrasion resistance filters with temperature resistance of at least 260° C.
5. All instruments with 4-20 mA signal/or SMART transmitter (wired to a junction box) required for operation of the system. DCS provided.
6. Dust leak detectors (separate for each module).
7. Separate hoppers for each module with zero leak solid discharge (rotary valves or equivalent).
8. All structural steel including ladders, access/maintenance platforms required for both the units.
9. Activated carbon injection system with zero leak rotary valve (Hopper will have capacity of 1.5 super sacks), bag unloading system to hopper with required instruments.
10. Filtration system will be located outside where temperature will be between −40° C. to 35° C.

HCl Scrubber

The HCl scrubber is designed to provide for the characteristics of syngas flowing through the HCl scrubber as shown in Table 11.

TABLE 11

Characteristics of syngas flowing through the HCl scrubber

| | |
|---|---|
| Normal Inlet Pressure | −0.7 psig |
| Normal Inlet Temperature | 235° C. |
| Normal/Max Inlet Flow | 9500/11400 Nm³/hr |
| Normal/Max HCl loading to scrubber | (0.16%) 16.5 kg/hr/ (0.29%) 29.4 kg/hr |
| Scrubber outlet gas max temperature | 35° C. |
| Scrubber outlet gas max relative humidity | 100% |
| Cooling water supply temperature | 30° C. |
| Mechanical Design Pressure/Vacuum | −5 psig to 2.5 psig |
| Mechanical Design Temperature | 260° C./ 105° C. (Quench/Scrubber) |
| Maximum Allowable Pressure Drop | 3" $H_2O$ |

A suitable HCl outlet concentration is 5 ppm.

Components of HCl Scrubber:
1. FRP (fibreglass reinforced plastic, or equivalent) packed tower to achieve required removal efficiency of the HCl.
2. Heat exchanger (plate and frame—Titanium) to cool re-circulating liquid stream to maintain gas temperature below 35° C. Cooling water supply and return. All controls required for system operation.
3. Conductivity meter, pH control system, level control for the scrubber system, two recirculation pumps (Online spare)
4. All the instruments (with 4-20 mA output signals), valves required for the operation of scrubber, pumps are skid mounted and instruments are wired to junction box. DCS provided.
5. Pumps and heat exchanger will be located inside a building directly adjacent to column; however column will be located outside.
6. Wet quench to cool down gas from 235° C. (design 260° C.) to the HCl scrubber material requirements.
7. Emergency water system, to cool down gas in case of circulation pump (both) failure.
8. All structural steel required for column/platform support, pump and heat exchanger skid and piping support.
9. Scrubber outlet gas pipe to blower suction.

Carbon Bed filter

The carbon bed filter is located after the product gas blower and is designed to accommodate the following characteristics of syngas flowing through it. These characteristics are summarised in Table 12 shows

TABLE 12

Characteristics of syngas flowing through the carbon bed filter

| | |
|---|---|
| Normal Inlet Pressure | 3.0 psig |
| Normal Inlet Temperature | 62° C. (35° C. if a cooler is used prior to the carbon bed) |
| Normal/Max Inlet Flow | 7200-8600 Nm³/hr |
| Normal/Max Mercury loading | 123 µg/Nm³/ 1.2 mg/Nm³ |
| Mechanical Design Pressure | 5 psig |
| Mechanical Design Temperature | 105° C. |
| Maximum Allowable Pressure Drop | 6" $H_2O$ |
| Carbon bed life | 5 years |
| Guaranteed mercury carbon bed outlet | 19 µg/Nm³ (99.0%) |

Components of Carbon Filter Bed
1. FRP carbon bed filter vessel with first carbon charge
2. Structural steel required for vessel supports, inspection/maintenance platform, and provision for future carbon charging.

3. All the accessories required for operation of carbon bed filters.

All the instruments have capability to interface with a gasification control system. The motor driven equipment is provided with on/off controls, lockable off button and status lines that will enable the equipment to be operated by a process control system.

Example 16

Specifications of an $H_2S$ Removal System

The following Example provides a description of an $H_2S$ removal system that can be implemented in the GCS described in Example 1. The $H_2S$ removal system is designed to accommodate the characteristics of the syngas flowing through it, as shown in Table 13. The composition of syngas flowing through the $H_2S$ removal system is shown in Table 14.

TABLE 13

| Characteristics of syngas flowing through the $H_2S$ Removal system | |
|---|---|
| Normal Inlet Pressure | 2.8 psig |
| Normal Inlet temperature | 35° C. |
| Normal/Max $H_2S$ loading | 353 ppm/666 ppm |
| Normal/Max Inlet Flow | 7200-9300 $Nm^3/hr$ |
| Mechanical Design Pressure/Vacuum | 5 psig |
| Mechanical Design Temperature | 80° C. |
| Maximum Allowable Pressure Drop | 10" $H_2O$ |

TABLE 14

| Composition of syngas flowing through the $H_2S$ removal system Gas Composition (v/v, wet basis) | |
|---|---|
| $CH_4$ | 249 ppm |
| CO | 18.4% |
| $CO_2$ | 7.38% |
| COS | 10 ppm |
| $H_2$ | 20.59% |
| HCl | 20 ppm |
| $H_2O$ | 5.74% |
| HS | 4 ppm |
| $H_2S$ | 353 ppm |
| $N_2$ | 47.85% |

Normal Inlet gas particulate and Heavy metal loading data (Mainly fly-ash with heavy metals) are listed below.

| Dust loading | 17 $mg/Nm^3$ |
|---|---|
| Cadmium | 14 $\mu g/Nm^3$ |
| Lead | 142 $\mu g/Nm^3$ |
| Mercury | 20 $\mu g/Nm^3$ |

Guaranteed $H_2S$ Outlet for System—20 ppm

During upset condition dust and heavy metal loading due to upstream system failure is as follows.

| Dust loading | 1 $g/Nm^3$ |
|---|---|
| Cadmium | 1.3 $mg/Nm^3$ |
| Lead | 20 $mg/Nm^3$ |
| Mercury | 510 $\mu g/Nm^3$ |

It is understood that during upset conditions, the presence of dust and heavy metal may cause foaming, and is dealt with by the injection of an antifoaming agent. An efficient antifoam system is used.

List of Components

1. $H_2S$ Scrubber (contactor) with all associated accessories required for the operation of packed column, column recirculation pumps with (online spare), all instruments, controls (pH, level and conductivity controller) and valves (control and manual) required for scrubber operation and isolation.
2. Inlet and outlet gas-liquid separator with automatic liquid seal (liquid level) control to avoid any gas leaks—If required
3. Required nutrients tank and filtrate tank with all the accessories, piping, valves and controls for continuous operation and isolation of process.
4. Bio-reactor with complete control system required for continuous operation of the system. Air blower with online spare, instruments and controls including ORP controller, level controller and valves (control and manual) required for operation and isolation of the process.
5. Plate and frame or equivalent filter press for sulphur removal from wet slurry. The filter is capable of operating continuously for two days between two clean up/filter washings. All instrumentation with valves required for operation and isolation of the process.
6. Filtrate pumps with online spares, all controls valves and manual valves required for the operation and isolation of filtrate pumps.
7. A complete system required for treatment of bleed water (i.e. UV filtration for bleed water) to meet Canadian Environmental Protection Agency regulations, and future provision for sterilization of solution before filtration to meet all provincial and local regulations.
8. All instruments with 4-20 mA signal (wired to a junction box) required for operation of the system. DCS also to be included.

Control Interfaces

A DCS is used for the entire process control. Optionally, a select transmitter with filedbus foundation protocol is used for easy integration with the DCS.

Example 17

Characteristics and Design of a Product Gas Blower

The following is an exemplary description of a product gas blower (with a gas cooler) which can be used to withdraw syngas from a plasma gasification system and move it through the GCS. The blower provides adequate suction through all the equipment and piping as per specifications shown below.

Functional Specifications

Functional specifications for the product gas blower are described below. Syngas is flammable and will create an explosive mixture with air, therefore, all service fluid i.e. seal purge is done with Nitrogen. The blower is operated a through variable speed drive (VSD) within the flow range of 10% to 100%. Tables 15 and 16 show the design specifications for the gas blower.

TABLE 15

| Specifications of the gas blower | |
|---|---|
| Normal gas inlet temperature | 35° C. |
| Normal gas suction pressure | −1.0 psig |
| Normal gas flow rate | 7200 Nm$^3$/hr |
| Maximum gas flow rate | 9300 Nm$^3$/hr |
| Maximum gas suction temperature | 40° C. |
| Normal discharge pressure | 3.0 psig |
| Normal discharge temperature (after gas cooler) | <35° C. |
| Mechanical design pressure | 5.0 psig |
| Relative Humidity of gas at blower inlet | 100% |
| Gas Molecular Weight | 23.3 |
| Cooling water supply temperature (product gas cooler) | 29.5° C. |
| Maximum acceptable gas discharge temperature (after product gas cooler) | 40° C. |
| Turn down ratio | 10% |

Note:
Pressure drop through suction and discharge of the blower is not included in the blower's static pressures

TABLE 16

| Average gas composition flowing through the gas blower, on a wet basis: Gas Composition, wet basis(v/v) | |
|---|---|
| $CH_4$ | 0.03% |
| CO | 18.4% |
| $CO_2$ | 7.38% |
| $H_2$ | 20.59% |
| Normal/Max $H_2S$ | 354/666 ppm |
| $H_2O$ | 5.74% |
| Normal/Max HCl | 5 ppm/100 ppm |
| $N_2$ | 47.85% |

The blower is designed such that there is no air intake from atmosphere (can create explosive mixture) or gas leak to atmosphere (syngas is toxic and flammable). The blower has a very good shaft seal (0% Leak), and advanced leak detection system for leaks in both directions.

Components that May be Used

The following is a list of components that can be used with the product gas blower.

1. Syngas blower, motor is explosion proof. Blower shaft seal zero leaks (does not leak).
2. Product gas cooler—the supplier scope of supply will be gas cooler only
3. Auxiliary oil pump with motor, all required instrumentations for blower auxiliary system
4. All instruments and controls (i.e. Low and high oil pressure switch, high discharge pressure and temperature switch, differential temperature and pressure switch, discharge pressure gauge, discharge temperature gauge, oil pressure and temperature gauge). All instruments are wired at common explosion proof junction box. VFD will be controlled by pressure transmitter installed upstream of the blower.
5. Zero leaks discharge check valve.
6. Equipment safety system to prevent blower from excessive pressure/vacuum/shut off discharge (systems like PRV and recycle line).

The blower is designed to work in an environment where explosive gases may be present in upset conditions.

The blower is operated continuously (24 hours per day/7 days per week), however there are chances of frequent start/stop operation of the blower during process stabilization. The gas blower is capable of working with high reliability even during frequent start/stop.

Control Interfaces

Variable speed drive for the motor control will be provided, as well as motor over-voltage, overload protection etc. Motor status, On/Off operation, speed change will be operated and monitored remotely through DCS.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The embodiments of the invention for which an exclusive property or privilege is claimed are defined as follows:

1. A gas conditioning system for conditioning an input gas from one or more locations within a gasification system, the one or more locations including a gasifier, to provide a conditioned gas, said gas conditioning system comprising:
   a. a first gas conditioner comprising one or more particle removal units for removing particulate matter from the input gas received from the gasifier in a first conditioning stage to provide a conditioned gas and removed particulate matter;
   b. a solid residue conditioner, distinct from the gasifier, comprising a heat source and configured to receive, heat and process for receiving and processing said removed particulate matter to produce a secondary gas and solid waste; and
   c. a second gas conditioner operatively associated with said solid residue conditioner, said second gas conditioner comprising a gas cooler and one or more further particle removal units for removing particulate matter from said secondary gas to provide a partially conditioned secondary gas, said second gas conditioner configured to pass said secondary gas through said gas cooler for cooling prior to entry of the secondary gas into the one or more further particle removal units and to pass said partially conditioned secondary gas to the first gas conditioner for further processing.

2. The gas conditioning system according to claim 1, wherein said first gas conditioner further comprises one or more components downstream of said one or more particle removal units for implementing further conditioning of the input gas in a second conditioning stage to remove additional contaminants from the input gas.

3. The gas conditioning system according to claim 2, wherein said one or more components comprise one or more components for acid gas removal.

4. The gas conditioning system according to claim 3, wherein said one or more components for acid gas removal comprise an HCl scrubber.

5. The gas conditioning system according to claim 3, wherein said one or more components for acid gas removal comprise an $H_2S$ removal system.

6. The gas conditioning system according to claim 2, wherein said one or more components comprise a particle removal unit.

7. The gas conditioning system according to claim 6, wherein said particle removal unit is an activated carbon mercury polisher.

8. The gas conditioning system according to claim 2 which outputs a conditioned gas suitable for use in a gas engine, and wherein the conditioned gas comprises carbon monoxide and hydrogen, and optionally nitrogen, methane and carbon dioxide, and comprises less than 20 ppm of $H_2S$, less than 10 ppm of HCl, less than 17mg/Nm$^3$ of particulate matter and less than 190 µg/Nm$^3$ of mercury.

9. The gas conditioning system according to claim 1, wherein said first gas conditioner additionally comprises at least one other component for implementing a dry phase processing step in said first conditioning stage.

10. The gas conditioning system according to claim 9, wherein said component for implementing said dry phase processing step is a dry injection system.

11. The gas conditioning system according to claim 1, wherein one of said one or more particle removal units is a baghouse filter.

12. The gas conditioning system according to claim 1, wherein said converter gas conditioner further comprises a blower for moving the input gas through the gas conditioning system.

13. The gas conditioning system according to claim 1, wherein said first gas conditioner further comprises a cooling unit upstream of said one or more particle removal units.

14. The gas conditioning system according to claim 1, wherein said second gas conditioner further comprises a cooling unit downstream of the one or more further particle removal units, and an activated carbon bed downstream of said cooling unit.

* * * * *